United States Patent
Drappeau

(10) Patent No.: US 10,852,924 B2
(45) Date of Patent: Dec. 1, 2020

(54) HOLISTIC REVELATIONS IN AN ELECTRONIC ARTWORK

(71) Applicant: Codeweaving Incorporated, Dresden, ME (US)

(72) Inventor: Benoit Claude Jean-Louis Francois Drappeau, Dresden, ME (US)

(73) Assignee: Codeweaving Incorporated, Dresden, ME (US)

(*) Notice: Subject to any disclaimer, the term of this patent is extended or adjusted under 35 U.S.C. 154(b) by 184 days.

(21) Appl. No.: 15/820,902

(22) Filed: Nov. 22, 2017

(65) Prior Publication Data

US 2018/0150207 A1    May 31, 2018

Related U.S. Application Data

(60) Provisional application No. 62/427,608, filed on Nov. 29, 2016.

(51) Int. Cl.
*G06F 3/0484* (2013.01)
*G06F 3/0482* (2013.01)
(Continued)

(52) U.S. Cl.
CPC ........ *G06F 3/04845* (2013.01); *G06F 3/0482* (2013.01); *G06T 11/60* (2013.01);
(Continued)

(58) Field of Classification Search
CPC .... G06F 3/04842; G06T 11/001; G06T 11/60; G06T 2200/24; G06T 11/00; G06T 13/80;
(Continued)

(56) References Cited

U.S. PATENT DOCUMENTS 5,844,557 A    12/1998    Shively, II
6,603,463 B1    8/2003    Rising, III
(Continued)

FOREIGN PATENT DOCUMENTS

CN    105807993 A    7/2016

OTHER PUBLICATIONS

Dengsheng Zhang, et al., "Evaluation of MPEG-7 shape descriptors against other shape descriptors," vol. 9, p. 15-30 (Multimedia Systems, 2003).

(Continued)

*Primary Examiner* — Tan H Tran
(74) *Attorney, Agent, or Firm* — Leber IP Law; David C. Robertson

(57) ABSTRACT

Systems and methods for generating, distributing and consuming image filters as described. An image filter publication application receives data from an image filter engine. The data may include, but is not limited to, images, image filters data and image data. The image filter publication generates image filter formats based on image filters data and associations present in image filters data with, but not limited to, images and image data by means of Unique Resource Identifiers (URIs). A client device's programmatic client's image interactivity engine retrieves an image filter format and its associated images and image data. The image interactivity engine processes and presents the image filter format via a graphical user interface (GUI). In response to interactions with an image filter format comprised image, the image interactivity engine may, based on the image filter format, visually emphasize image shapes within the image. The image filter format may include associations (by means of URIs) between image shapes and a source of image data, therefore the image interactivity engine may retrieve and (Continued)

display the associated image data in a GUI in response to interactions with an image shape.

18 Claims, 46 Drawing Sheets

(51) Int. Cl.
    *G06T 11/60*     (2006.01)
    *G06F 40/186*     (2020.01)
(52) U.S. Cl.
    CPC .. *G06F 40/186* (2020.01); *G06F 2203/04804* (2013.01); *G06T 2200/24* (2013.01)
(58) Field of Classification Search
    CPC ........... G06T 19/20; G06T 2207/10004; G06T 2207/20104; G06T 2207/20212; G06T 2207/20221; G06T 3/40; G06T 5/002
    See application file for complete search history.

(56) References Cited

U.S. PATENT DOCUMENTS

| | | |
|---|---|---|
| 7,949,943 B2 | 5/2011 | Michaud et al. |
| 8,443,286 B2 | 5/2013 | Cameron |
| 9,129,416 B2 | 9/2015 | Landsberger et al. |
| 2013/0205248 A1* | 8/2013 | Moon ................. G06F 3/04815 |
| | | 715/782 |
| 2013/0326381 A1 | 12/2013 | Pereira et al. |
| 2015/0093029 A1* | 4/2015 | Tijssen .................... G06T 11/00 |
| | | 382/173 |
| 2015/0161822 A1 | 6/2015 | Basu |
| 2016/0062961 A1 | 3/2016 | Zhu et al. |
| 2016/0259413 A1* | 9/2016 | Anzures ................ G06F 3/0482 |
| 2016/0342678 A1 | 11/2016 | Newman et al. |
| 2018/0082452 A1* | 3/2018 | Simon ..................... G06T 11/60 |

OTHER PUBLICATIONS

Harry Blum, "Biological Shape and Visual Science (Part I)," 38 J. Theor. Biol. 205-287 (1973).

Kowaliw, et al. "An Interactive Electronic Art System Based on Artificial Ecosystemics" Research paper supported by Australian Research Council Discovery Grants DP0772667 and DP1094064; Mar. 29, 2011.

Kluzczynski "Strategies of interactive art" Journal of Aesthetics & Culture; vol. 2; 2010; pp. 1-27.

\* cited by examiner

HOLISTIC REVELATIONS IN AN ELECTRONIC ARTWORK

CROSS-REFERENCE TO RELATED APPLICATION DATA

This application claims priority to U.S. Provisional Patent Application Ser. No. 62/427,608, entitled "Revelations and Context Revelations in an Electronic Artwork," filed on Nov. 29, 2016. The aforementioned patent application is herein incorporated by reference in its entirety.

TECHNICAL FIELD

The subject matter disclosed herein generally relates to generating, distributing and consuming image filters and image filters formats. More specifically, the present disclosure provides systems and methods to visually emphasize and de-emphasize image shapes in an image based on data contained by an image filter format and display information associated with the image shapes.

BACKGROUND

Images consumption is at a record high, fueled by an ever-accelerating digital revolution. Millennium users' demand for visual stimulation, social connectivity, contextual information and instant gratification is at an all-time high. Short burst of engagement, called "micro-moments" are increasingly driving user's behaviors on digital devices. Micro-moments occur when people reflexively turn to a device to act on a need to learn something, do something, discover something, watch something or the like. They are short, intent-rich moments when decisions are made and preferences shaped. Fulfillment of micro-moments ties with providing individuals visual immersion, awareness, engagement, pertinent and detailed information in such a manner that individuals stay, at all time, in control of their digital and visual experience. Images and videos have become the vehicle of choice to foster micro-moments. Visual immersion is achieved using high quality, targeted, meaningful and emotional images while awareness and engagement are embodied using images 'artistic components and delivered utilizing image interactivity.

BRIEF DESCRIPTION OF THE DRAWINGS

The present disclosure is illustrated by way of example, and not by way of limitation in the figures of the accompanying drawings, in which:

FIG. 5L through 5T illustrates operations of an image filter graphical user interface component, an image filter data component and an image filter communicator component according to embodiments of the present disclosure;

DETAILED DESCRIPTION

Figure 1:
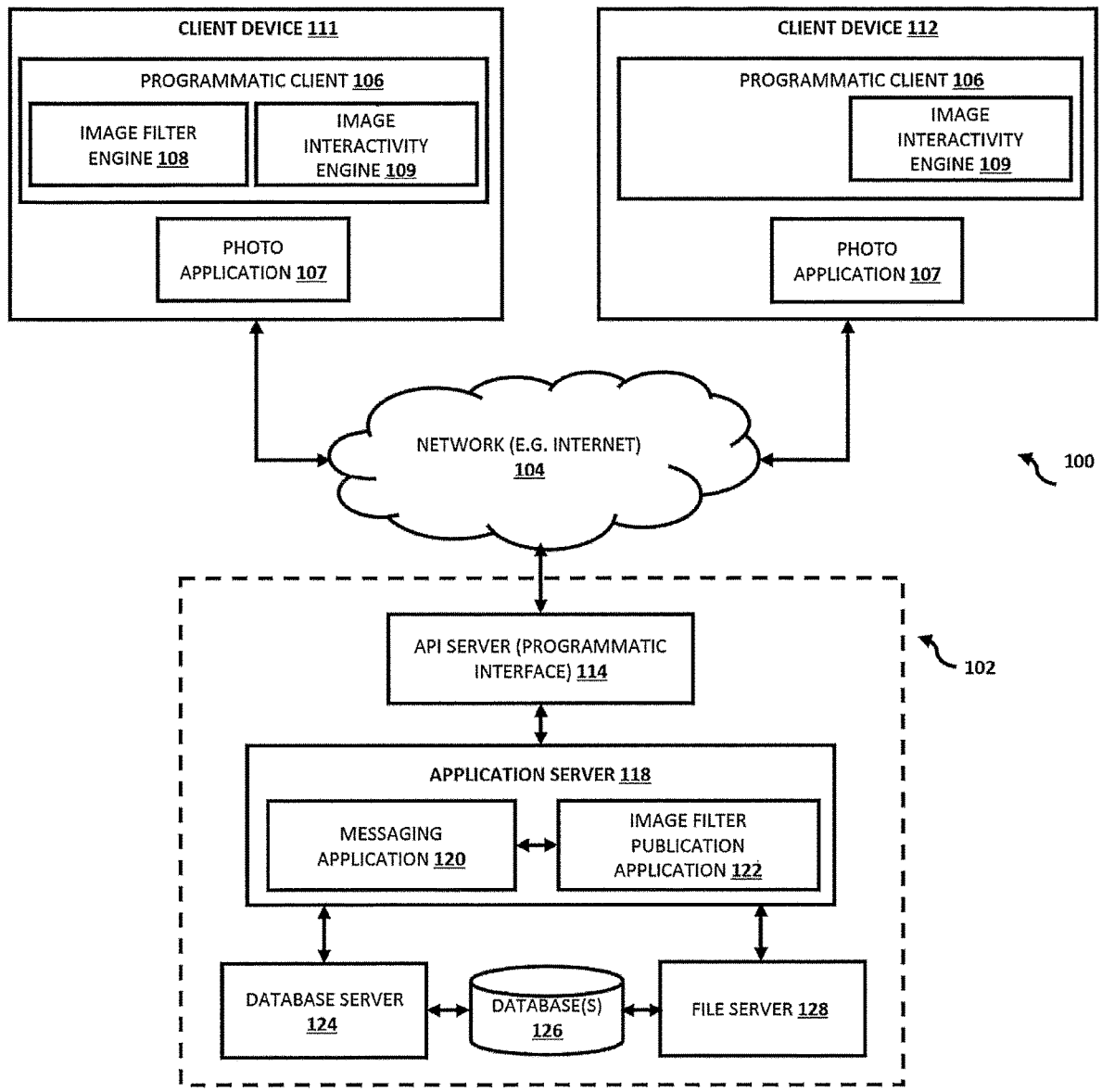
FIG. 1 is a network diagram illustrating a system having a client-server architecture configured for exchanging data over a network, according to embodiments of the present disclosure.

Although the present disclosure is described with reference to specific example embodiments, it will be evident that various modifications and changes may be made to these embodiments without departing from the spirit and scope of the disclosure. Accordingly, the specification and drawings are to be regarded in an illustrative rather than a restrictive manner.

The capacity of identifying clickable or tapeable shapes within an image and the ability to click or tap such shapes to access information on an individual's own terms is a powerful and compelling new way to interact with images and to bridge visually enhanced shapes and information in an effort to touch, connect and inform.

A shape may be defined as an object's form, outline, external boundary or external surface as opposed to an object's other properties such as color, texture or material composition. It is commonly defined in terms of the set of contours that describe the boundary of an object. A geometrical shape (herein referred to as shape) may be defined as a geometric information that remains (e.g., does not change into another) even if scale, orientation, location and reflection are displaced from a particular geometrical shape. Geometrical shapes may be grouped in bounded and unbounded form categories. The unbounded form category includes, but is not limited to, line segments, arcs and curves. The bounded form category may be further segmented in two-dimensional, three-dimensional and multi-dimensional sub-categories. The two-dimensional sub-category includes shapes which are generally represented by the lines joining the set of points called vertices in a bounded form or by bounded curves. The two-dimensional sub-category includes, but is not limited to, polygons such as triangles, quadrilaterals etc. or geometrical shapes formed by bounded curves, including, but not limited to, circle and ellipse. The three-dimensional sub-category includes mostly shapes which are generally represented by the lines joining a set of points as well as two dimensional surfaces containing those lines or formed by bounded curved surfaces. The three-dimensional sub-category includes, but is not limited to, cubes, cuboids, pyramids, sphere and ellipsoid. The multi-dimensional sub-category includes shapes having more than two or three dimensions.

In contrast to gradient-based and texture-based representations, shapes are more descriptive at a larger scale, ideally capturing, through composition and by virtue of inclusion and exclusion, an object or ensemble of objects of interest as a whole.

The Gestalt psychology undertakes the understanding of psychological phenomena in form perception by viewing such phenomena as structured and organized wholes rather than the sum of their constituent parts. The Gestalt psychology distances itself from the more elementistic, reductionist and decompositional psychological approaches such as structuralism and emphasizes concepts such as emergent properties, holism and context.

Holistic representations based on global transforms rely on a pre-segmented object shape as input and consequently are impractical in isolating shapes in realistic scenes which inevitably contain clutter. Other approaches, such as generalized cylinders, Recognition by Components Theory, superquadrics, edgels, contour segments and statistical descriptors of local or semi-local contours such as Shape Context are founded on the extraction of shape primitives in images, a very difficult task in realistic images. Other strategies involve capturing all global dependences among parts in a less expressive model such as Thin-Plate Splines or Procrustes. Nonetheless the execution of matching shape primitives with known shapes is at best a non-straightforward process.

Though the Gestalt school of perception approaches are a step in the right direction in understanding holism in visual perception, they miss a key holistic dimension because of the very fact of being primarily focused only on the understanding of the physical properties of form perception. The missed dimension is the subliminal awareness and mental associations of non-local relationships induced by forms in an image. Such dimension establishes a holistic representation reaching beyond the mere elementary sensations and physical properties of form perception and embraces in its entirety the Gestalt principles of emergent properties, holism and context.

In accordance with the holistic principles, the above strategies lack the capacity to clearly reveal and establish awareness of holistic relationships between graphical elements of an image as well as to the existence of holistic connections accessible by way of interacting with these elements. The teachings of the present disclosure solve this, as well as other problems, by holistically grouping visually one or more image's graphical elements. In one example, such holistic grouping process may be performed by decreasing the pixel intensity of non-belonging graphical elements and leaving the pixel intensity of belonging graphical elements. In another example, the holistic grouping process may be performed by leaving the pixel intensity of non-belonging graphical elements and increasing the pixel intensity of belonging graphical elements. Such process operations may be performed using either one or more deemphasizing cascading style sheet (CSS) classes, one or more emphasizing CSS classes or through the combination of both.

The present disclosure solves the aforementioned, as well as other, deficiencies by providing a programmatic graphical user interface (GUI) implementing a functionality to isolate image shapes within images and bind image shapes to multiple holistic relationships with a displayable set of information. The functionality provided by the GUI disclosed herein generates augmented images that enable users to interact with one or more particular holistic relationships (e.g., click or tap on a shape participating in one or more holistic relationships) and access information illustrating the selected holistic relationships.

The present disclosure provides an image filter engine including, but not limited to, an image filter GUI component, an image filter data component, an image data component, an image filter messaging component and an image filter communicator component. A device programmatic client presents user interfaces generated by the image filter GUI component, with the user interfaces being composed of various graphical elements interfacing with the image filter data component, image data component, image filter messaging component and image filter communicator component. Some user interfaces enable the display of an image accessible by a device programmatic client and the isolation of image shapes within the displayed image.

An image filter GUI component according to the present disclosure may include various graphical elements capable of being rendered on a computing device and capable of interfacing with an image filter data component, an image data component, an image filter communicator component and an image filter messaging component.

An image filter data component according to the present disclosure may include a model capable of interfacing with graphical elements of a GUI to assemble an image filter object graph (herein referred to as an image filter). Object-oriented applications may contain complex webs of interrelated objects. The interrelated objects may be linked to each other by one object either owning or containing another object or holding a reference to another object to which it sends messages. This interrelation of objects is referred to as an object graph. An image filter is based, at least in part, on the composition of one instance of an image filter object model's root node type (herein referred as a root layer) and instances of an image filter object model's layer node type (herein referred as layers wherein each instance is herein referred as a layer). A root layer represents an image filter's root and may hold information global to an image filter, for example, the unique resource identifier (URI) of the image associated with the image filter. A layer may hold holistic association data, for example, URI of a resource or set of resource illustrating the holistic concept(s) represented by the layer. A layer may include, a set of layers and a set of image shapes, wherein each image shape may also hold holistic association data, for example, a URI of a resource or set of resources illustrating the holistic concept(s) represented by an image shape. A root layer may include a set of layers. An image filter may be serializable (e.g., capable of serialization, with serialization being the process of translating data structures or object state into a format that can be stored, for example, in a file or memory buffer, or transmitted, for example, across a network connection link and reconstructed later, possibly in a different computer environment) and identifiable by a URI.

An image data component according to the present disclosure may include an image data object model capable of interfacing with graphical elements of a GUI used to gather and group data in an image data object graph (herein referred to as image data) associable with image filters layers and GUI templates (herein referred to as image data templates). An image data template may orchestrate the graphical layout of image data. The data gathered (herein referred as image data resources) may include, for example, text, images, image URIs, videos, video URIs, image data URIs and image data GUI template URIs. The combination of image data resources and/or image data resources URIs and image data constitute an ensemble (herein referred as an image data ensemble). An image data ensemble resource may be identifiable via a URI which may be used to establish a relationship between an image data ensemble resource and image data. An image data template may be identifiable via a URI which may be used to establish a relationship between an image data template and an image data. Image data may be identifiable via a URI which may be used to establish a relationship between image data and an image filter's layer.

An image filter communicator component according to the present disclosure may include functions capable of interfacing with GUI graphical elements and image filter engine's components to exchange data across a network connection link with an image filter publication application. The exchanged data may include images, image filter data and image data among others. The exchanged data may be stored, for example, in one or more files and/or in one or more databases on a remote computer environment after being transmitted. Data may be retrieved from an image filter publication application by an image filter engine of a device's programmatic client for, by example, data modifications and subsequent processing by an image publication application as described below.

An image filter communicator component may be responsible for connections life cycle to image filter publication applications via application server(s) APIs as well as the transmission and reception of serialized data onto one or more network link(s) established with image filter publication applications via application server(s) APIs.

An image filter messaging component according to the present disclosure may include an image filter messaging object model capable of interfacing with graphical elements of a GUI used to gather and group data in an image filter messaging object graph (also referred to herein as image filter messaging data) associable with GUI templates (also referred to herein as image filter messaging templates). An image filter messaging template may orchestrate a graphical layout of image filter messaging data.

A messaging application may interface with an image filter publication application (via appropriate interfaces) as well as various data sources to allow information to be passed between a messaging application and an image filter publication application. A messaging application may facilitate the delivery of messages, communicated by an image filter publication application, to message recipients using any one of a number of delivery networks and platforms.

An image filter publication application may include an image filter transformation component, an image filter publication messaging component, an image data templates component, an image asset publication component and an image filter messaging templates component.

An image filter transformation component may operate at a server and transforms an image filter transmitted by an image filter communicator component into one or more object graphs (also referred to herein as an image filter format or image filter formats) adhering to one or more specifications implemented either natively or through some auxiliary applications by client device applications. The image filter transformation component may store, for example in one or more files and/or one or more databases, the one or more resulting filter formats such that the one or more stored filter formats are queryable using URIs assigned to the image filter formats by an image filter publication application. In one example, the image filter format is a scalable vector graphic (SVG) image filter format. The SVG image filter format may be an XML-based vector image open standard, such as that developed by the World Wide Web Consortium (W3C). The image filter may be translated into a format adhering SVG specification, producing a new structural format of the image filter.

An image filter publication messaging component may operate at a server(s) and receive image filter messaging data generated by an image filter messaging component and transmitted by an image filter communicator component. The image filter publication messaging component augments image filter messaging data with a URI representing an image interactivity engine resources' URIs and an image filter format URI. The image filter publication messaging component may interface with a messaging application to relay to the messaging application the augmented image filter messaging data. The messaging application facilitates the delivery of the image filter messaging data to recipients associated (by means of URIs) with the image filter messaging data.

An image data templates component may operate at a server and facilitates the retrieval of image data templates orchestrating a GUI layout of image data, for example, from files and databases among other data storage implementations. The stored image data templates may be queryable from a data storage implementation engine by an image filter engine and an image interactivity engine via image data templates URIs assigned by the image data templates component of a filter publication application.

An image asset publication component may operate at a server(s) and facilitate the storage and retrieval, for example, in and from files and databases among other data storage implementation, of data transmitted by an image filter communicator. Such transmitted data includes, but is not limited to, images, videos, image data, image filter data, etc. The stored data may be queryable from the data storage implementation by an image filter engine and an image interactivity engine via the URI assigned to the data by an image asset publication component.

An image filter messaging templates component may operate at a server(s) and facilitates the retrieval of image filter messaging templates orchestrating a GUI layout of image filter messaging data. The stored image filter messaging templates may be queryable from a data storage implementation engine by an image filter engine via image filter messaging templates URIs assigned by the image filter publication application.

An image interactivity engine may include an image interactivity GUI component, an image interactivity filter format component and an image interactivity data component.

An image interactivity GUI component may include various graphical elements renderable on a display of a device and capable of interfacing with an image interactivity filter format component and an image interactivity data component.

An image interactivity filter format component may communicate, via the image interactivity engine, with an image filter publication application and receive, from the image filter publication application, an image and its associated (by means of URIs) image filter formats to display onto a GUI. An image interactivity filter format component may orchestrate, in conjunction with the image interactivity GUI component, visual emphasizing and deemphasizing of an image filter's image shapes as presented by an image filter format. In one example, an image interactivity filter format component processes an image filter format adhering to and implementing the SVG specification and displays an SVG document, that, comparable to the Hypertext Markup Language, has a document model (DOM) and events, and is accessible by programmatic languages, such as JavaScript. An SVG image filter format, produced by the image filter transformation component of an image filter publication application, maps an image filter's elements to a corresponding SVG model's elements. An image filter's root layer element is mapped to an SVG model's <svg> element or SVG root, which may be used to embed an SVG fragment containing its own viewport and coordinates system inside a current document (for example, an HTML document). An image filter's layer element is mapped to an SVG model's <g> elements or SVG group (i.e. an SVG element used to group other SVG elements). An image filter's shape element is mapped to an SVG model's <path> element or SVG path (i.e. an SVG element used to define a shape in the SVG specification). The image associated (e.g. by means of a URI) with an image filter is represented by an SVG model's <image> element or SVG image. Information held by an image filter's elements is carried over during the transformation process to their respective SVG elements. The image interactivity filter format component orchestrates, in conjunction with the image interactivity GUI component, the visual emphasizing and deemphasizing of SVG paths provided by an SVG image filter format.

An image interactivity data component interfaces with an image interactivity filter format component to, for example, receive notification of an image shape selection and communicate, via the image interactivity engine, with an image filter publication application and to receive, from the image filter publication component, one or more image data associated (by means of URIs) with the selected image shape representation, for example, in the case of an SVG image filter format, an SVG image's SVG path, and orchestrate, in conjunction with the image interactivity GUI component, the graphical representation of an image data's resources.

System Architecture

FIG. 1 illustrates a system 100 including a client-server architecture for exchanging data over a network. The system 100 may be a messaging system where clients communicate and exchange data within the network system. The data may pertain to various functions (e.g. sending and receiving text and images, sending and receiving programmatic code libraries) and aspects (e.g., publication of "resources," management of "resources," etc.) associated with the system 100 and its users. Although illustrated as a client-server architecture, one skilled in the art will appreciate that the system 100 may include other network architectures such as peer-to-peer or distributed network environments without departing from the present disclosure.

An application server(s) 118 may include a messaging application 120 and an image filter publication application 122. The application server(s) 118 may exchange data, via a network 104 such as the Internet) with one or more client devices (111/112). The data exchanged between the application server(s) 118 and the client device(s) (111/112) may include user profile data, messaging content data, image filter data, image data, data representing image attributes, etc.

The data exchanged between the application server(s) 118 and the client device(s) (111/112) may be dependent upon user-selected GUI functions provided via displays of the client devices (111/112). Each client device (111/112) may include a programmatic client 106 that includes an image interactivity engine 109 and/or an image filter engine 108. The programmatic client 106 may be in communication with the messaging application 120 and the image filter publication application 122 of the application server(s) 118. Illustrative client devices (111/112) include computing devices with wireless communication and/or cellular service communication capabilities (e.g., smart phones, tablets, laptop computers, desktop computers, smart watches, and the like). Illustrative client devices (111/112) may additionally include one or more speakers for outputting audio, one or more microphones for capturing audio, one or more cameras for capturing one or more images, and/or a display.

The application server(s) 118 may communicate with an application program interface (API) server(s) 114, which enables the application server(s) 118 to communicate with one or more client devices (111/112) via the network 104. The application server(s) 118 may communicate with one or more database servers 124 that facilitate access to one or more databases 126. The application server(s) 118 may additionally communicate with one or more file server(s) 128.

The API server(s) 114 communicates and receives message data, image filter data, and image data, among other things. For example, the API server(s) 114 may send and receive data to and from an application (e.g. via the programmatic client 106) running on a client device (111/112) or a third-party server(s).

Figure 2:
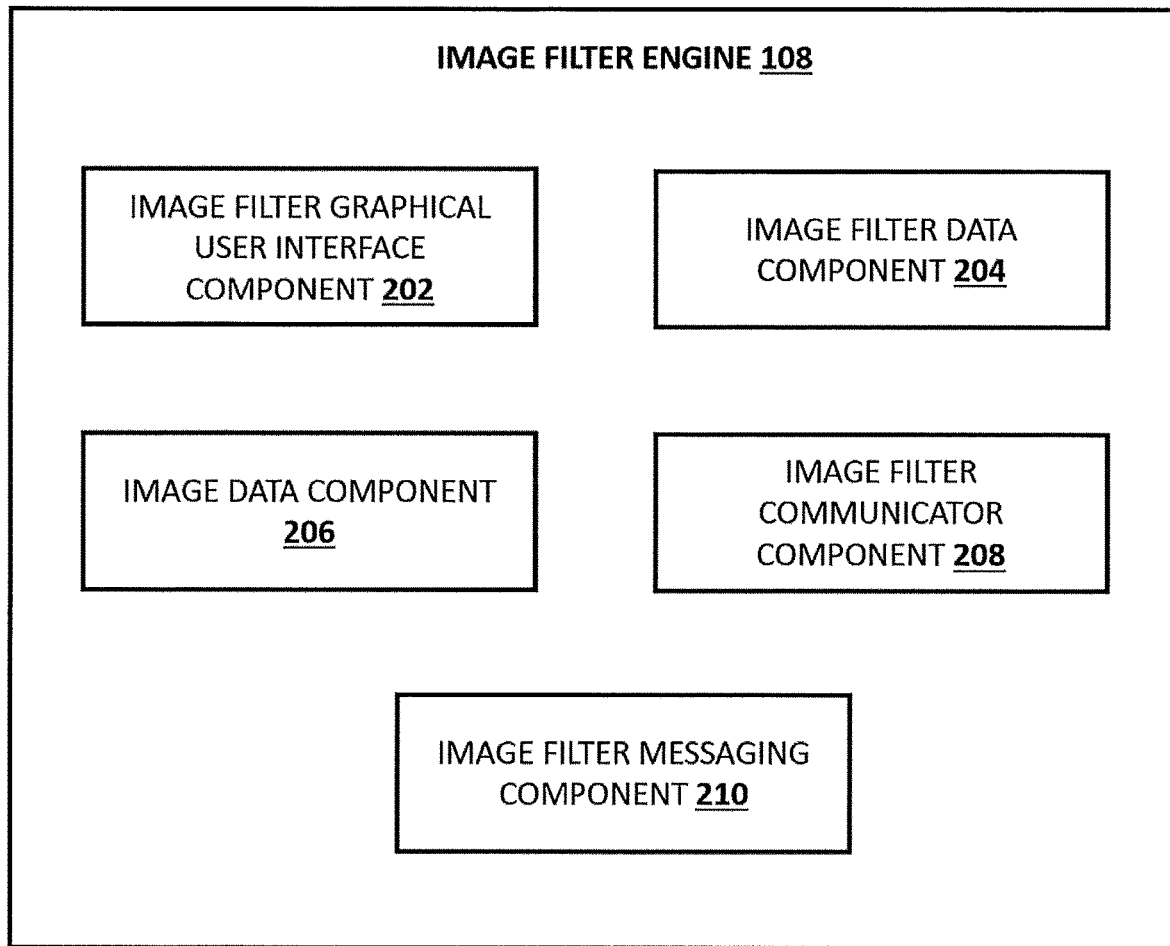
FIG. 2 is a block diagram illustrating an example image filter engine according to embodiments of the present disclosure.

A programmatic client 106 may include an image filter engine 108 including an image filter GUI component 202, an image filter data component 204, an image data component 206, an image filter communicator component 208 and an image filter messaging component 210 (as illustrated in FIG. 2). The image filter engine 108 collects image shapes, assembles image filters, maps image shapes to image filter layers, assembles image data, and associates (e.g., by means of URIs) image data to images filter layers to generate a set of image filters wherein every unidentified (e.g., without a URI already assigned) object is assigned a URI for identification and wherein each image filter is programmatically serializable and transmittable (via the network 104) to the image filter publication application 122. The image filter engine 108 may collect data, such as text data, image data resources, image URI data, video data, video URI data, image filter format URI data, and message recipient URI data to assemble a message. The message is programmatically serializable and transmittable (via the network 104) to the image filter publication application 122. Components of the image filter engine 108 are described in more detail below with respect to FIG. 2.

The image filter publication application 122 stores data such as images, image data resources, image filter data representing one or more image filters, and image filter messaging data, received from the image filter engine 108 via the network 104. The image filter publication application 122 also stores data representing image filters transformed by an image filter transformation component into image filter formats based on standards published by, for example, the world wide web consortium (W3C).

Figure 3:
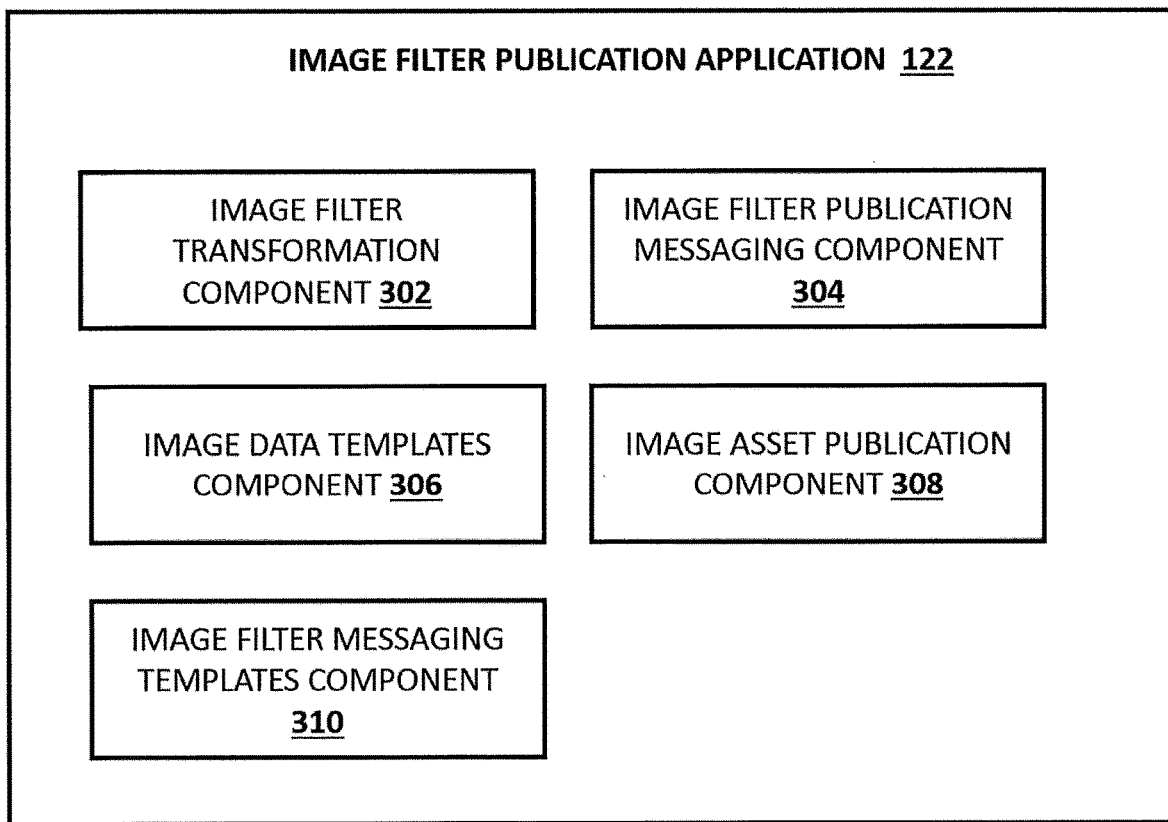
FIG. 3 is a block diagram illustrating an example image filter publication application according to embodiments of the present disclosure.

FIG. 3 illustrates components of the image filter publication application 122. The image filter publication application 122 includes an image filter publication messaging component 304 that interfaces with the messaging application 120 and relays to the messaging application 120 image filter messaging data received from an image filter engine 108. The messaging application 120 facilitates the delivery of image filter messaging data to recipients associated (by means of URIs) with the image filter messaging data.

The image filter publication application 122 also includes an image filter transformation component 302 that transforms image filters data into image filter formats based on standards published by, for example, the world wide web consortium (W3C)

The image filter publication application 122 also includes an image data templates component 306 that facilitates the retrieval of image data templates by an image filter engine 108 and an image interactivity engine 109. The image data templates orchestrate a GUI layout of image data. The image data templates may be queryable from a data storage by the image filter engine 108 and the image interactivity engine 109 via image data templates URIs assigned by the image filter publication application 122.

The image filter publication application 122 also includes an image asset publication component 308 that facilitates the storage and retrieval, by an image filter engine 108 and an image interactivity engine 109, of data transmitted by an image filter communicator 208. Such data may include images, video data, image data, image filter data, etc. The stored data may be queryable from a data storage by an image filter engine 108 and an image interactivity engine 109 via URIs assigned to the data by the image asset publication component 308.

The image filter publication application 122 also includes an image filter messaging templates component 310 that facilitates the retrieval of image filter messaging templates by an image filter engine 108. The image filter messaging templates orchestrate a GUI layout of image filter messaging data. Stored image filter messaging templates may be queryable from a data storage by an image filter engine 108 via image filter messaging templates URIs assigned by an image filter publication application 122.

Referring again to FIG. 1, the messaging application 120 may be hosted on one or more dedicated or shared application servers 118. The messaging application 120 and the image filter publication 122 may communicate (e.g., via appropriate interfaces) to each other and to various data sources to allow information to be passed between the messaging application 120 and the image filter publication application 122 for the purposes of sharing and accessing common data. The messaging application 120 and the image filter publication application 122 may, furthermore, access the one or more databases 126 via the database server(s) 124 and/or file servers 128.

The messaging application 120 provides mechanisms for an image filter publication application 122 to send messages, via the messaging application 120, that are generated by an image filter messaging component 210, transmitted by an image filter communicator component 208 of an image filter engine 108 to the image filter publication application 122 and to be transmitted to recipients URIs associated (by means of URIs) with the messages.

The messaging application 120 delivers messages to the programmatic client 106. The messaging application 120 may use various message delivery networks and platforms. For example, the messaging application 120 may deliver messages using electronic mail (e-mail), instant messages (IM), Short Message Service (SMS), text, facsimile, or voice (e.g., Voice over IP (VoIP)) messages via wired (e.g., the Internet), plain old telephone services (POTS), or wireless networks (e.g., mobile, cellular, WiFi, Long Term Evolution (LTE), Bluetooth).

Referring now to FIG. 2, an image filter engine 108 may include an image filter GUI component 202, an image filter data component 204, an image data component 206, an image filter communicator component 208, and an image filter messaging component 210.

The image data component 206, in conjunction with the image filter GUI component 202, may enable users (either mobile or web clients) to generate, via an image data template retrieved from an image data templates component 306 by the image filter engine 108, one or more image data using a set of user-selectable functions available through a GUI provided by the image filter GUI component 202. The image data component 206 is described in more detail below with respect to FIG. 4

The image filter data component 204 enables client devices 111 to display images retrieved from a source accessible by the programmatic client 106 of a device client 111. A set of user-selectable functions, available through a GUI provided by the image filter GUI component 202, enable the collection of image shapes as well as the assignment of image shapes and image data to an image filter. The image filter data component 204 is described in more detail below with respect to FIG. 5A

The image filter messaging component 210, in conjunction with the image filter GUI component 202, enables client devices 111 to generate messages related to image format URIs that include text, images, videos, and delivery recipients' URIs, etc. using a set of user-selectable functions available through a GUI provided by the image filter GUI component 202. The image filter messaging component 210 is described in more detail below with respect to FIG. 9.

The image filter communicator component 208 performs data exchanges (e.g., transmits and receives a set of serialized data (e.g., a set of data structures translated into a format that can be stored, for example, in a file or memory buffer, or transmitted, for example, across a network connection link and reconstructed later, possibly in a different computer environment) to and from an image filter publication application 122 via the network 104. The set of serialized data transmitted by the image filter communicator component 208 to the image filter publication application 122 may include, for example, text, images, videos, sets of image data, sets of image filters etc. The set of serialized data received by the image filter communicator component 208 from the image filter publication application 122 may include, for example, text, sets of serialized object graphs, URIs, URLs, etc. The image filter publication application 122 may store the set of serialized data received from the image filter communicator component 208 partially and/or in its entirety in file(s) and/or database(s). An image filter transformation component 302 of the image filter publication application 122 may further process the set of serialized data received from the image filter communicator component 208, for example by transforming image filters into one or more image filter formats that are thereafter stored in file(s) and/or database(s).

Image Filter Engine

Figure 4:
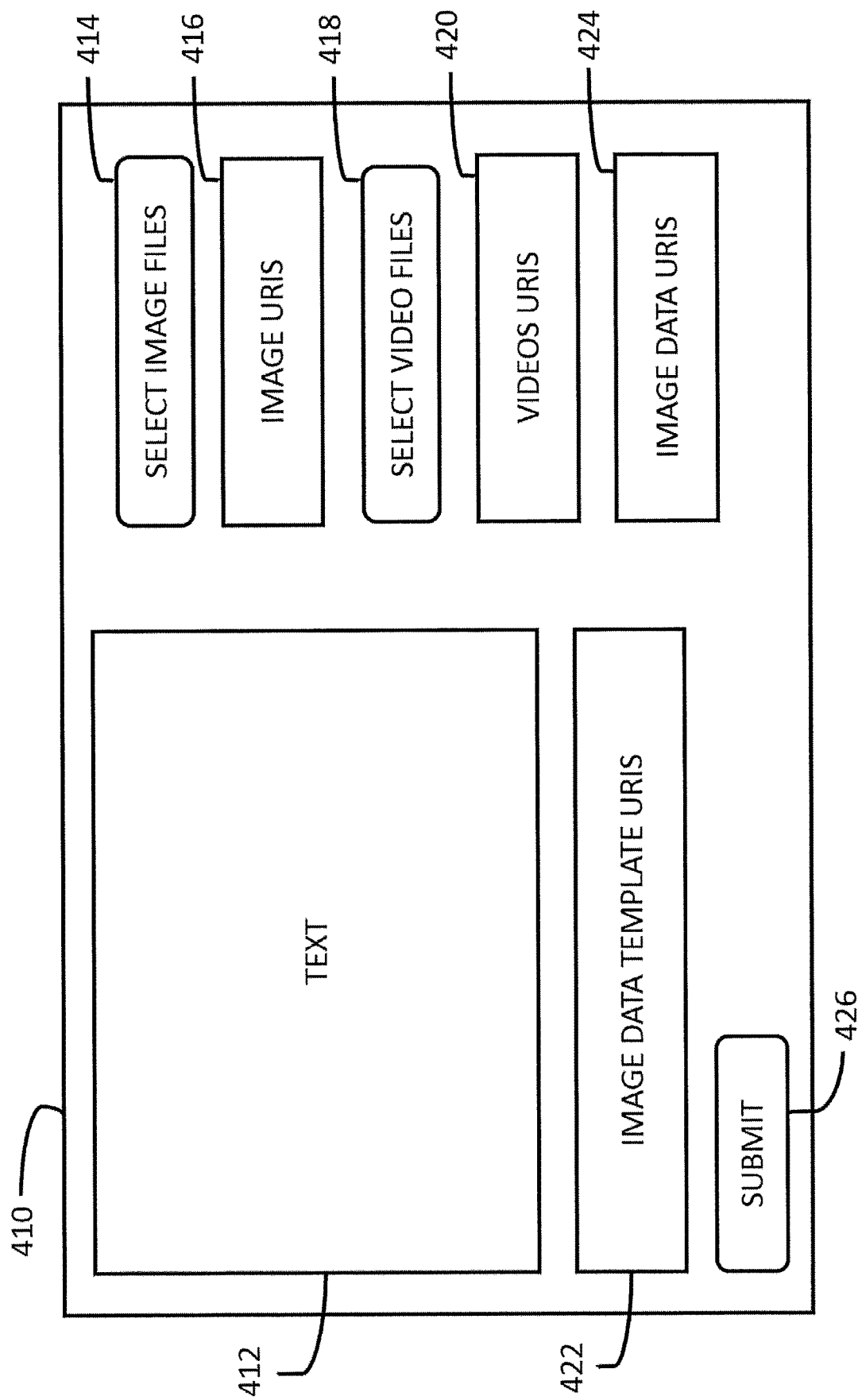
FIG. 4 illustrates an example graphical user interface for an image filter data component.

FIG. 4 illustrates an example of a GUI 410 to assemble image data. The GUI 410 displays a text box 412, a select image files button 414, an image URIs box 416, a select video files button 418, a video URIs box 420, an image data template URIs box 422, an image data URIs box 424, and a submit button 426. The text box 412 enables the client device 111 presenting the GUI to display text corresponding to textual user input (e.g., via a keyboard or virtual keyboard of a touch screen). When the client device 111 receives a selection of the select image files button 414, the client device 111 enables a user thereof to select image files stored on a source accessible by the programmatic client 106 of a client device 111. The image URIs box 416 may display and receive selections of image URIs. When the client device 111 receives a selection of the select video files button 418, the client device 111 enables a user thereof to select video files stored on a source accessible by the programmatic client 106 of a client device 111. The video URIs box 420 may display and receive selections of video URIs. The image data template URIs box 422 may display a list of image data template URIs retrieved from an image data templates component 306 of an image filter publication application 122. Moreover, the image data template URIs box 422 may receive a selection of an image data template URI from a displayed list of image data template URIs. The image data URIs box 424 may display a list of image data URIs retrieved from an image asset publication component 308 of an image filter publication application 122. Moreover, the image data URIs box 424 may receive a selection of an image data URI from a displayed list of image data URIs.

When the client device 111 receives a selection of the image data URIs box 424, the client device 111 enables a user thereof to select image data URIs. When the client device 111 receives a selection of the submit box 426, the image filter GUI component 202 assembles the input text and selected image files, image URIs, video files, video URIs, image data URIs and an image data GUI template URI into serialized data representing an image data, and transmits the serialized data via the image filter communicator component 208 to an image filter publication application 122 to be processed by an image asset publication component 308 as described in more detail in FIG. 6.

The image filter communicator component 208 may receive, from the image filter publication application 122, a URI assigned by the image asset publication component 308 to the transmitted image data and display that information via the GUI 410. The GUI 410 may display some URIs listing of image data transmitted to and stored by the image filter publication application 122 as being filtered by an individual user, a set of individual users, an entity (e.g., an organizational unit of some kind, for example a company, an institution, etc.), etc. in an image data URIs box 424. The client device 111 may receive indications to select, view and modify image data selected from the image data URIs box 424, and, therefore may receive an indication to submit the updated image data to the image filter publication application 122.

Figure 5A:
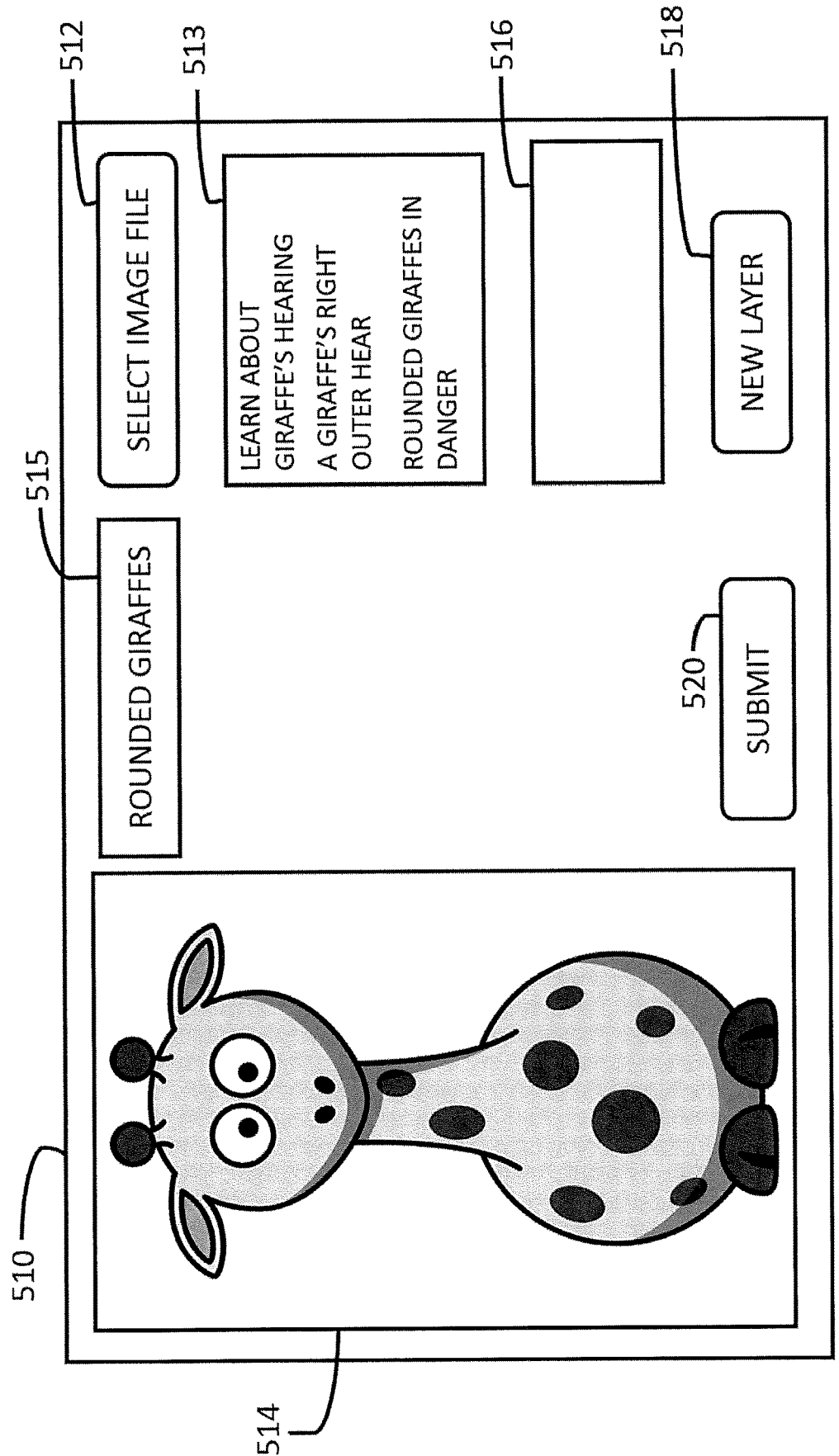
FIG. 5A through FIG. 5J illustrates operations of an image filter graphical user interface component and an image filter data component according to embodiments of the present disclosure.

FIG. 5A illustrates an example of a GUI 510 generated by an image filter GUI component 202 interfacing with an image filter data component 204 to assemble an image filter. The GUI 510 displays a select image file button 512, an image data URIs box 513, an image box 514, an image filter URI box 515, an image filter URIs box 516, a new layer button 518, and a submit button 520. When the client device 111 receives a selection of the select image file button 512, the client device 111 enables a user thereto to select an image file stored on a source accessible by the programmatic client 106 of the client device 111 for later transmission to an image filter publication application 122. The image box 514 displays a representation of an image file selected via the select image file box 512. The image box 514 may be configured to receive indications to zoom in (e.g., to increase the overall size of an object's representation in order to manipulate the object or view the object in greater detail), zoom out (e.g., to decrease the overall size of an object's representation in order to manipulate the object or view the object in lesser detail), and pan (e.g., shift the representation horizontally and/or vertically when the image representation is wider and/or taller than the image display area provided by the image box 514). The image data URIs box 513 displays a list of image data URIs filtered by an individual user, a set of individual users, an entity (e.g., an organizational unit such as a company, an institution, etc.), themes etc. Moreover, the image data URIs box 513 may receive a selection of one or more image data URIs from a displayed list of image data URIs. Image data URIs represented in the list of image data URIs may be associated (by means of a URI) with an image filter layer. In an example, the image data URIs box 513 may receive a selection of a URI ROUNDED GIRAFFES IN DANGER, effectively associating (by means of a URI) an image filter root layer with the selected image data. The image filter URI box 515 is configured to receive textual user input corresponding to the URI of a new image filter. The image filter URIs box 516 may display text corresponding to an organized URIs listing of image filters URIs. In the example illustrated in FIG. 5A, there are no previously assembled image filters and, therefore, the image filters URIs box 516 does not contain any text representing image filters URIs. When the client device 111 receives a selection of the submit button 520, the image engine 108 transmits data corresponding to a serialized image filter to the image filter publication application 122. After the image filter URI box 515 displays textual user input received by the client device 111 and when the client device 111 receives a selection of the new layer button 518, the client device 111 may assemble an image filter including an image filter root layer associated (e.g., by means of a URI) with the image (selected using the select image file button 512 and displayed in the image box 514) and image shape coordinates including the image surface and image data identified by the URI ROUNDED GIRAFFES IN DANGER.

Figure 5B:
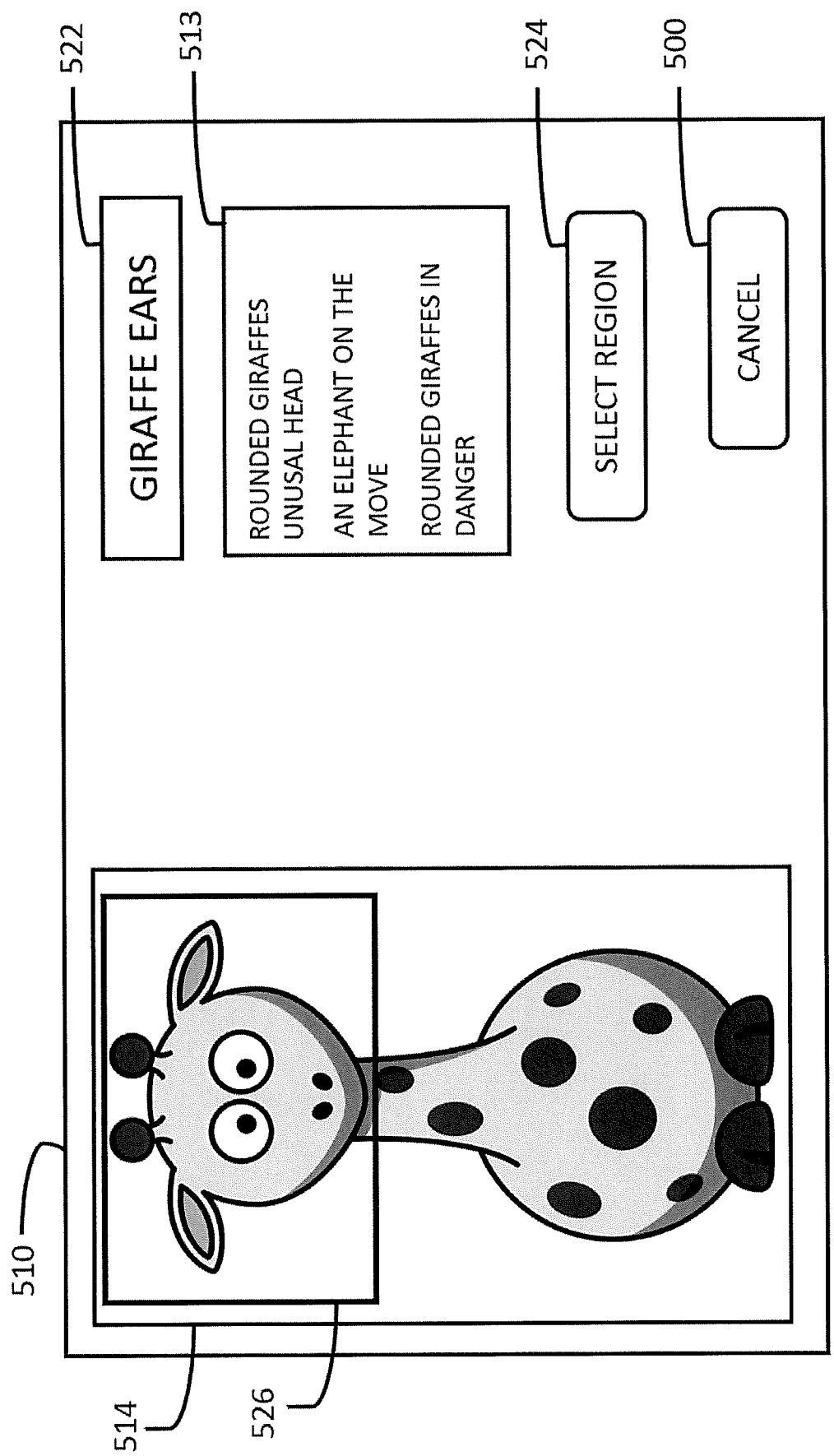

FIG. 5B illustrates an example of the GUI 510 after the client device 111 receives a selection of the new layer button 518, resulting in the commencement of assembling an image filter with a new image filter layer. The GUI 510 may no longer include the select image file button 512, the image filter URIs box 516 and the new layer button 518. Instead, the GUI 510 may include a layer name box 522, a select region button 524, a region selection box 526, and a cancel button 500. The layer name box 522 may display text corresponding to textual user input corresponding to a name of a new image filter layer or a modified name of an existing image filter layer. In the example illustrated in FIG. 5B, the layer name box 522 displays text corresponding to textual user input corresponding to an image filter layer name GIRAFFE EARS. The client device 111 may also receive a user selection of URI ROUNDED GIRAFFES UNUSAL HEAD displayed in the image data URIs box 513, causing the client device 111 to associate (by means of a URI) the image filter layer "GIRAFFE EARS" with the selected image data. The client device 111 may return the GUI 510 to the state illustrated in FIG. 5A when the client device 111 receives an indication of a selection of the cancel button 500.

The client device 111 may receive a selection of a region of the image displayed in the image box 514. The client device 111 may be configured to receive such selection after the client device 111 receives a selection of the select region button 524. In response to receiving the selection of the select region button 524, the client device 111 may cause the GUI 510 to present a region selection box 526 within the image box 514, thereby facilitating the selection of a section of the image displayed in the image box 514 by a user. Based on user input, the client device 111 may cause the GUI 510 to adjust the boundaries of the region selection box 526 to encompass a region of interest within the image displayed in the image box 514.

Figure 5C:
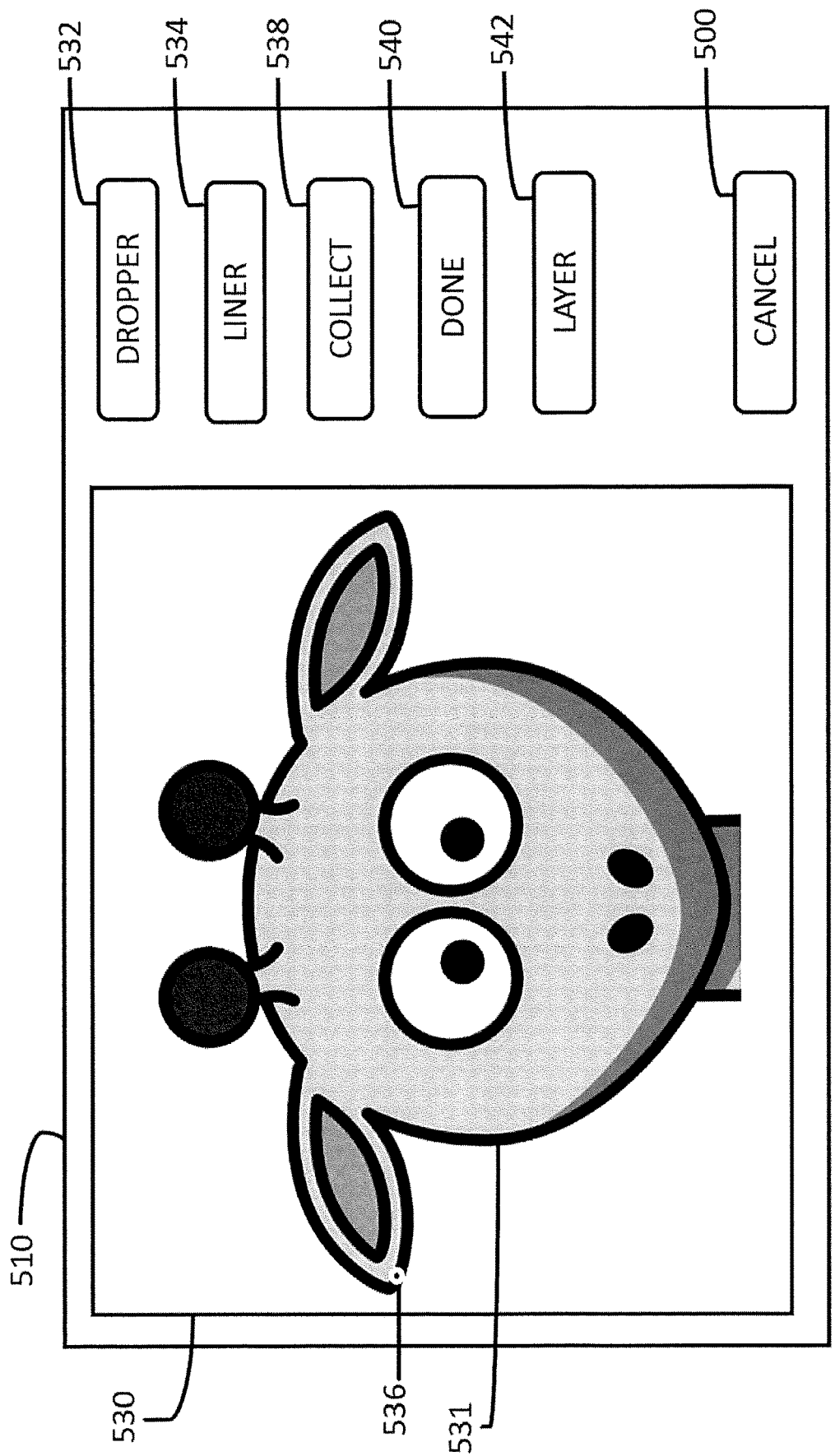

After the client device 111 receives a selection of the select region button 524, the client device 111 may begin receiving selections of an image shape located within the selected region (as illustrated in FIG. 5C).

The GUI 510 may no longer include the image box 514, the layer name box 522, the image data URIs box 513, the select region button 524 and the region selection box 526. Instead, the GUI 510 may include an SVG box 530, a dropper button 532, a liner button 534, a collect button 538, a done button 540, and a layer button 542. The image filter engine 108 generates a temporary image 531 by duplicating the pixels comprised within the surface defined by the aforementioned selected region and displays the temporary image 531 in the SVG box 530. The client device 111 may return the GUI 510 to the state illustrated in FIG. 5A when the client device 111 receives an indication of a selection of the cancel button 500. The client device 111 may return the GUI 510 to the state illustrated in FIG. 5B when the client device 111 receives an indication of a selection of the layer button 542.

The client device 111 may receive selections of an image shape's outer boundary coordinates after the client device 111 receives selections of either the dropper button 532 or the liner button 534. In the example illustrated in FIG. 5C, the client device 111 receives a selection of the dropper button 532. As the client device 111 receives input corresponding to a user selecting pixels of a shape's outer boundary, the client device 111 overlays the selected image pixels with a drop graphic (or other visual graphic) and registers the selected image pixels as the shapes' outer boundary coordinates.

In another example, the client device 111 may receive selections of a shape's outer boundary coordinates after receiving a selection of the liner button 534. As the client device 111 receives input corresponding to a user drawing a line over a shape's outer boundary, the client device 111 selects each pixel corresponding to the drawn line as the shape's outer boundary coordinates.

Figure 5D:
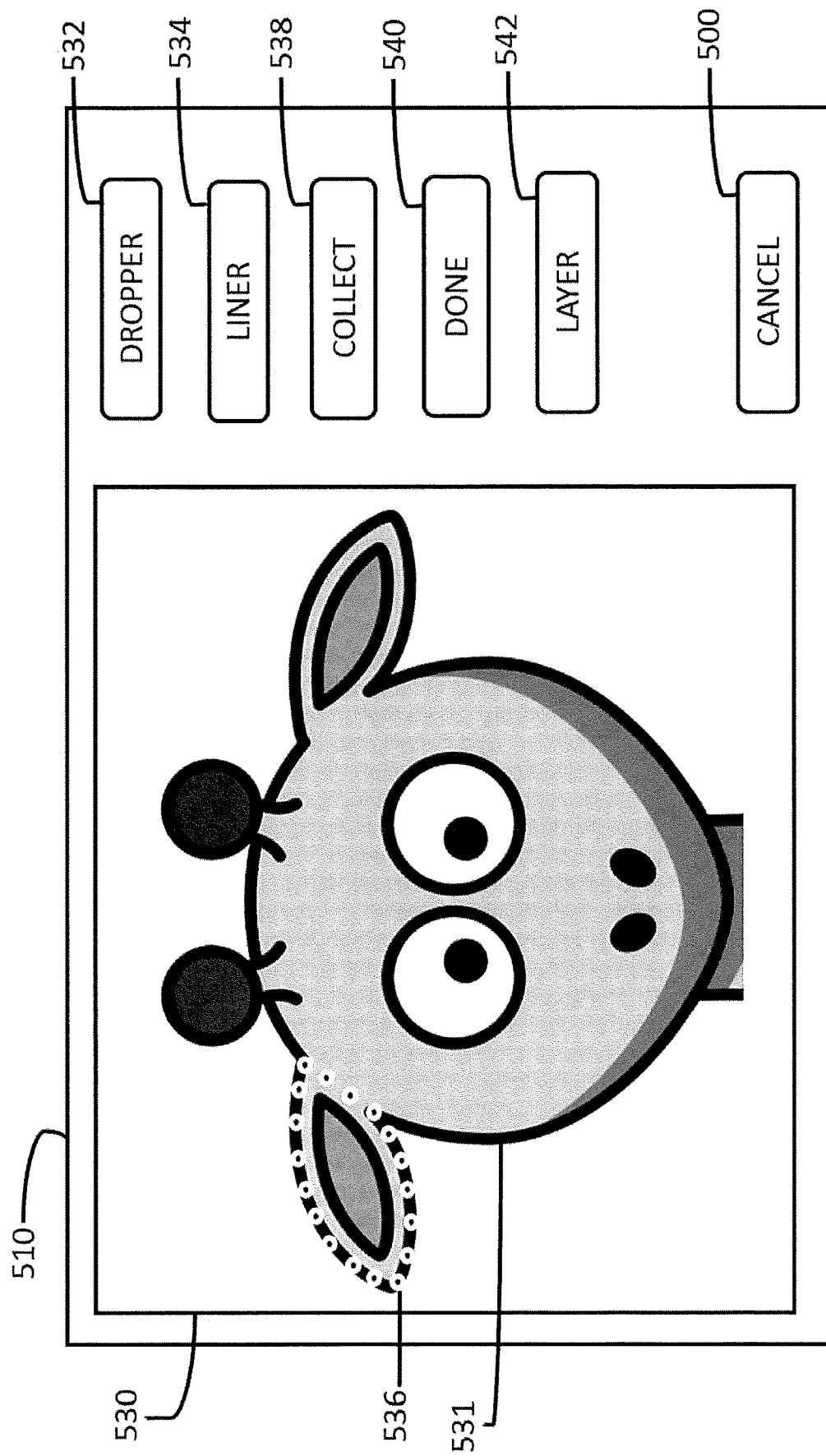

The client device 111 may receive alternating selections of the dropper button 532 and the liner button 534, thereby causing the client device 111 to switch between the two modes of coordinates collection. FIG. 5D illustrates a completed selection of an image shape's outer boundary coordinates. When the client device 111 receives a selection of the collect button 538, the client device 111 causes the GUI 510 to thereafter be presented as that shown in FIG. 5E.

Figure 5E:
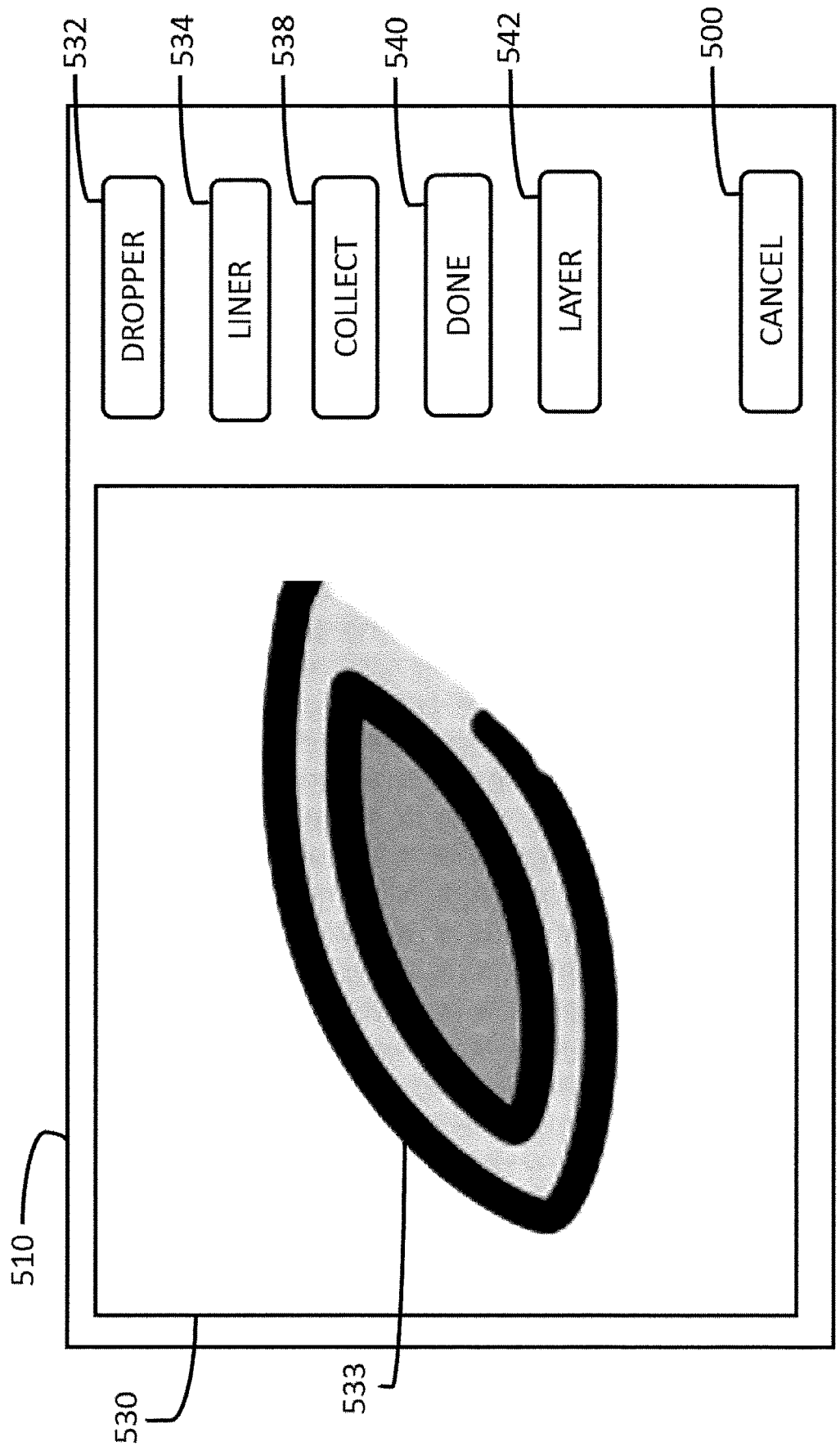

FIG. 5E illustrates an example of the GUI 510 after the client device 111 receives user selections of an image shape. The image filter engine 108 generates a temporary image 533 by duplicating the pixels within the image defined by the outer boundary coordinates of the aforementioned image shape and displays the temporary image 533 in the SVG box 530. In the illustrated example, the collected shape represents a giraffe left ear (as shown). In an example, the user may consider the image shape collected to be complete and, therefore, the client device 111 may receive a selection of the done button 540, resulting in the client device 111 presenting the GUI 510 in a state described in more detail below with respect to FIG. 5F. In another example, the user may be unsatisfied with the image shape collected and, therefore, the client device 111 may receive a selection of the layer button 542, thereby causing the client device 111 to present the GUI 510 to the state described in detail above with respect to FIG. 5B. In yet another example, the user may be unsatisfied with the image shape collected and, therefore, the client device 111 may receive a selection of the cancel button 500, thereby causing the client device 111 to return the GUI 510 to the state described in detail above with respect to FIG. 5A. The user may consider the image shape collected to be incomplete due to the user's intent being to collect an image shape representing a giraffe's left outer ear, not an image shape representing a giraffe's left ear as a whole. Therefore, the client device 111 may receive a selection of the dropper button 532 or the liner button 534, causing the client device 111 to present the GUI 510 in a state illustrated in FIGS. 5G and 5H.

Figure 5F:
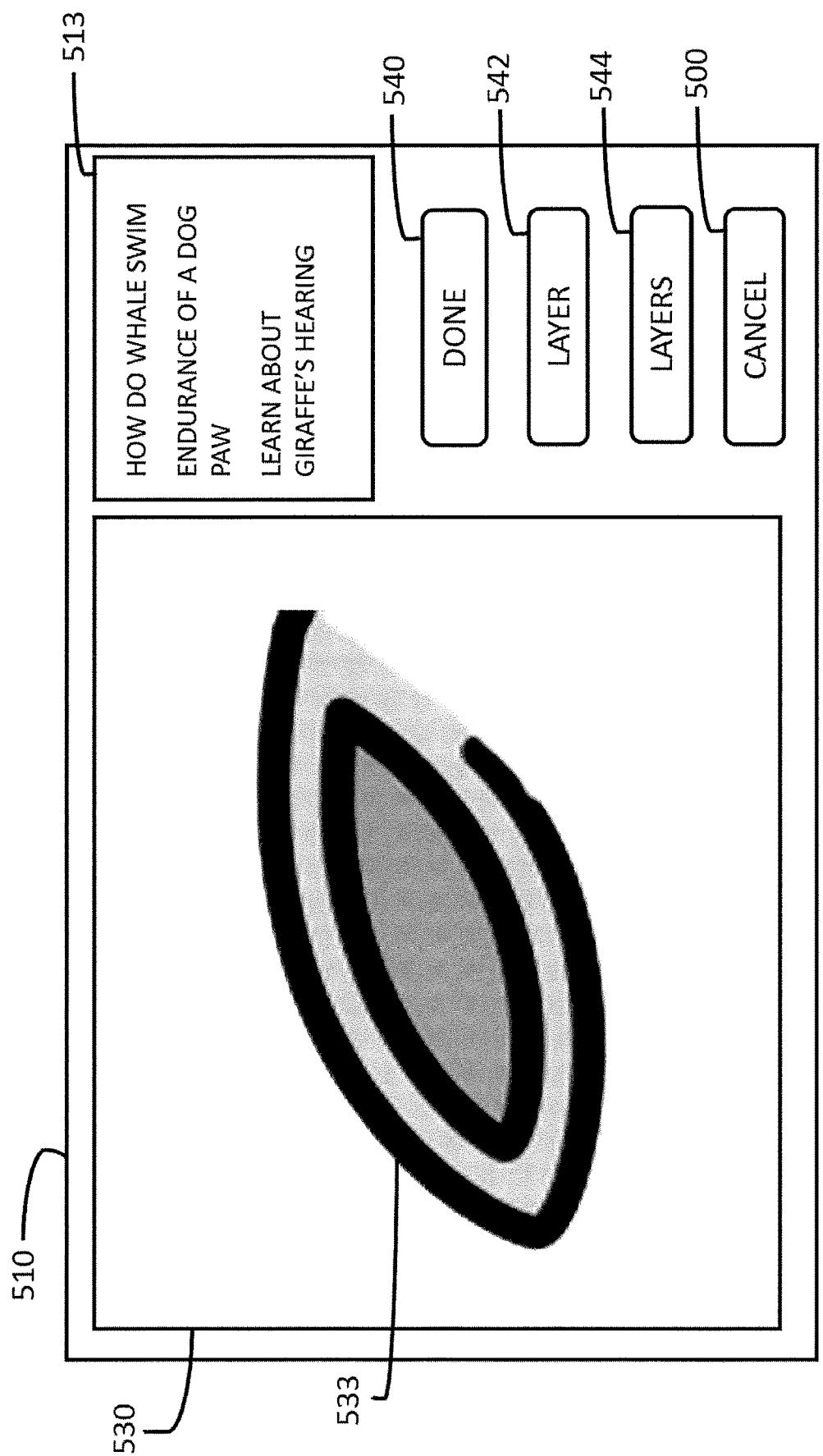

FIG. 5F illustrates the GUI 510 after the client device 111 receives a selection of the done button 540 illustrated in FIG. 5E. As illustrated in FIG. 5F, the GUI 510 no longer includes the dropper button 532, the liner button 534, or the collect button 538. Instead, the GUI 510 may include the image data URIs box 513 and a layers button 544. Selection of the layers button 544 enables a user to assemble a new image filter layer and associate it (e.g., by means of URI) in a child parent relationship with the image filter layer described with respect to FIG. 5B. In an example, the user may be unsatisfied with the image shape collected and, therefore, the client device 111 may receive a selection of the layer button 542, resulting in the client device 111 presenting the GUI 510 in the state described with respect to FIG. 5B above. If the user is unsatisfied with the image shape collected, for example, the client device 111 may receive a selection of the cancel button 500 to return the GUI 510 to the state described with respect to FIG. 5A above. Alternatively, the client device 111 may receive a selection of one or more image data URIs presented in the image data URIs box 513. In the example illustrated in FIG. 5F, the client device 111 receives a selection of the URI of a document narrating a giraffe's hearing capacity (e.g. LEARN ABOUT GIRAFFE'S HEARING) listed in the image data URIs box 513. When the client device 111 receives a selection of the done button 540, the client device 111 associates (e.g., by means of a URI) the selected image data URI with the image shape as well as associates (e.g., by means of a URI) the image shape with the image filter's layer described with respect to FIG. 5B. Thereafter, the client device 111 may return the GUI 510 to the state described with respect to FIG. 5C above.

Figure 5G:
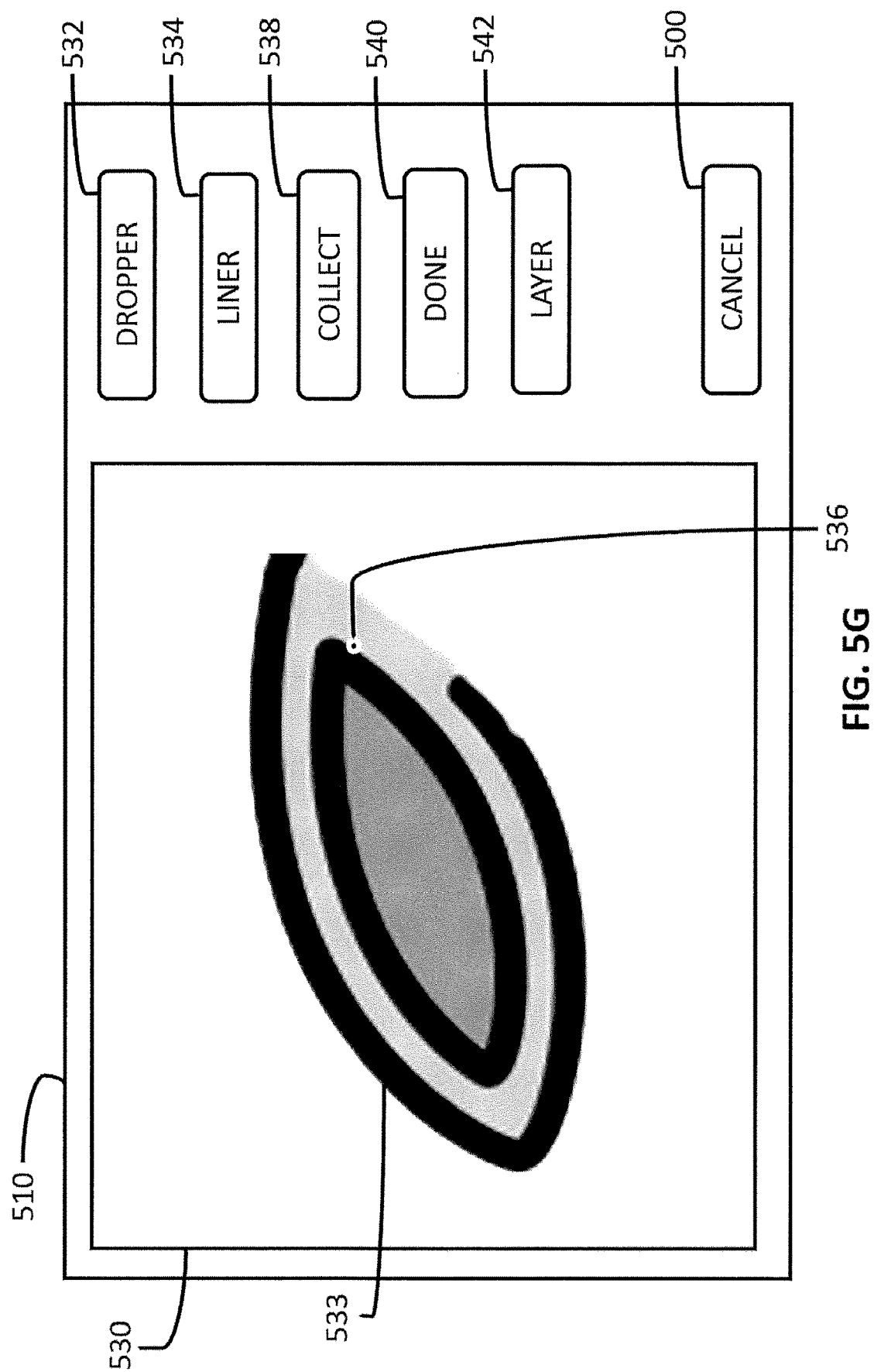
Figure 5H:
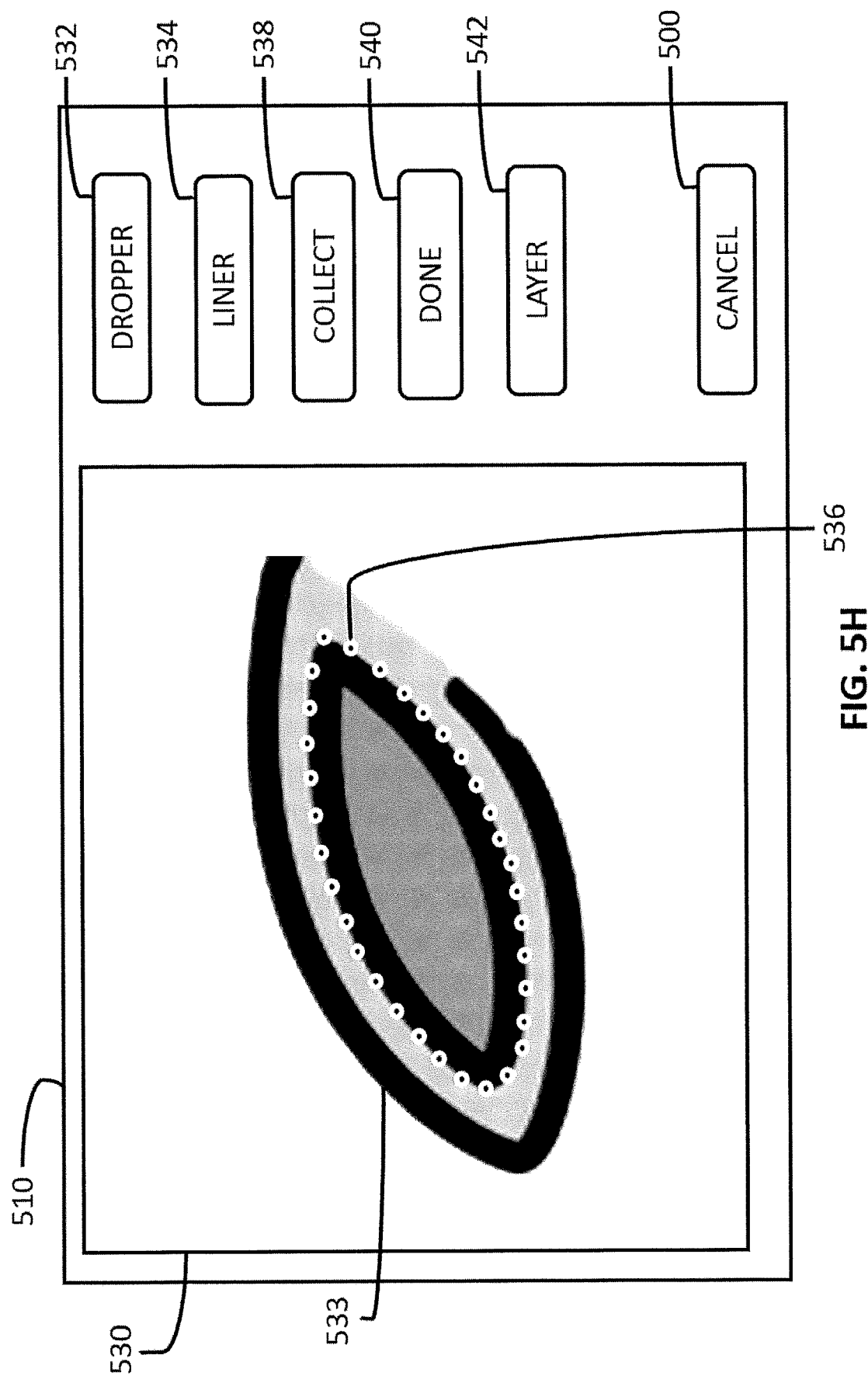

FIG. 5G and FIG. 5H illustrate an example of the GUI 510 as the client device 111 receives selections of an additional shape's outer boundary coordinates. The GUI 510 may no longer include the image URIs box 513 or the layers button 544. Instead, the GUI 510 may include the dropper button 532, the liner button 534 and the collect button 538. The GUI 510 may return to the state described with respect to FIG. 5A above if the client device 111 receives a selection of the cancel button 500. The GUI 510 may return to the state described with respect to FIG. 5B above if the client device 111 receives a selection of the layer button 542. As illustrated in FIG. 5G, after the client device 111 receives a selection of the dropper button 532, the client device may receive selections of a shape's outer boundary coordinates (e.g., a user may select some of the pixels of the temporary image 533). The client device 111 thereafter overlays the selected image pixels with a drop graphic 536. Alternatively, after the client device 111 receives a selection of the liner button 534, the client device 111 may receive selections of a shape's outer boundary coordinates. As the client device 111 receives user input corresponding to a drawn line over the aforementioned boundary, the client device 111 may associate each pixel corresponding to the drawn line as a coordinate of the shape's outer boundary. The client device 111 may receive alternating selections of the dropper button 532 and the liner button 534, resulting in the client device 111 switching between the two modes of coordinates collection. FIG. 5H illustrates the GUI 510 after the user completes the selection of an image shape's coordinates. When the client device 111 receives a selection of the collect button 538, the client device 111 presents an image of the image shape as illustrated and described in more detail with respect to FIG. 5I.

Figure 5I:
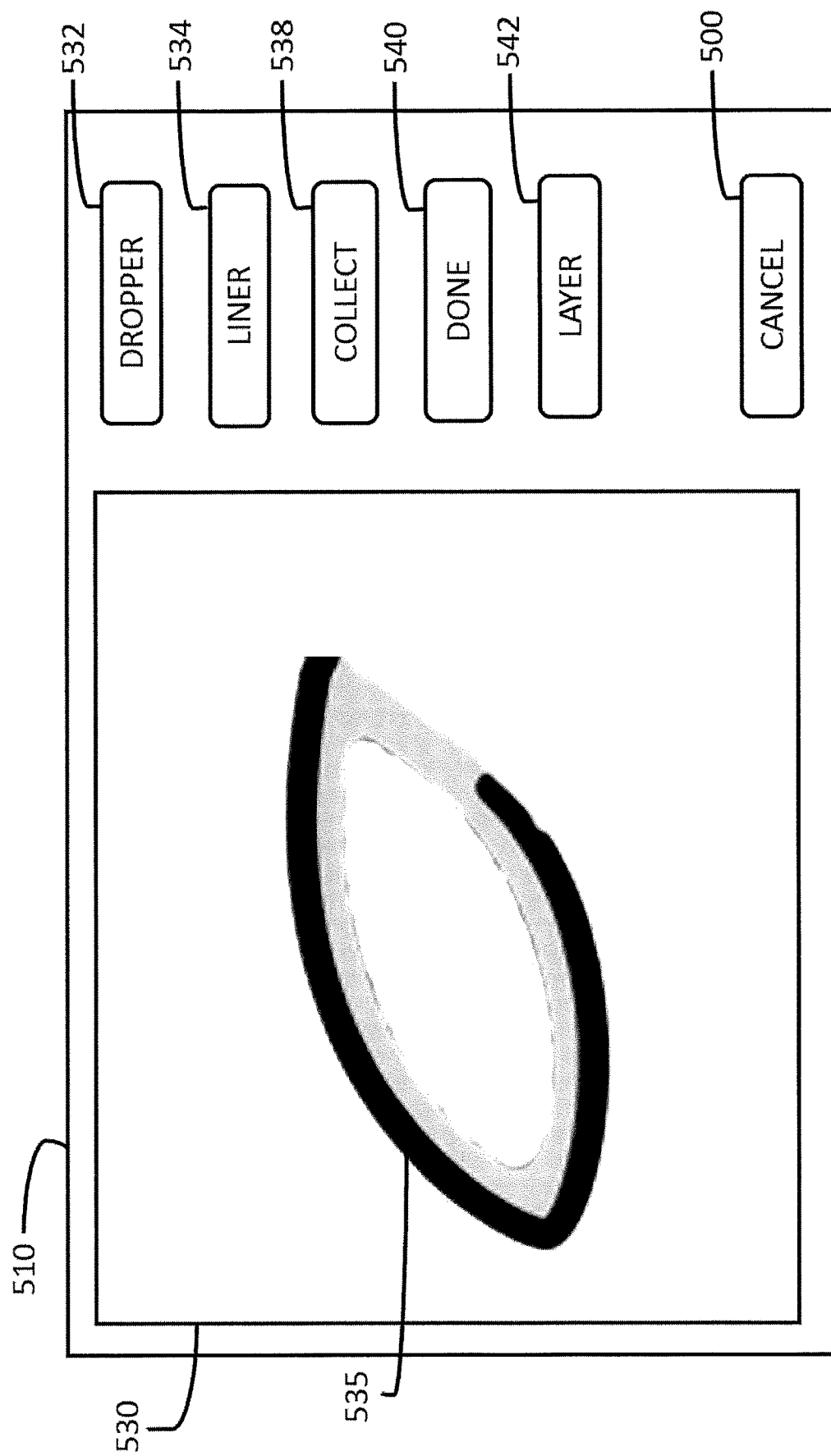

FIG. 5I illustrates an example of the GUI 510 presenting the image shape collected in FIG. 5H. An image shape includes a set of shapes outer boundaries coordinates. For example, the first element of such set may represent an inclusive shape, whereas all other elements of such set may represent exclusive shapes. Therefore, the image filter engine 108 generates a temporary image 535 duplicating the pixels included within the surface defined by an image shape's inclusive shape stripped of all pixels included within the surfaces defined by a shape's set of exclusive shapes and displays the temporary image 535 in the SVG box 530 as illustrated in FIG. 5I. If the client device 111 receives a selection of the done button 540 (e.g., due to the user being satisfied with the image shape collected), the GUI 510 may be presented in a state described with respect to FIG. 5J herein. The client device 111 may alternatively receive a selection of the layer button 542 (e.g., due to the user being unsatisfied with the image shape collected), resulting in the GUI 510 being returned to the state described with respect to FIG. 5B. The client device 111 may alternatively receive a selection of the cancel button 500 (e.g., due to the user being unsatisfied with the image shape collected), resulting in the GUI 510 being returned to the state described with respect to FIG. 5A. If the user desires to collect an additional shape's outer boundary coordinates to be excluded from the inclusive shape, the processes described with respect to FIG. 5G and FIG. 5H may be repeated.

Figure 5J:
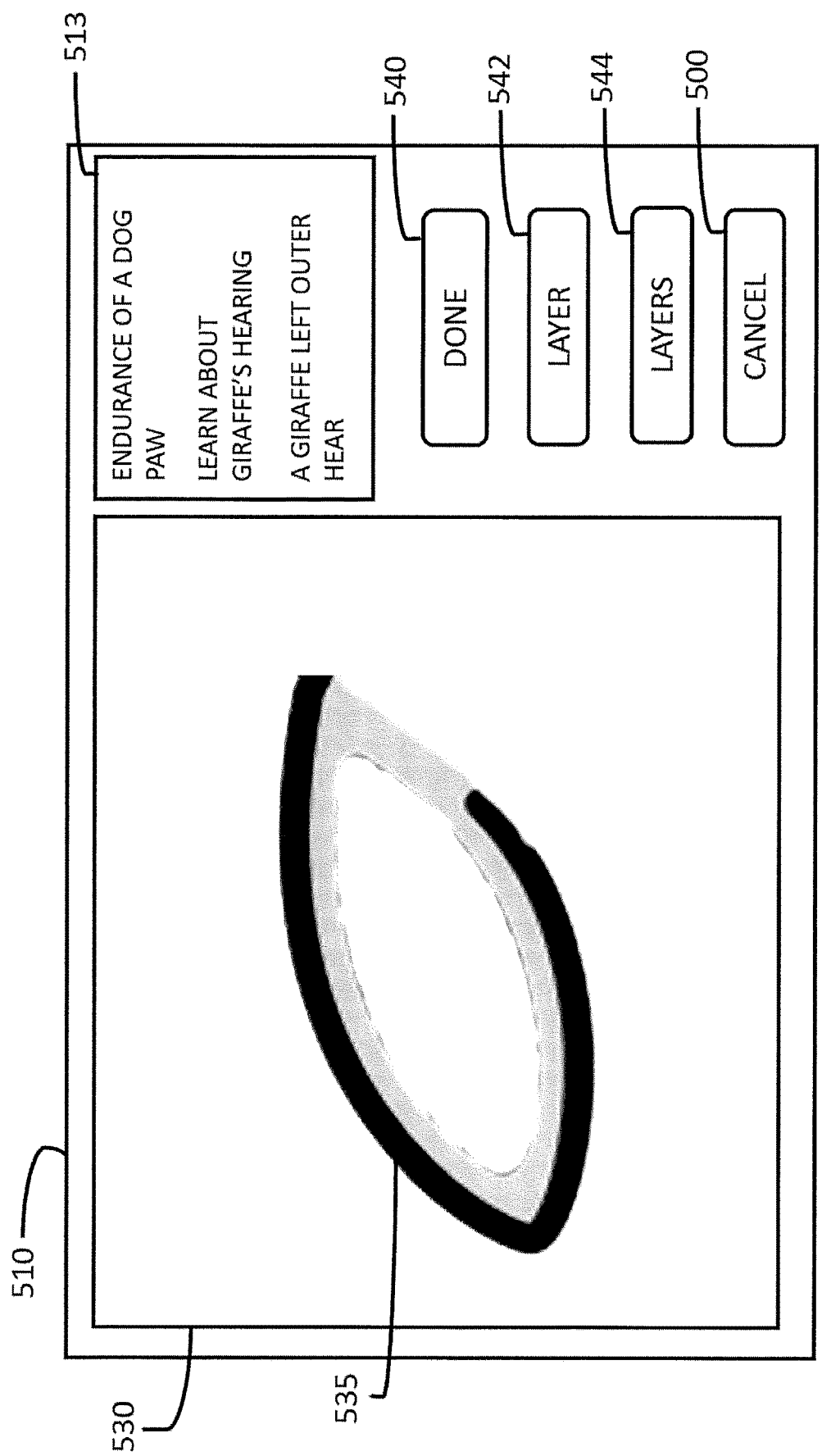

FIG. 5J illustrates the GUI 510 after the client device 111 receives a selection of the done button 540 described with respect to FIG. 5I. The GUI 510 may not include the dropper button 532, the liner button 534, or the collect button 538. However, the GUI 510 may include an image data URIs box 513 and a layers button 544. The client device 111 may receive a selection of the layer button 542 (e.g., due to the user being unsatisfied with the image shape collected), resulting in the GUI 510 being returned to the state described with respect to FIG. 5B. The client device 111 may alternatively receive a selection of the cancel button 500 (e.g., due to the user being unsatisfied with the image shape collected), resulting in the GUI 510 being returned to the state described with respect to FIG. 5A. As illustrated in FIG. 5J, the client device 111 may receive a selection associated with the image data URIs box 513 and corresponding to the URI of a document narrating a giraffe's hearing capacity (e.g. LEARN ABOUT GIRAFFE'S HEARING) and the URI of a document narrating the composition of a giraffe's left outer hear (e.g. A GIRAFFE LEFT OUTER HEAR). When the client device 111 receives a selection of the done button 540, the client device 111 associates (e.g., by means of a URI) the selected image data URIs with the image shape as well as associates (e.g., by means of a URI) the image shape to the image filter's layer described with respect to FIG. 5B. The client device 111 may thereafter return the GUI 510 to the state described with respect to FIG. 5C. If the user decides to collect an additional image shape, such as a giraffe right outer ear, the processes described with respect to FIG. 5C, FIG. 5D, FIG. 5E, FIG. 5F, FIG. 5G, FIG. 5F and FIG. 5I may be repeated, with the notable differences of, in FIG. 5C and FIG. 5D, selecting an image shape encompassing the giraffe's right ear, of, in FIG. 5E, displaying a collected shape representing a giraffe right ear, of, in FIG. 5G and FIG. 5H, collecting the shape's outer boundary coordinates of the giraffe's right inner hear and in FIG. 5J, selecting from the image data URIs box 513, the URI of a document narrating a giraffe's hearing capacity (e.g. LEARN ABOUT GIRAFFE'S HEARING) and the URI of a document narrating the composition of a giraffe's right outer hear (e.g. A GIRAFFE RIGHT OUTER HEAR). When the client device 111 receives a selection of the done button 540, the client device 111 associates (e.g., by means of a URI) the selected image data URIs with the image shape as well as associates (e.g., by means of a URI) the image shape to the image filter's layer described with respect to FIG. 5B. The client device 111 thereafter returns the GUI 510 to the state described with respect to FIG. 5C.

Figure 5K:
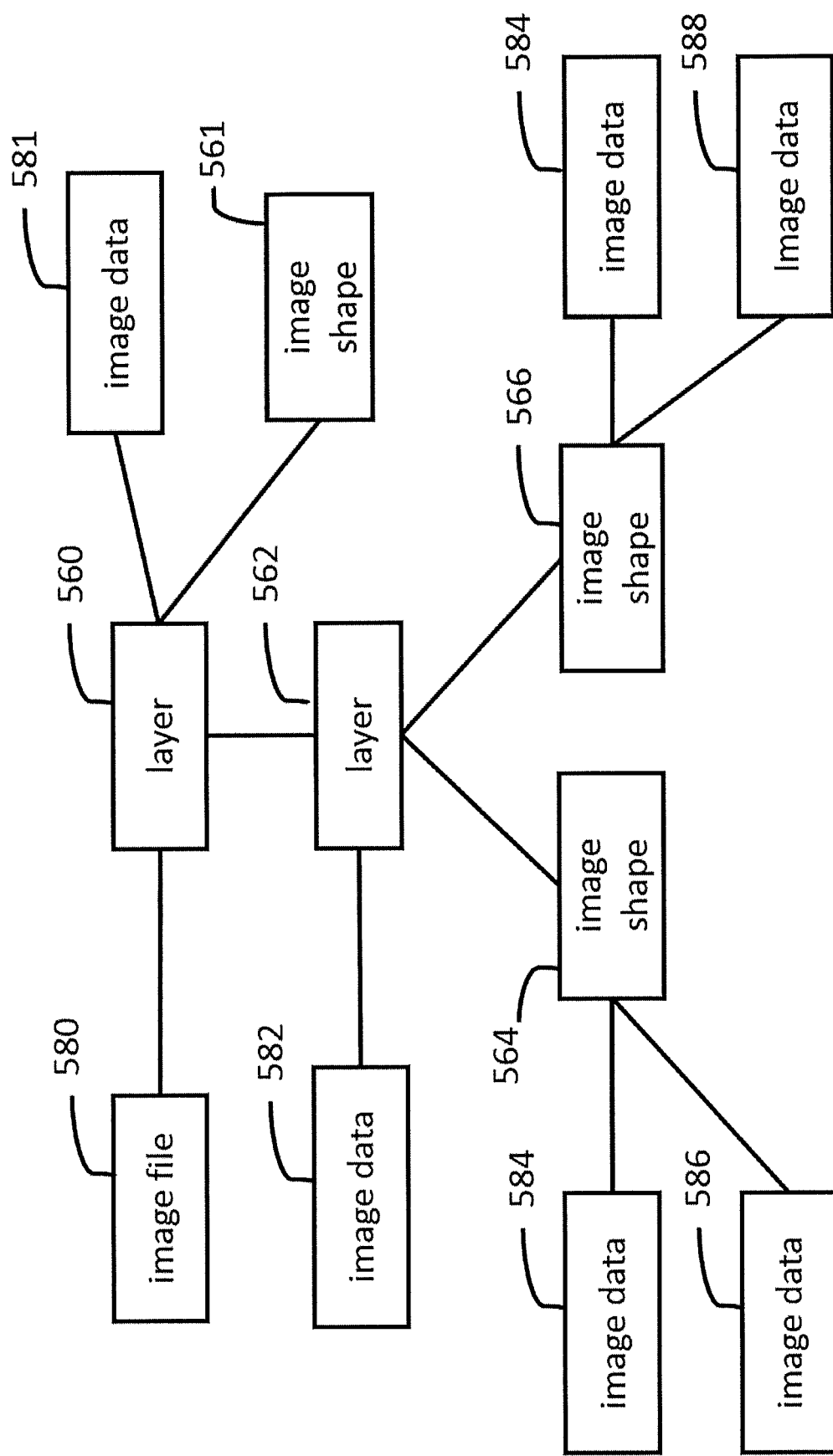
FIG. 5K illustrates an object model graph assembled by an image filter data component according to embodiments of the present disclosure.

FIG. 5K illustrates a diagram of the state of an image filter after the processes described with respect to FIG. 5J are performed. The image filter layer 560 is the root of the image filter and is associated (e.g., by means of URIs) with the image file 580 selected by the user in the select image file box 512 in FIG. 5A, image data 581 identified by a URI ROUNDED GIRAFFES IN DANGER and an image shape 561 representing the entire image. The image filter layer 562 is associated (e.g., by means of a child parent relationship) with the image filter layer 560 and associated, by means of a URI ROUNDED GIRAFFES UNUSUAL HEAD selected by the user from an image data URIs box 513 as described with respect to FIG. 5B, with image data 582. The image filter layer 562 is associated (e.g., by means of a URI) with two image shapes 564 and 566, the image shape 564 representing the giraffe's left outer hear and the image shape 566 representing the giraffe's right outer hear. The image shape 564 is associated (e.g., by means of URIs) with image data 584 identified by a URI LEARN ABOUT GIRAFFE'S HEARING and image data 586 identified by a URI A GIRAFFE LEFT OUTER HEAR. The image shape 566 is associated (e.g., by means of URIs) with image data 584 identified by a URI LEARN ABOUT GIRAFFE'S HEARING and image data 588 identified by a URI A GIRAFFE RIGHT OUTER HEAR. Since the image shape 564 and the image shape 566 are part of the same layer 562, when a GUI receives an indication (e.g., hover or selection) of either the image shape 564 or the image shape 566, the GUI emphasizes both the image shape 564 and the image shape 566.

Figure 5L:
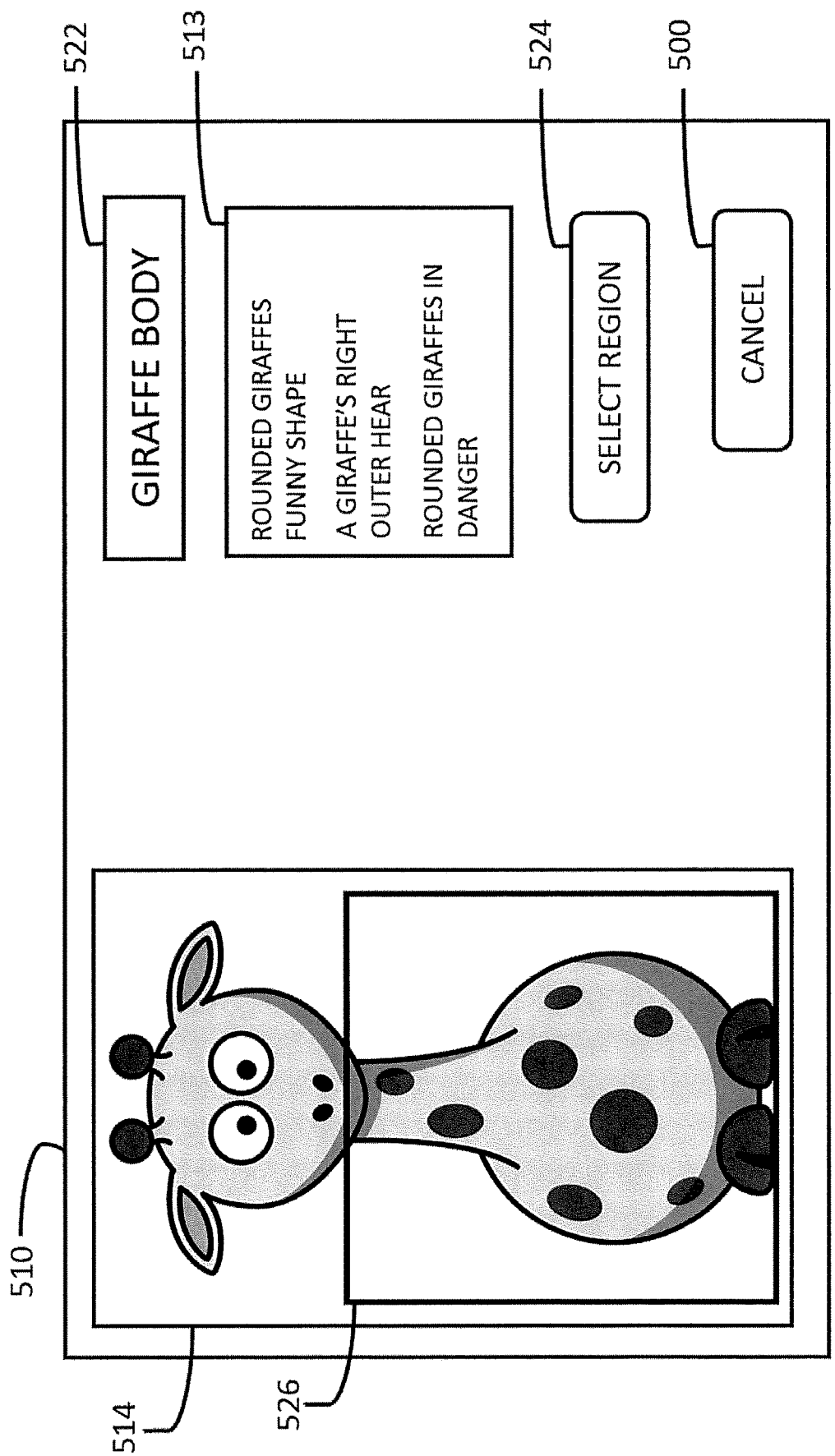

FIG. 5L illustrates an example of the GUI 510 after the client device 111 receives a selection of the new layer button 518 to start assembling an image filter's new layer as described with respect to FIG. 5A. The GUI 510 may not include the select image file box 512, the image filter URI box 515, the image filters URIs box 516, or the new layer button 518. Nonetheless, the GUI 510 may include a name box 522, an image data URIs box 513, a select region button 524, a selection box 526 and a cancel button 500. The client device 111 may receive user textual input corresponding to the name GIRAFFE BODY in the name box 522 as well as a selection of the image data URI ROUNDED GIRAFFES FUNNY SHAPE in the image data URIs box 513, resulting in the client device 111 associating (by means of a URI) the new image filter layer with the selected image data. The client device 111 may return the GUI 510 to the state illustrated in FIG. 5A when the client device 111 receives a selection of the cancel button 500. The client device 111 may receive a selection of a region of the image displayed in the image box 514 and may thereafter present the region selection box 526, facilitating the visual selection of a section of the image displayed in the image box 514. The client device 111 may adjust the boundaries of the region selection box 526, to encompass a region of interest within the image displayed in the image box 514, in response to corresponding user input. The client device 111 may receive a selection of the region button 524 and may thereafter receive user input corresponding to selections of an image shape located within the selected region, as described in more detail below with respect to FIG. 5M and FIG. 5N.

Figure 5M:
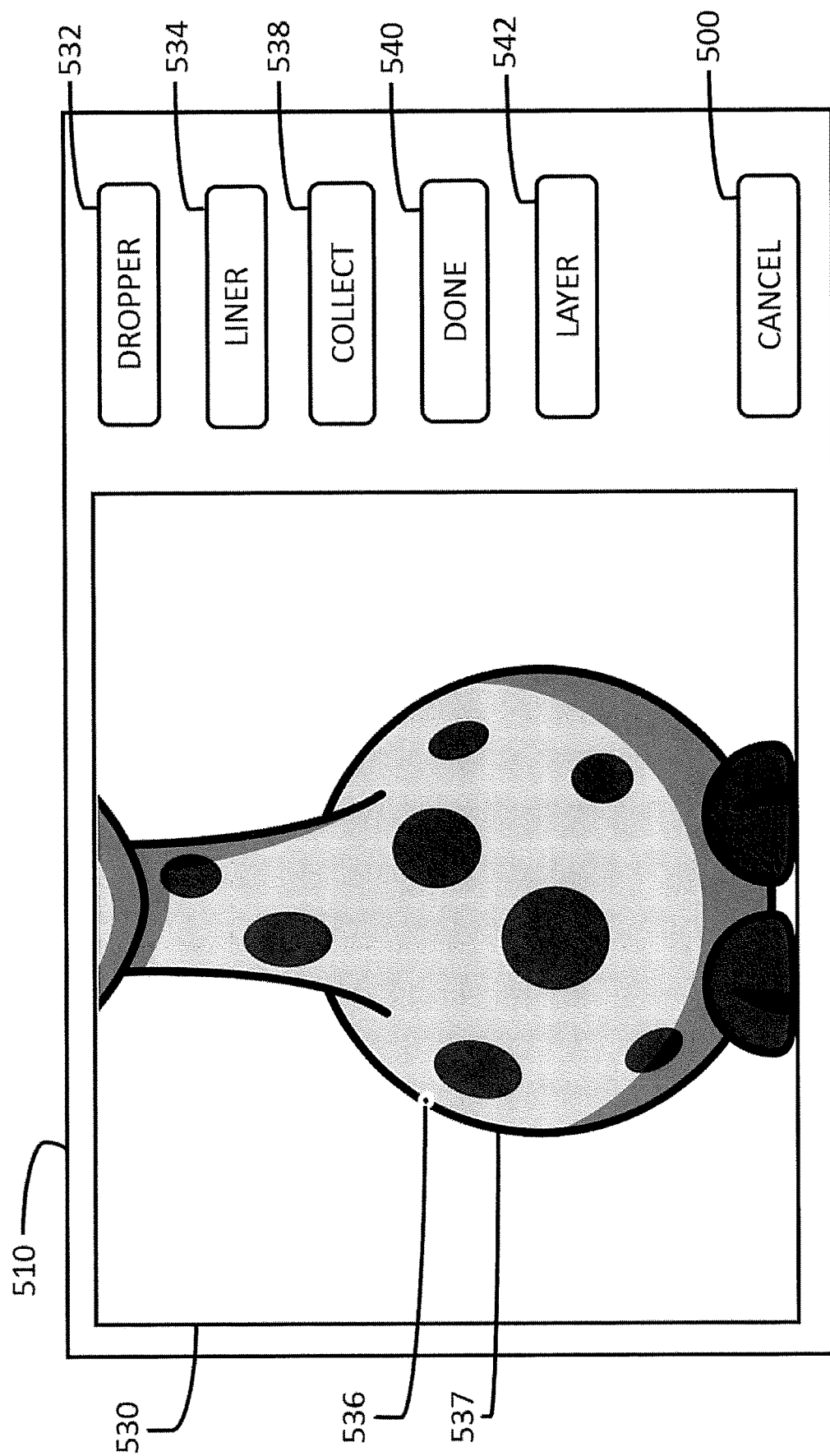
Figure 5N:
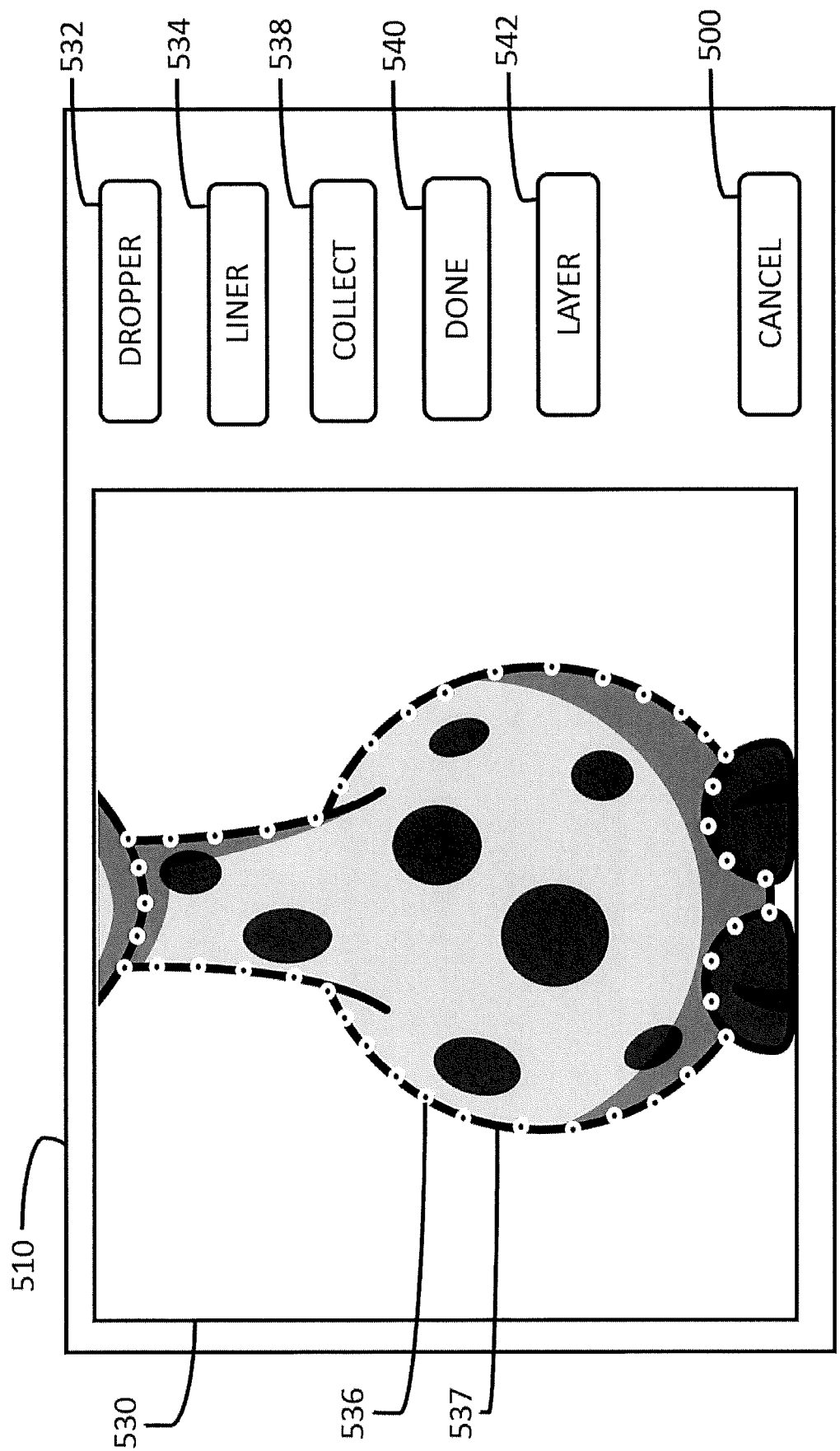
Figure 50:
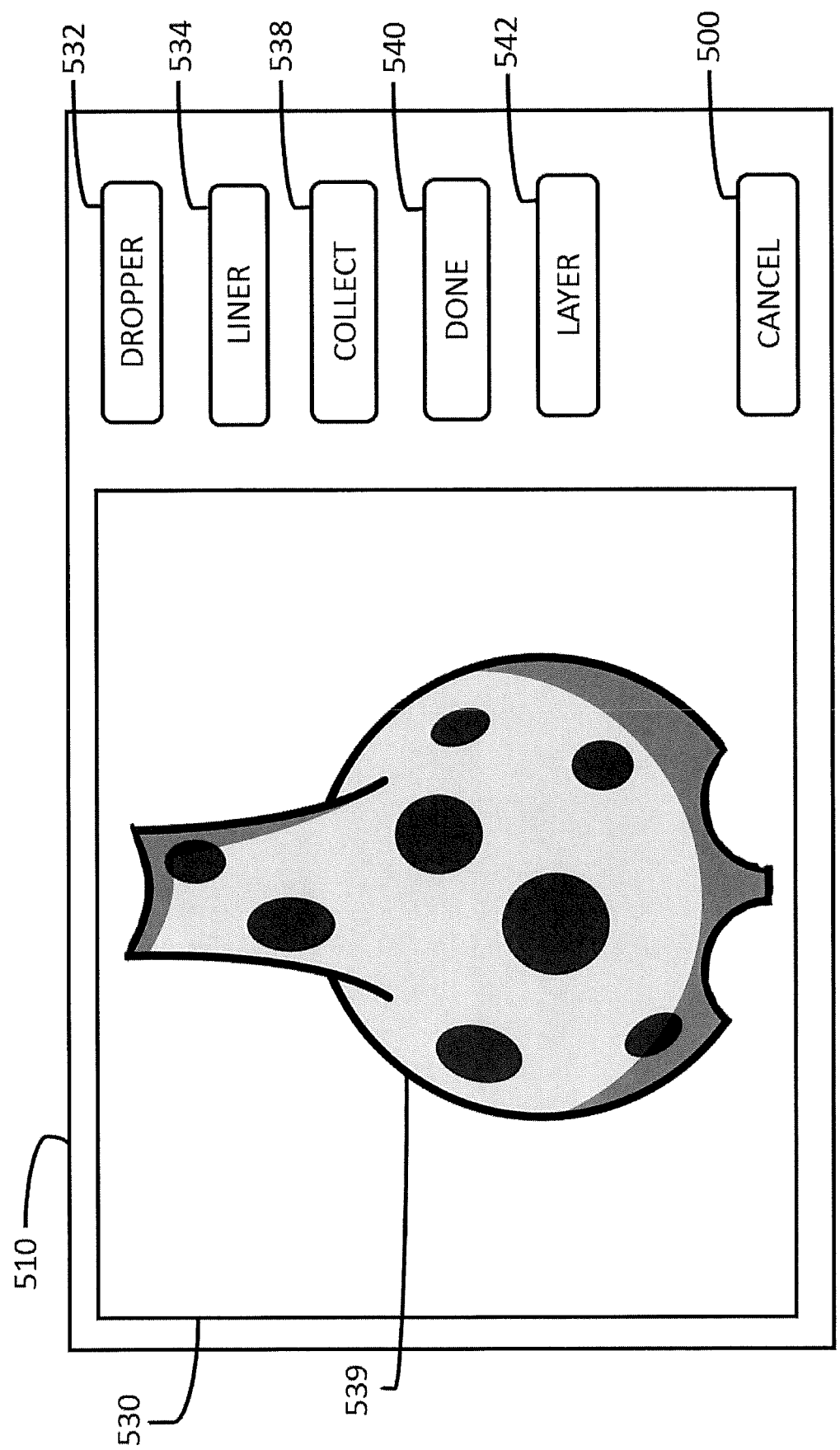

FIG. 5M and FIG. 5N illustrate the GUI 510 after the client device 111 receives a selection of a section of an image displayed in the image box 514 as described with respect to FIG. 5L. The GUI 510 may not include the image box 514, the layer name box 522, the image data URIs box 513, the select region button 524, or the region selection box 526. Nonetheless, the GUI 510 may include an SVG box 530, a dropper button 532, a liner button 534, a collect button 538, a done button 540, and a layer button 542. The image filter engine 108 generates a temporary image 537 by duplicating the pixels included within the surface defined by the aforementioned selected section and displays the temporary image 537 in the SVG box 530. The client device 111 may return the GUI 510 to the state illustrated in FIG. 5A if the client device 111 receives a selection of the cancel button 500. The client device 111 may alternatively return the GUI 510 to the state illustrated in FIG. 5L if the client device 111 receives a selection of the layer button 542. The client device 111 may receive selections of coordinates of an image shape after the client device 111 receives a selection of either the dropper button 532 or the liner button 534. As illustrated in FIG. 5M, the client device 111 may receive a selection of the dropper button 532 and thereafter receive selections of an image shape outer boundary coordinates (e.g., the user may click on some of the image's pixels). The client device 111 may overlay the selected image pixels with a drop graphic 536, or other visual indicator. The client device 111 may receive selections of a shape's outer boundary coordinates after receiving a selection of the liner button 534. As the client device 111 receives user input corresponding to a drawn line over a shape's outer boundary, the client device 111 may select each pixel associated with the drawn line as a shape's outer boundary coordinate. The client device 111 may receive alternating selections of the dropper button 532 and the liner button 534, causing the client device 111 to switch between the two modes of coordinates collection. FIG. 5N illustrates the GUI 510 after the user completes the selection of an image shape's outer boundary coordinates.

FIG. 5O illustrates an example of the GUI 510 after the client device 111 receives a selection of the collect button 538 illustrated in FIG. 5N. The image filter engine 108 generates a temporary image 539 by duplicating the pixels comprised within the surface defined by the outer boundary coordinates of the aforementioned image shape and displays the temporary image 539 in the SVG box 530. In the example illustrated in FIG. 5O, the collected shape represents a giraffe neck and belly shape. The client device 111 may receive a selection of the layer button 542 (e.g., due to the user being unsatisfied with the image shape collected), resulting in the client device 111 returning the GUI 510 to the state described with respect to FIG. 5L. The client device 111 may alternatively receive a selection of the cancel button 500 (e.g., due to the user being unsatisfied with the image shape collected), resulting in the client device 111 returning the GUI 510 to the state described with respect to FIG. 5A.

Figure 5P:
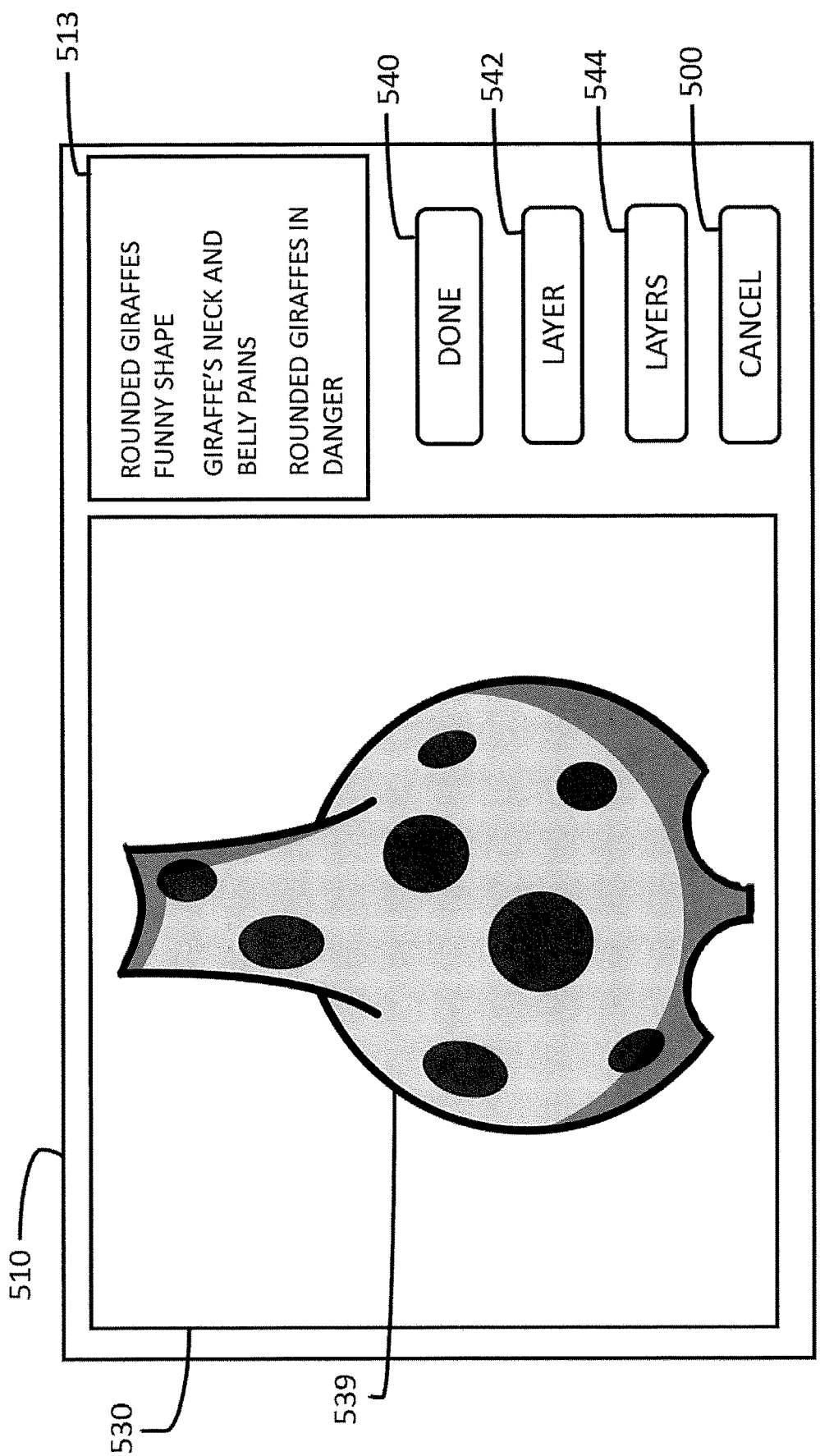

If the client device 111 receives a selection of the done button 540 (e.g., due to the user considering the image shape collected to be complete), the client device 111 presents the GUI 510 described illustrated in FIG. 5P. The GUI 510 may not include the dropper button 532, the liner button 534, or the collect button 538. Nonetheless, the GUI 510 may include the image data URIs box 513 and a layers button 544. In response to the client device 111 receiving a selection of the layers button 544, the client device 111 may assemble a new image filter layer and associate it (e.g., by means of URI) in a child parent relationship with the image filter layer described with respect to FIG. 5L. The client device 111 may receive a selection of the layer button 542 (e.g., due to the user being unsatisfied with the image shape collected), resulting in the client device 111 returning the GUI 510 to the state illustrated in FIG. 5L. The client device 111 may alternatively receive a selection of the cancel button 500 (e.g., due to the user being unsatisfied with the image shape collected) resulting in the client device 111 returning the GUI 510 to the state illustrate in FIG. 5A. The client device 111 may alternatively receive one or more selections of one or more of the image data URIs listed in the image data URIs box 513 In an example, the client device 111 may receive a selection of the URI of a document narrating a giraffe's neck and belly pains (e.g., GIRAFFE'S NECK AND BELLY PAINS) listed in the image data URIs box 513, and may associate (e.g., by means of a URI) the selected image data URI with the image shape.

In an example, the user may desire to assemble an additional image filter layer wherein the new image filter layer is a child of the image filter layer described with respect to FIG. 5L. Accordingly, the client device 111 may receive a selection of the layers button 544, resulting in the client device 111 presenting the GUI 510 illustrated in FIG. 5Q. The GUI 510 may not include the image data URIs box 513, the SVG box 530, the done button 540, the layer button 542, or the layers button 544. However, the GUI 510 may include a name box 522, an image data URIs box 513, an image box 514, a select region button 524, and a selection box 526. As illustrated, the client device 111 may receive user textual input, corresponding to "MARKINGS" with respect to the name box 522. Additionally, the client device 111 may receive a selection of the image data URI A GIRAFFE'S MARKINGS in the image data URIs box 513, resulting in the client device 111 associating (by means of a URI), the new image filter layer with the selected image data. The client device 111 may return the GUI 510 to the state illustrated in FIG. 5P in response to receiving a selection of the cancel button 500. The client device 111 may receive a selection of the select region button 524 and may thereafter receive a selection of a region of the image displayed in the image box 514, resulting in the client device 111 presenting the region selection box 526. The client device 111 may adjust the boundaries of the region selection box 526, to encompass a region of interest within the image displayed in the image box 514, in response to user input.

Figure 5Q:
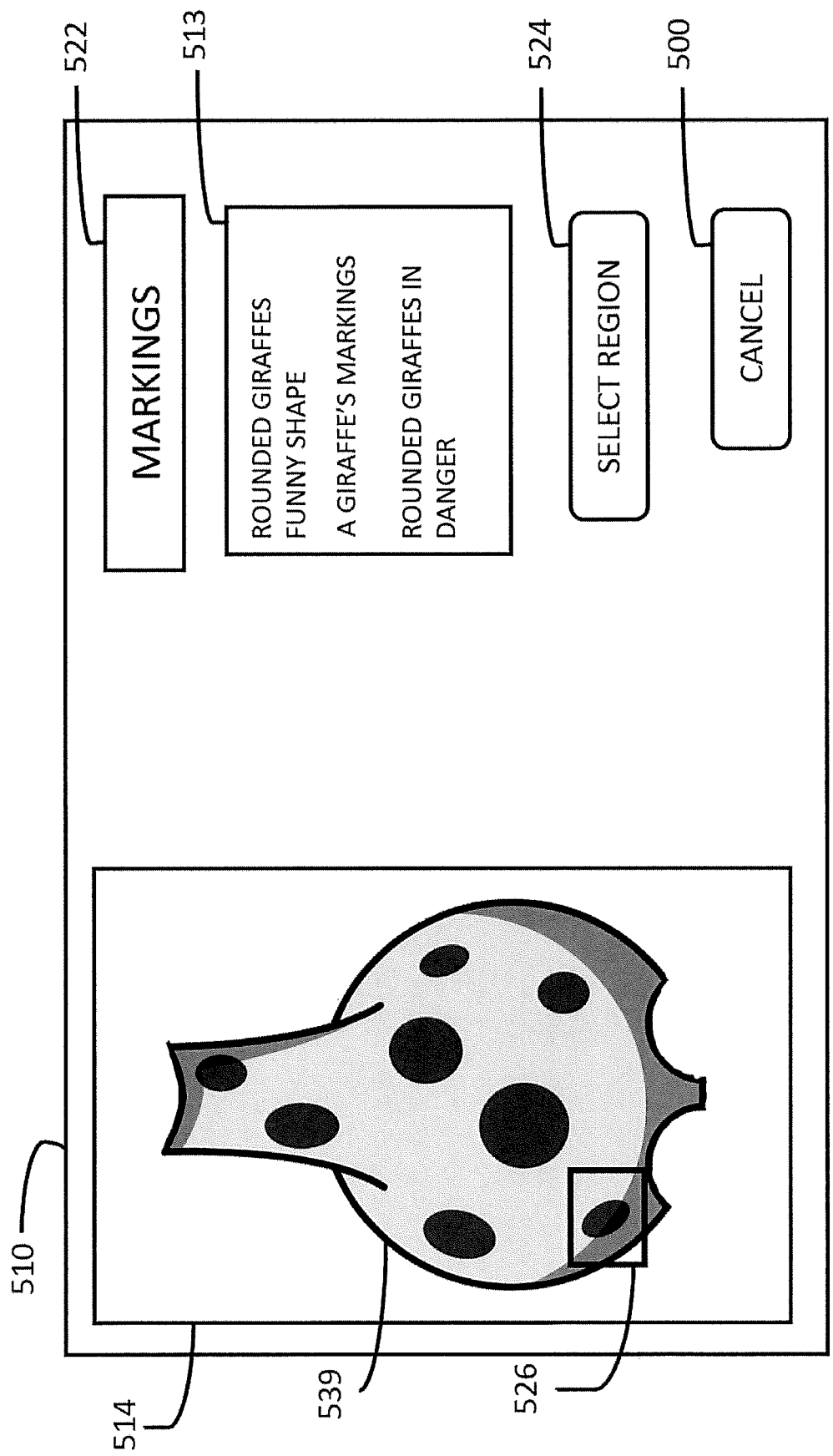
Figure 5R:
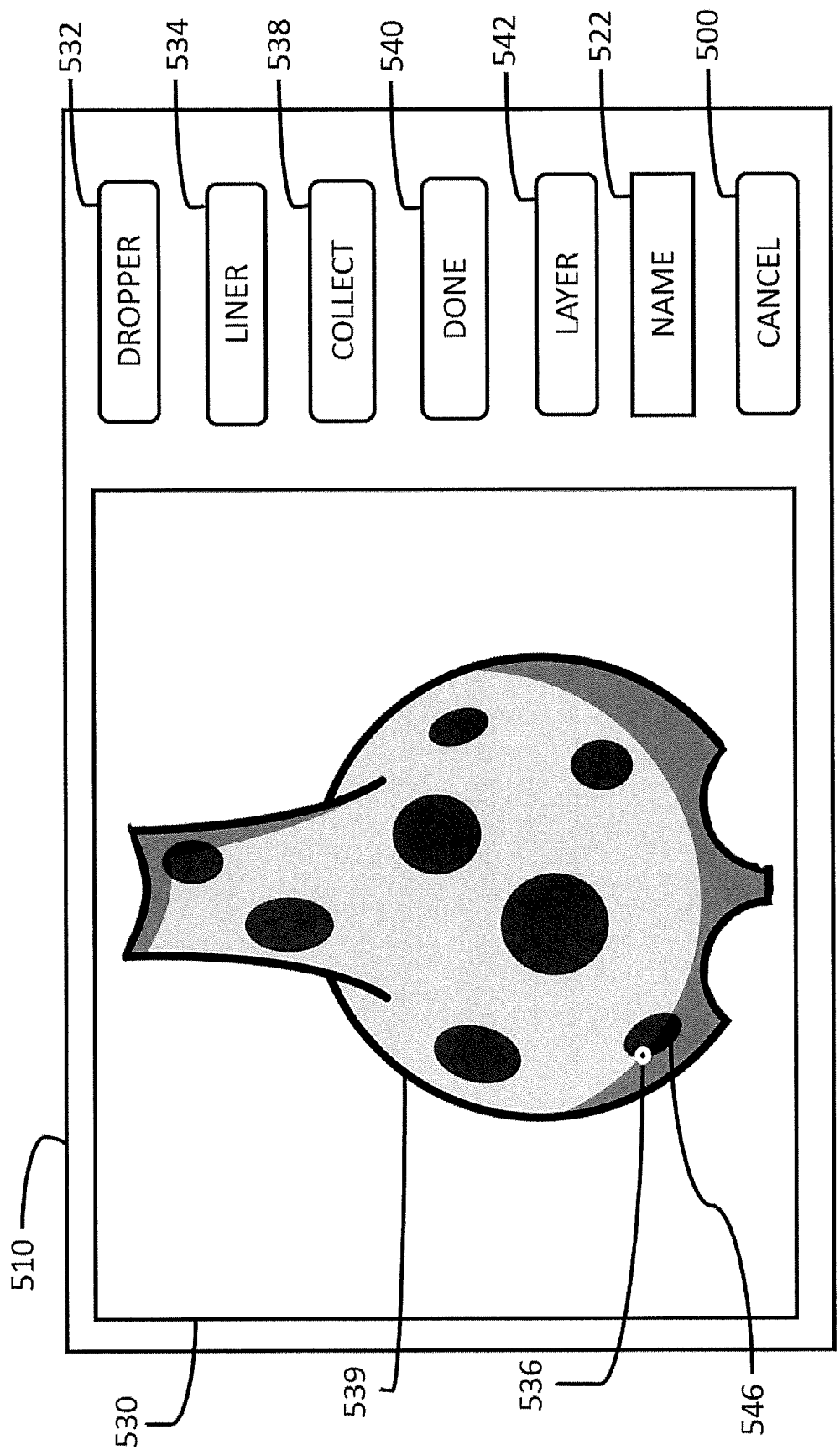
Figure 5S:
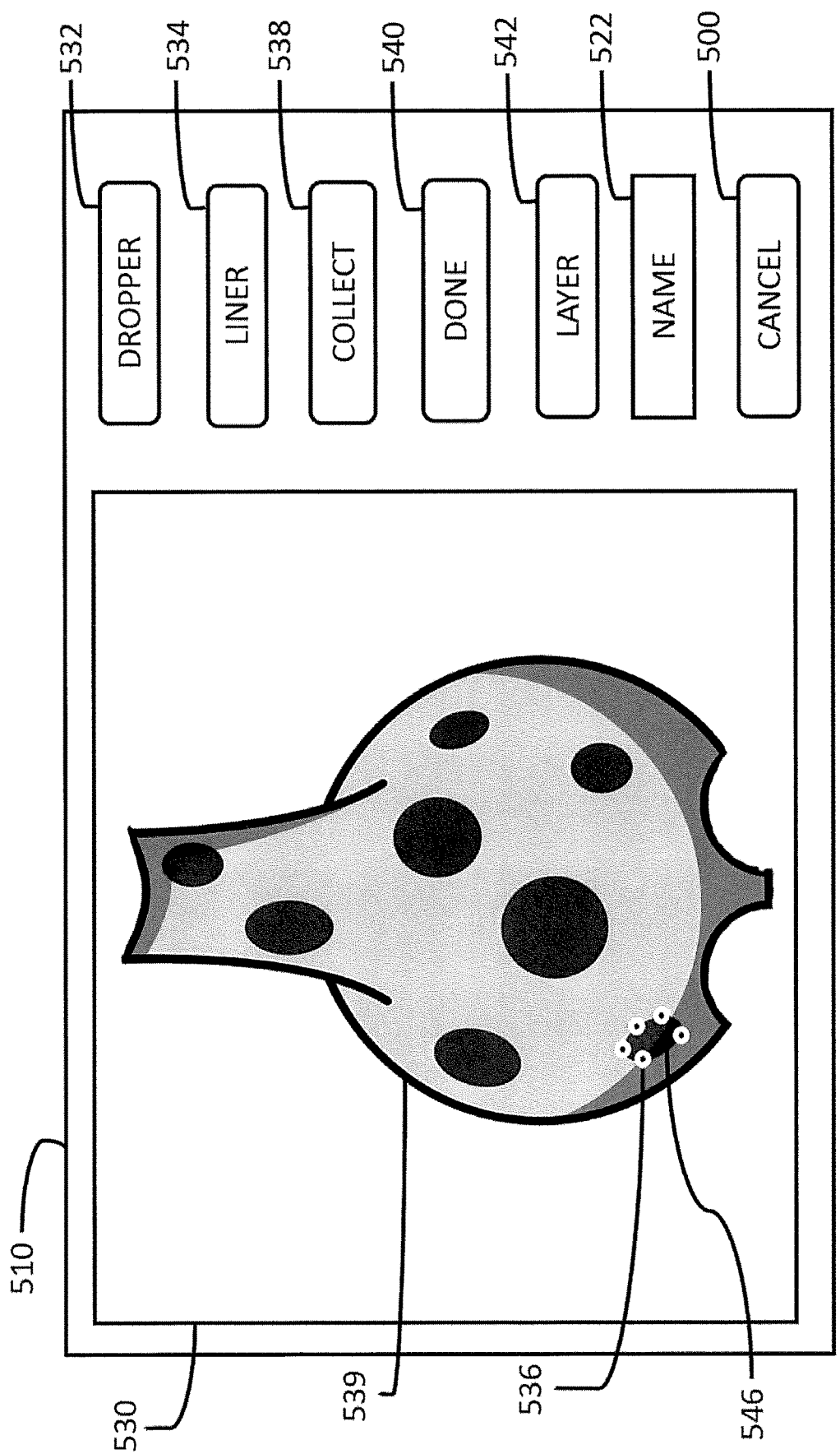

FIG. 5R and FIG. 5S illustrate the GUI 510 after the client device 111 receives a section of an image displayed in the image box 514 illustrated in FIG. 5Q. The GUI 510 may not include the image box 514, the image data URIs box 513, the select region button 524, or the region selection box 526. However, the GUI 510 may include a layer name box 522, an SVG box 530, a dropper button 532, a liner button 534, a collect button 538, a done button 540, and a layer button 542. The image filter engine 108 displays the temporary image 539 in the SVG box 530.

The layer name box 522 may display text corresponding to textual user input corresponding to an image filter layer name. The client device 111 may return the GUI 510 to the state illustrated in FIG. 5A in response to receiving a selection of the cancel button 500. The client device 111 may return the GUI 510 to the state illustrated in FIG. 5L in response to receiving a selection of the layer button 542. The client device 111 may receiving selections of outer boundary coordinates of an image shape after the client device 111 receives a selection of either the dropper button 532 or the liner button 534. As illustrated in FIG. 5R, the client device 111 may receive a selection the dropper button 532 and thereafter receive a selection of the image shape's 546 outer boundary coordinates (e.g., the user may click on or otherwise select some of the image's pixels). The client device 111 may overlay selected image pixels with a drop graphic 536 or other visual indicator. The client device 111 may alternatively receive a selection of the liner button 534 and thereafter receive user input corresponding to a drawn line. The client device 111 may select each pixel associated with the line as corresponding to a shape's outer boundary coordinate. The client device 111 may receive alternating selections of the dropper button 532 and the liner button 534 causing the client device 111 to switch between the two modes of coordinates collection. FIG. 5S illustrates an image shape's 546 outer boundary coordinates after the user has completed the selection of the coordinates.

Figure 5T:
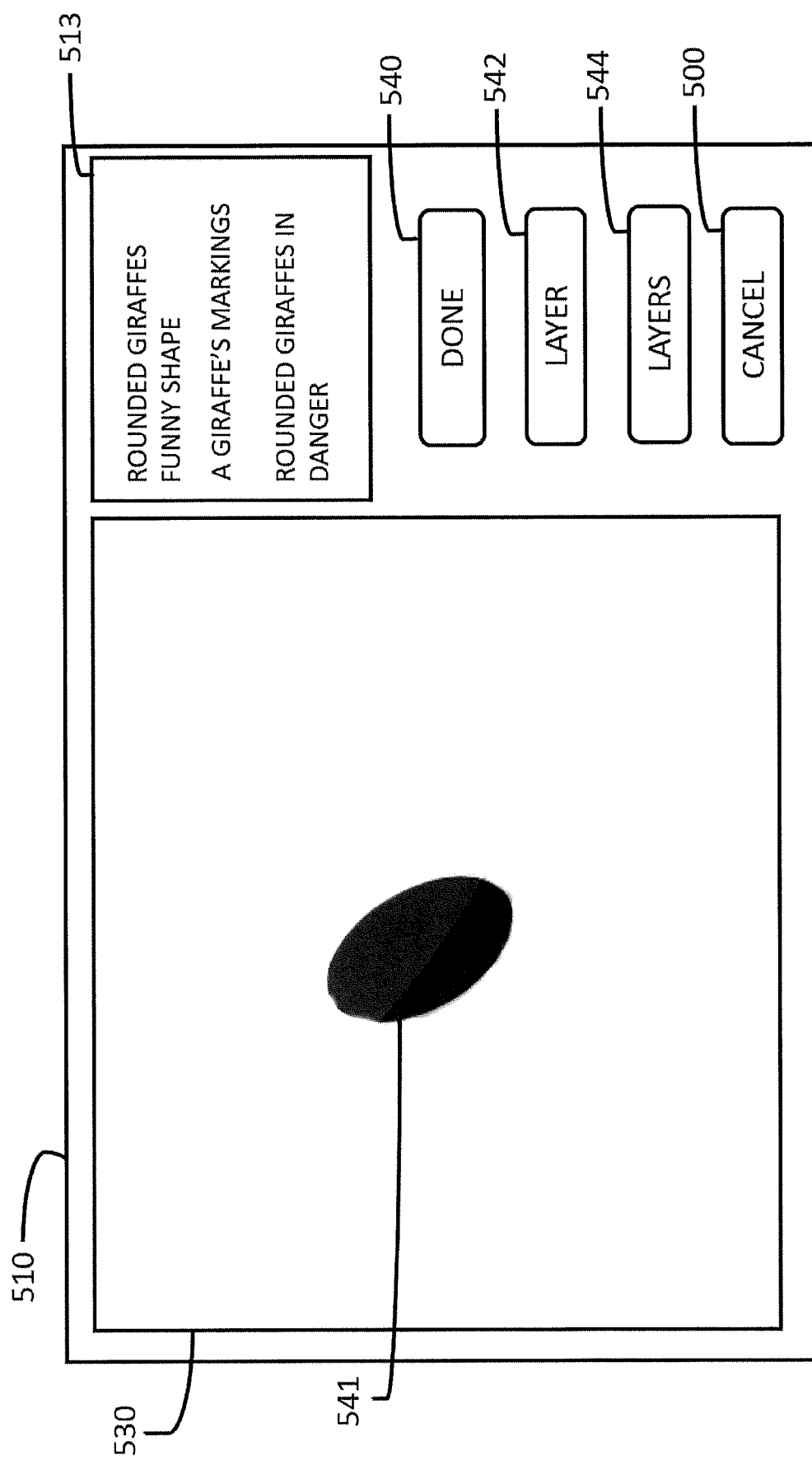

If the client device 111 receives a selection of the collect button 538, the client device 111 presents an image of the shape collected as illustrated in FIG. 5T. The image filter engine 108 generates a temporary image 541 by duplicating the pixels included within the surface defined by the outer boundary coordinates of the aforementioned image shape and displays the temporary image 541 in the SVG box 530. In the example illustrated in FIG. 5T, the collected shape represents a giraffe marking shape. The client device 111 may receive a selection of the done button 540 (e.g., due to the user considering the image shape collected to be complete), resulting in the client device presenting the GUI 510 in the state described with respect to FIG. 5Q. The client device 111 may alternatively receive a selection of the layer button 542 (e.g., due to the user being unsatisfied with the image shape collected), resulting in the client device 111 returning the GUI 510 to the state described with respect to FIG. 5P. The client device 111 may alternatively receive a selection of the cancel button 500 (e.g., due to the user being unsatisfied with the image shape collected), resulting in the client device 111 returning the GUI 510 to the state described with respect to FIG. 5A. In the example embodiment, the user considers the image shape collected to be complete. In the example where the user considers the image shape collected to be complete, the client device 111 may not receive a selection of an image data URI from the list of image data URIs displayed by the image data URIs box 513. Rather, the client device 111 may receive a selection of the done button 540, causing the client device 111 to associate (e.g., by means of a URI) the image shape to the image filter's layer described in FIG. 5Q, and causing the client device 111 to return the GUI 510 to the state described with respect to FIG. 5Q. In the example where the user decides to collect all the markings as image shape, the processes described with respect to FIG. 5Q, FIG. 5R, FIG. 5S and FIG. 5T for each marking present in the temporary image 539 may be repeated, with the notable differences of, in FIG. 5Q, selecting an appropriate region for the image shape to be collected, in FIG. 5R and FIG. 5S, selecting an appropriate image shape for the image shape being collected.

Figure 5U:
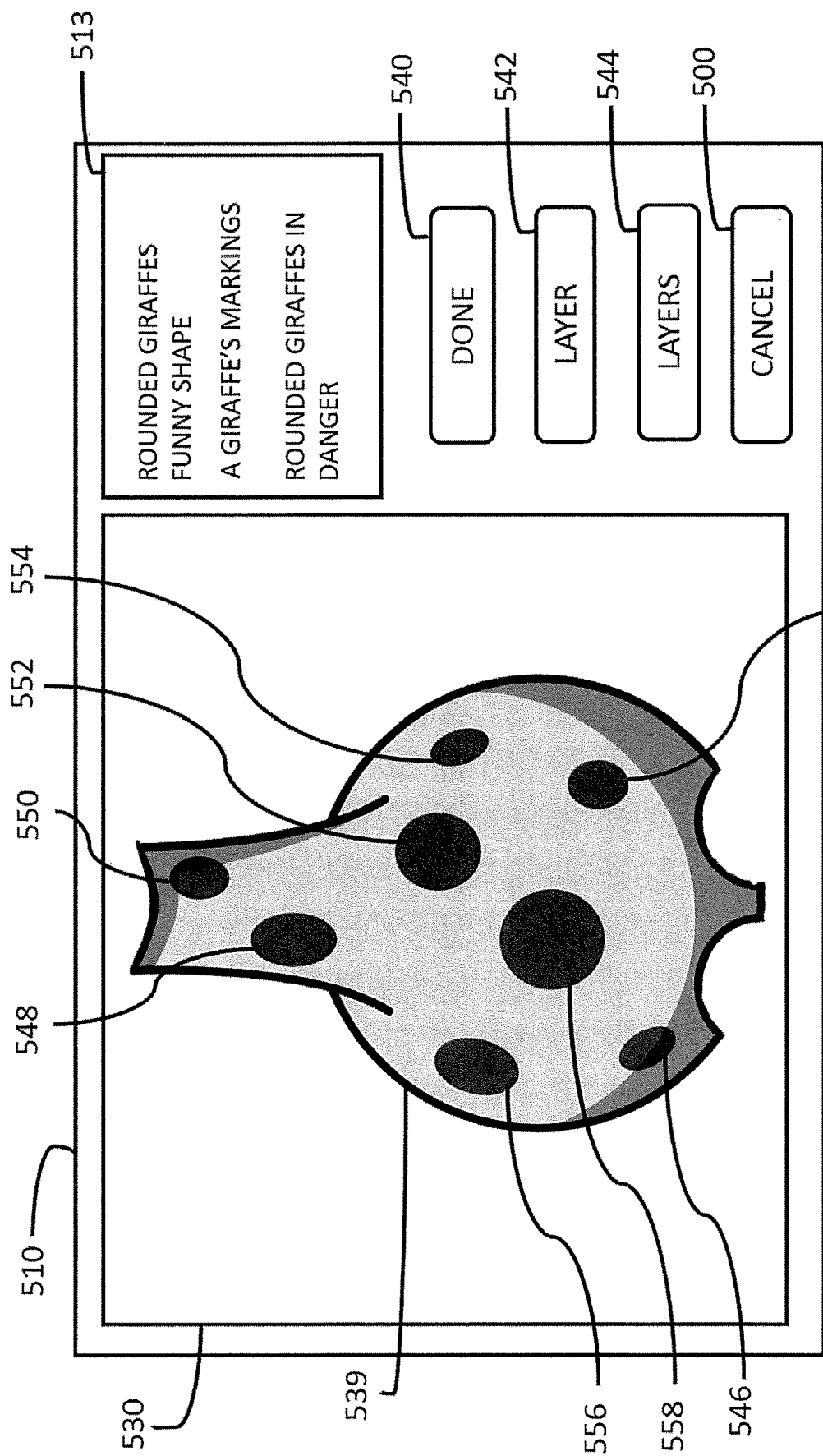
FIG. 5U illustrates an object model graph assembled by an image filter data component according to embodiments of the present disclosure.

FIG. 5U illustrates an example of the GUI 510 after the user has collected the image shapes 546, 548, 550, 552, 554, 556, 558 and 559. In response to receiving a selection of the done button 540, the client device 111 associates (e.g., by means of a URI) the image shape collected in FIG. 5O to the image filter's layer described with respect to FIG. 5L, and returns the GUI 510 to the state described with respect to FIG. 5A. If the client device 111 receives a selection of the submit button 520 illustrated in FIG. 5A, the client device 111 serializes the image filter, as described with respect to FIG. 5V below, generated using the image filter graphical interface component 202's GUI 510 interfacing with the image filter data component 204 and the image displayed in the image box 514 and transmitting the serialized data from the image filter engine 108 via the image filter communicator component 208 to an image filter publication application 122 to be processed as described in more detail with respect to FIG. 7. The image filter publication application 122 processes the image filter transmitted by the image filter communicator component 208, and provides the image filter engine with an updated list of image filter URIs containing the image filter URI of the newly transmitted, processed, and stored image filter.

The GUI 510 refreshes the image filter URIs box 516 with entries from the updated list of image filter URIs as described in more detail with respect to FIG. 5W below.

Figure 5V:
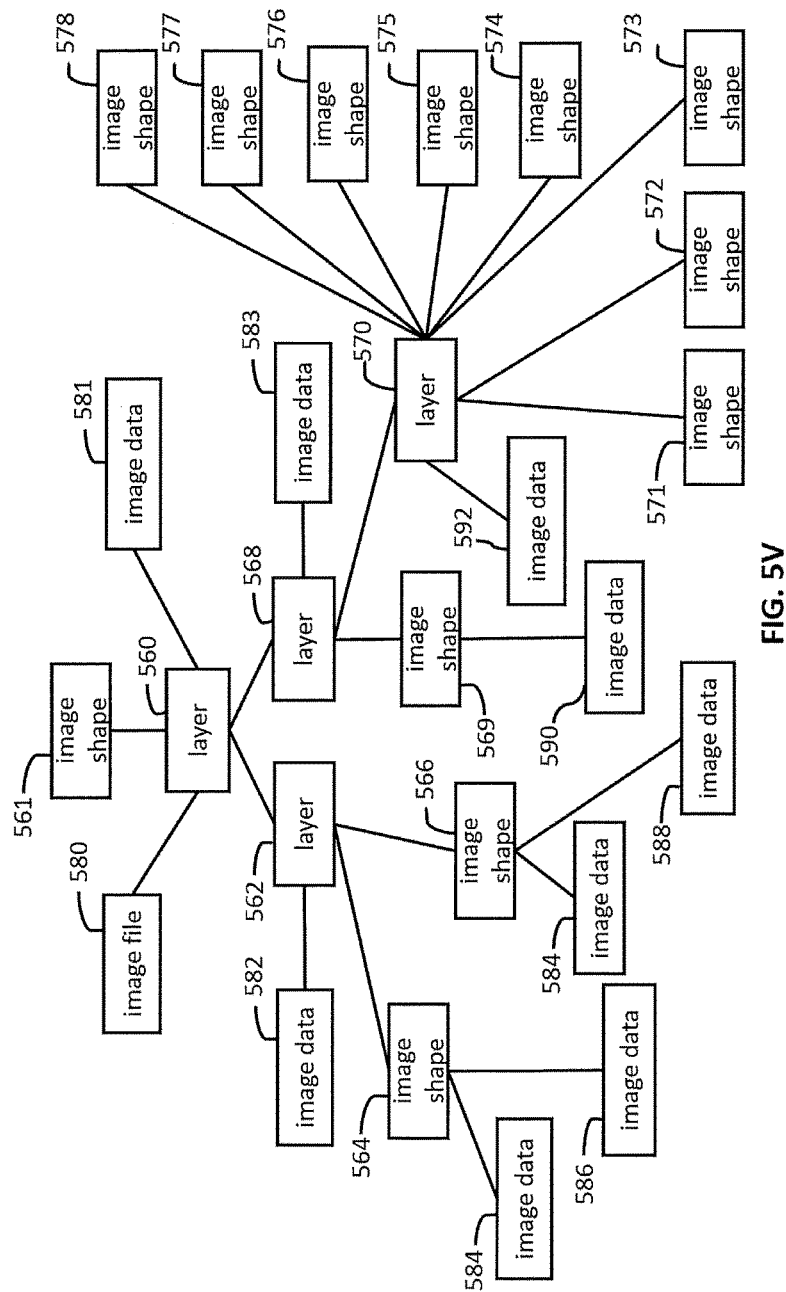
FIG. 5V illustrates an object model graph assembled by an image filter data component according to embodiments of the present disclosure.

FIG. 5V is a diagram illustrating the state of an image filter after the processes, described with respect to FIGS. 5A through 5U, are performed. The image filter layer 560 is the root of the image filter and is associated (e.g., by means of URIs) with the image file 580 selected by the user in the select image file box 512 in FIG. 5A, with image data 581 identified by a URI ROUNDED GIRAFFES IN DANGER and an image shape 561 representing the entire image. The image filter layer 562, named "GIRAFFE EARS," is associated (e.g., by means of a child-parent relationship) with the image filter layer 560 and associated (e.g., by means of a URI) with image data 582 identified by a URI ROUNDED GIRAFFES UNUSUAL HEAD. The image filter layer 562 is associated (e.g., by means of URIs) with two image shapes 564 and 566, the image shape 564 representing the giraffe's left outer hear and the image shape 566 representing the giraffe's right outer hear. The image shape 564 is associated (e.g., by means of URIs) with image data 584 identified by a URI LEARN ABOUT GIRAFFE'S HEARING and image data 586 identified by a URI A GIRAFFE LEFT OUTER HEAR. The image shape 566 is associated (e.g., by means of URIs) with image data 584 identified by a URI LEARN ABOUT GIRAFFE'S HEARING and image data 588 identified by a URI A GIRAFFE RIGHT OUTER HEAR. The image filter layer 568, named "GIRAFFE BODY," is associated (e.g., by means of a child-parent relationship) with the image filter layer 560 and associated (e.g., by means of URIs) with an image shape 569 representing a giraffe's neck and belly and with image data 583 identified by a URI ROUNDED GIRAFFES FUNNY SHAPE. The image shape 569 is associated (e.g., by means of a URI) with image data 590 identified by a URI GIRAFFE'S NECK AND BELLY PAINS. The image layer 570, named "MARKINGS," is associated (e.g., by means of a child-parent relationship) with the image filter layer 568 and associated (e.g., by means of URIs) with image shapes 571, 572, 573, 574, 575, 576, 577 and 578 and with image data 592 identified by a URI A GIRAFFE'S MARKINGS.

Figure 5W:
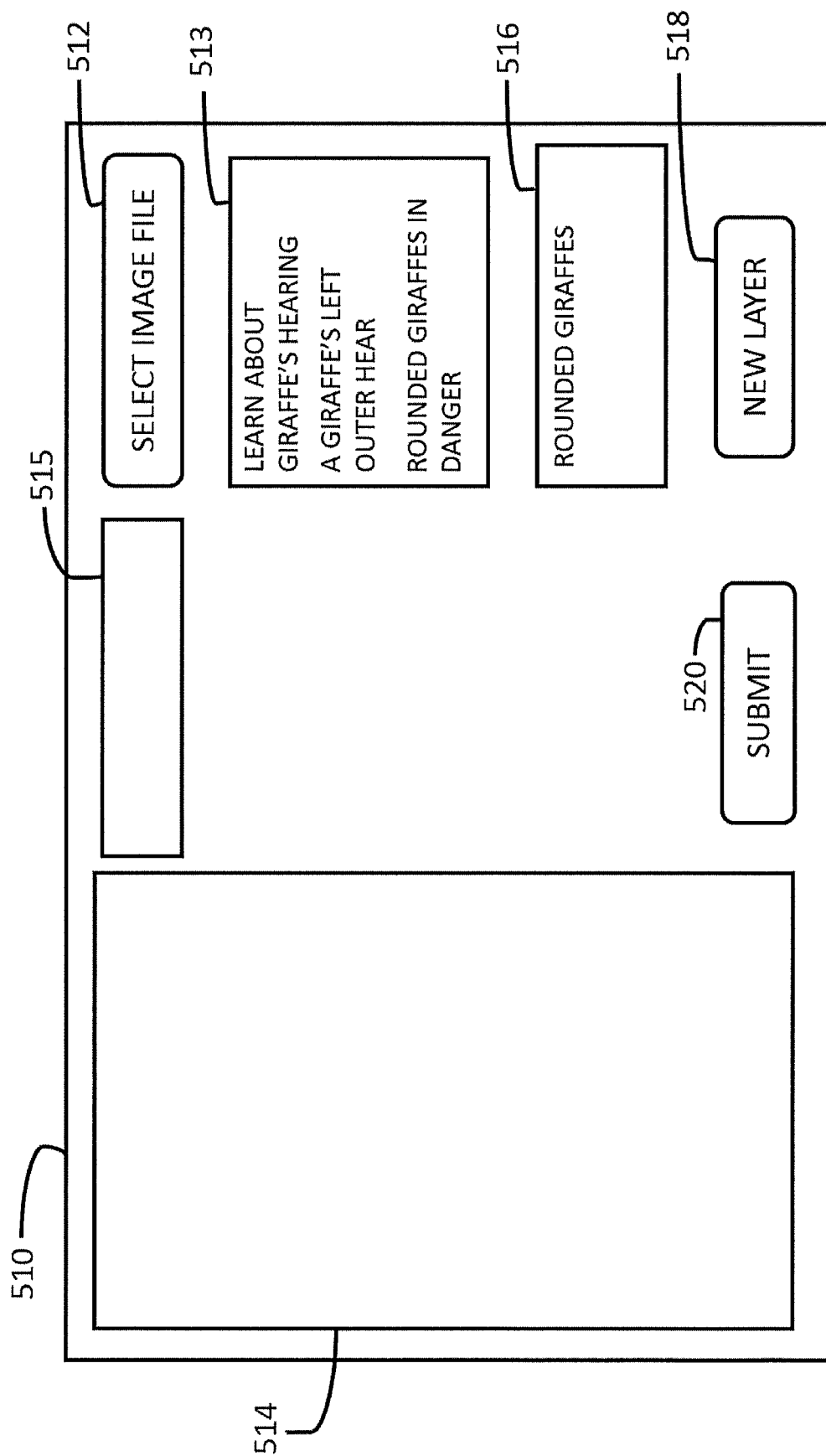
FIG. 5W illustrates an example embodiment of an operation of an image filter graphical user interface component and an image filter data component.

FIG. 5W illustrates an example of the GUI 510 after the client device 111 has transmitted the assembled image filter to an image filter publication application 122 and received from the image filter publication application 122 an updated list of image filters as described with respect to FIG. 5U. The GUI 510 may not include the SVG box 530, the done button 540, the layer button 542, the layers button 544, or the cancel button 500. However, the GUI 510 may include a select image file button 512, an image box 514, an image filter URI box 515, an image filter URIs box 516, a new layer button 518, and a submit button 520. As illustrated in FIG. 5W, the image box 514 does not display any image and the image filter URI box 515 does not include text, thereby indicating to the user that the GUI 510 is ready for either the assembly of a new image filter or the view and possible modification of an existing image filter listed in the image filter URIs box 516. As illustrated, the image filter URIs box 516 displays one image filter URI, i.e., the image filter URI of the assembled image filter described herein above. The client device 111 may receive user input corresponding to a generated message related to the image filter assembled from FIG. 5A to FIG. 5U, which may be delivered to a set of recipients URIs as described with respect to FIG. 9, FIG. 10A, and FIG. 10B.

Figure 9:
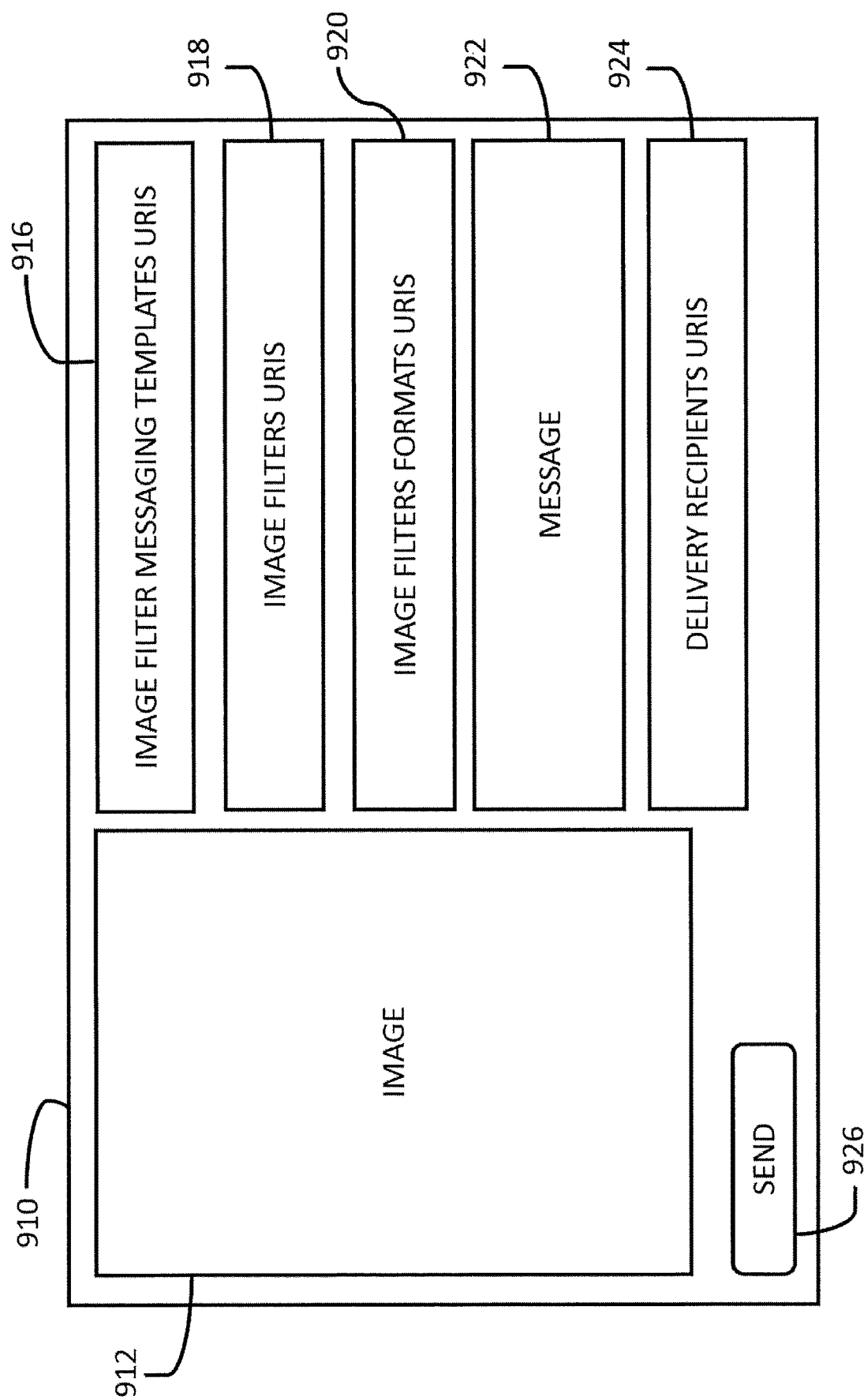
FIG. 9 illustrates a graphical user interface for a user-based image filter messaging component according to embodiments of the present disclosure.

FIG. 9 illustrates a GUI 910 interfacing with an image filter messaging component 210 to generate a message including, but not limited to, text, images, images—URIs, videos, videos URIs, image format URIs, and delivery recipient URIs. The GUI 910 displays an image box 912, an image filter messaging templates URIs 916, an image filters URIs box 918, an image filters formats URIs box 920, a message box 922, a delivery recipients URIs box 924, and a send button 926. The image box 912 displays the image associated (by means of a URI) with an image filter format URI selected in the image filters formats URIs box 920. The image filter messaging templates URIs box 916 enables the user to select an image filter messaging template URI from a list of image filter messaging templates URIs retrieved from an image filter messaging templates component 310 of an image filter publication application 122. The image filters URIs box 918 enables a user to select an image filter URI from a list of image filter URIs. The image filters formats URIs box 920 displays a list of an image filter formats URIs related to an image filter URI selected in the image filters URIs box 918 and enables a user to select an image filter format URI from the list of image filter formats URIs. The message box 922 displays a GUI layout dependent on the image filter messaging template selected by a user in the image filter messaging templates URIs box 916. The delivery recipients URIs box 924 enables a user to enter delivery recipients URIs to be associated (by means of URIs) with the message being generated, wherein the message being generated is to be delivered to the delivery recipients URIs entered in the delivery recipients URIs box 924. When the client device 111 receives a selection of the send button 926, the client device 111 transmits message data corresponding to the message to an image filter publication component 122 for further processing and delivery.

Figure 10A:
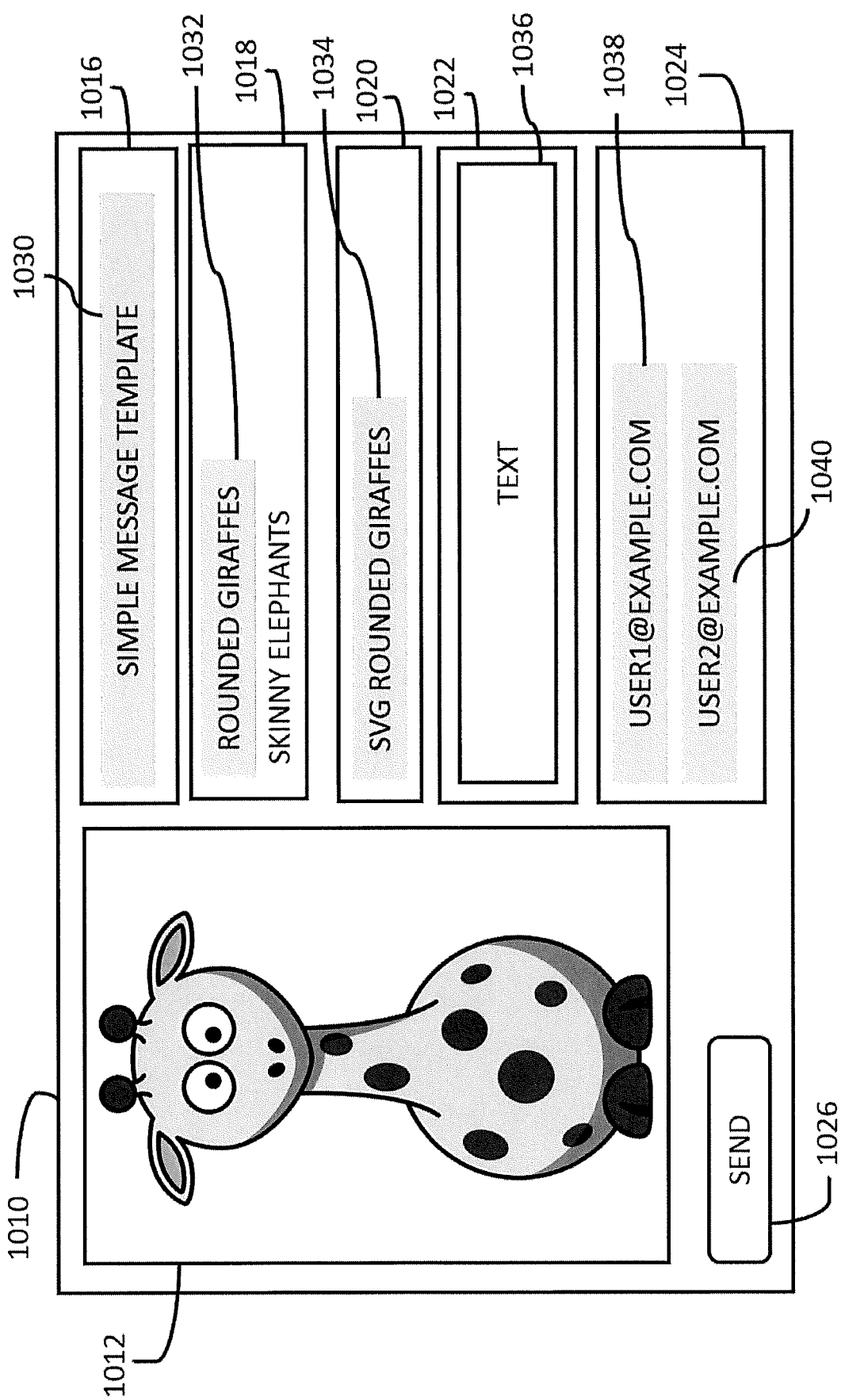
FIG. 10A illustrates operation of an image filter graphical user interface component and an image filter messaging component according to embodiments of the present disclosure.

FIG. 10A illustrates an example of a GUI 1010 interfacing with an image filter messaging component 210 to generate a message including, but not limited to, text, images, images URIs, videos, videos URIs, image format URIs, and delivery recipient URIs. The GUI 1010 displays an image box 1012, an image filter messaging templates URIs 1016, an image filters URIs box 1018, an image filters formats URIs box 1020, a message box 1022, a delivery recipients URIs box 1024, and a send button 1026. The image box 1012 displays the image associated (by means of a URI) with an image filter format URI selected in the image filters formats URIs box 1020. The image filter messaging templates URIs box 1016 enables the user to select an image filter messaging template URI from a list of image filter messaging templates URIs retrieved from an image filter messaging templates component 310 of an image filter publication application 122. The image filters URIs box 1018 enables a user to select an image filter URI from a list of image filter URIs. The image filters formats URIs box 1020 displays a list of image filter formats URIs related to an image filter URI selected in the image filters URIs box 1018 and enables a user to select an image filter format URI from the list of image filter formats URIs. In the example illustrated in FIG. 10A, the client device 111 has received a selection of the URI SIMPLE MESSAGE TEMPLATE 1030 from the image filter messaging templates URIs 1016, a selection of the URI ROUNDED GIRAFFES 1032 from the image filters URIs 1018, and a selection of the URI SVG ROUNDED GIRAFFES 1034 from the image filters formats URIs 1020. The image box 1012 displays the SVG image associated (by means of a URI) with the image filter URI 1032. The selected image filter messaging template 1030 is composed of only one element, the text box 1036. The client device 111 receives user input to be included in the composition of image filter messaging data in the form of some text in the text box 1036 and two recipient URIs 1038 and 1040 in the delivery recipients URIs box 1024. Thereafter, the client device 111 receives a selection of the send button 1026, causing the client device 111 to transmit the serialized image filter messaging data (including the image filter URI, the image filter format URI, the text entered in the text box 1036, and the recipients URIs 1038 and 1040 entered in the delivery recipients URIs box 1024), via the image filter communicator component 208, to the image filter publication messaging component 304 of the image filter publication application 122.

Figure 10B:
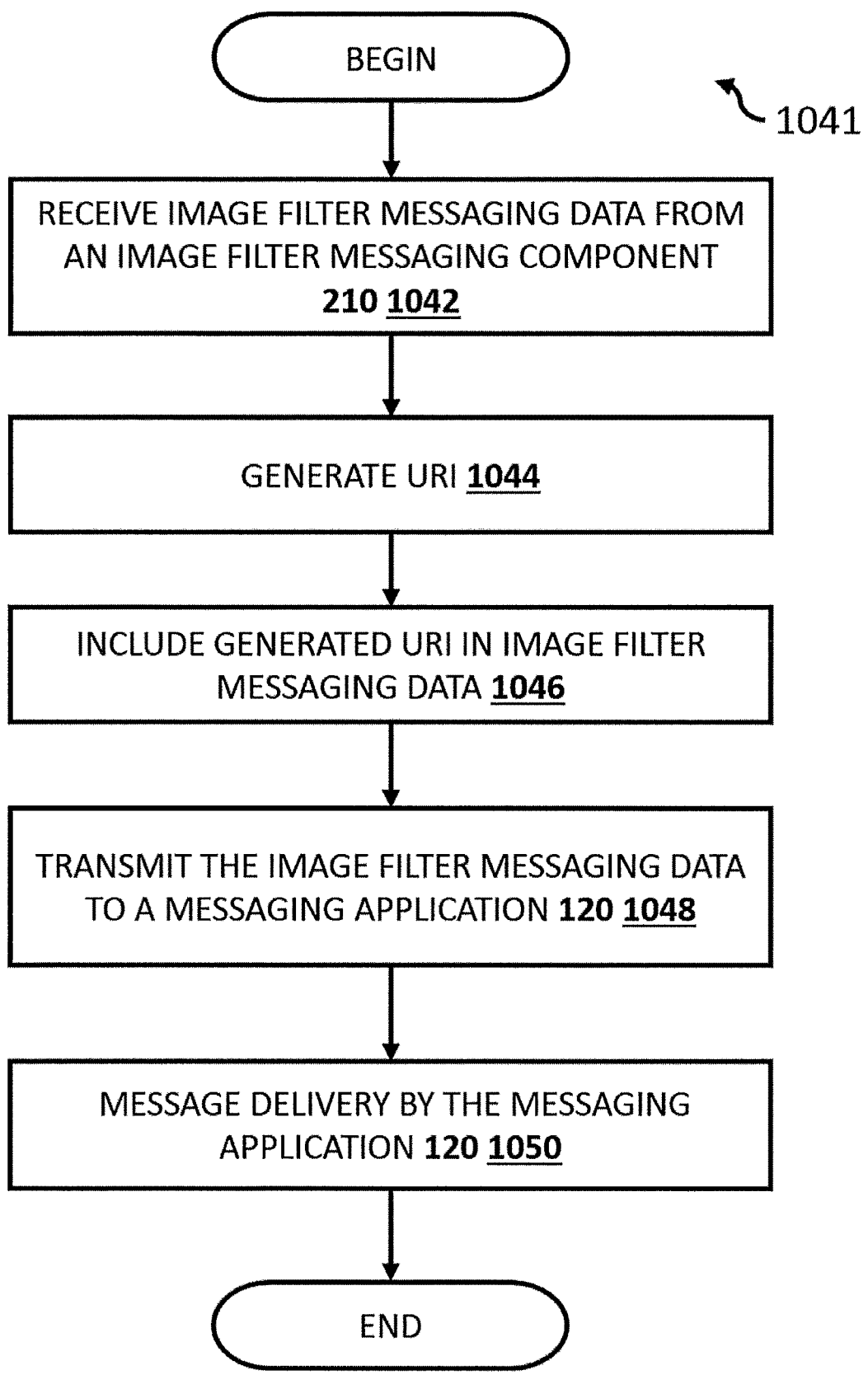
FIG. 10B is a process flow diagram illustrating operation of an image filter publication messaging component and a messaging application according to embodiments of the present disclosure.

FIG. 10B is a flow diagram illustrating a method 1041, performable by the image filter publication messaging component 304. The image filter messaging component 210 transmits, via an image filter communicator component 208 of an image filter engine 108, the image filter messaging data assembled in FIG. 10A to an image filter publication messaging component 304 of an image filter publication application 122. The image filter publication messaging component 304 receives (1042) the serialized image filter messaging data transmitted by an image filter messaging component 210. The image filter publication messaging component 304 generates (1044) a URI representing an image interactivity engine 109's resources' URIs and the image filter format URI included in the image filter messaging data. For example, the generated URI (e.g., a holistic link) may enable a programmatic client 106 to retrieve programmatic client resources and an image interactivity engine 109's resources, and launch the programmatic client 106 with the image interactivity engine 109, described with respect to FIG. 11 herein, within a client device (111/112) with the image interactivity engine 109 displaying the image filter format described with respect to FIG. 12A herein.

The image filter publication messaging component 304 generates augmented image filter messaging data by integrating (1046) the generated URI as part of the image filter messaging data. The image filter publication messaging component 304 transmits (1048), to a messaging application 120 via the image filter publication application 122, the augmented image filter messaging data. The messaging application 120 delivers (1050) the image filter messaging data to recipients URIs present in the image filter messaging data.

Image Filter Publication Application

Figure 6:
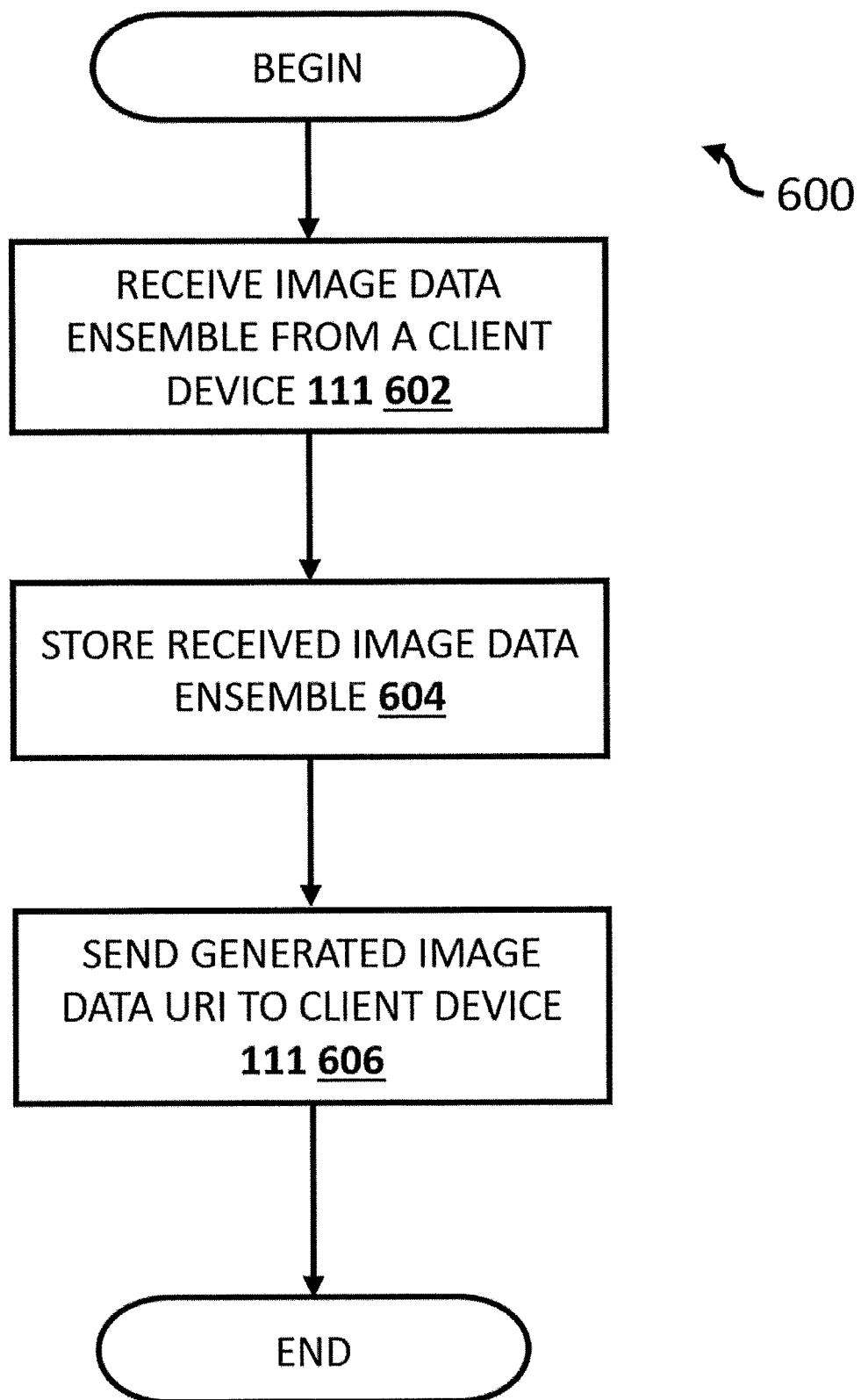
FIG. 6 is a process flow diagram illustrating operation of an image asset publication component according to embodiments of the present disclosure.

FIG. 6 illustrates a method 600 performable by an image asset publication component 308 of an image filter publication application 122. The image asset publication component 308 receives (602) an image data ensemble transmitted by an image filter engine 108 of a client device 111's programmatic client 106. In an example, the image data ensemble includes, as image data resources, an image data template URI, image data, text, an image and a video.

The image asset publication component 308 stores (604), for example in files, databases and/or any adequate data storage implementation, the serialized image data resources and image data. The stored data is queryable from the data storage implementations via URIs assigned to the image data resources by the image asset publication component 308.

The image asset publication component 308 transmits (606), to an image filter engine 108 of a client device 111's programmatic client 106, the URI assigned by the image asset publication component 308 to the image data.

Figure 7:
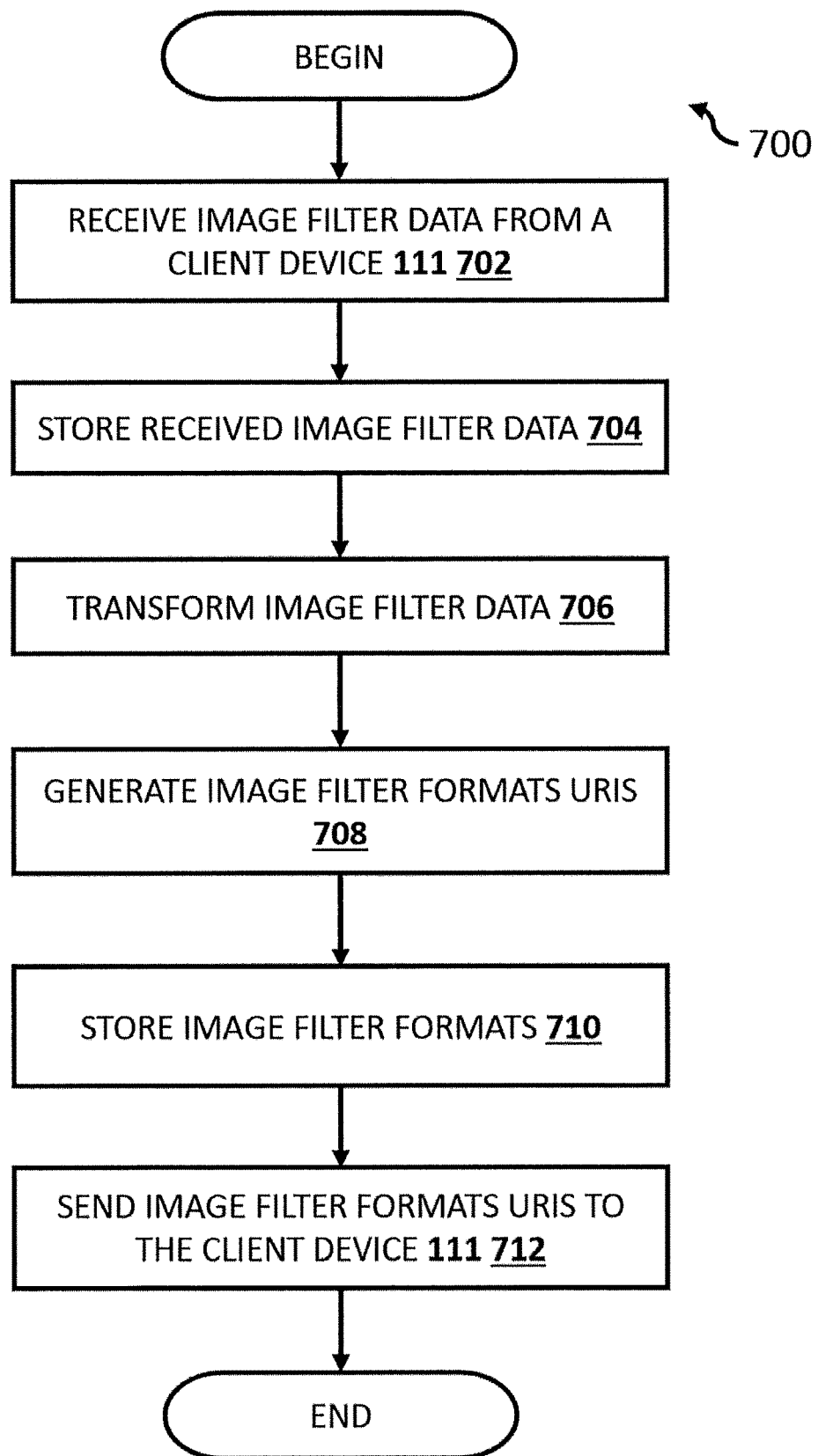
FIG. 7 is a process flow diagram illustrating operation of an image filter transformation component and an image asset publication component according to embodiments of the present disclosure.

FIG. 7 illustrates a method 700 performable by the image filter publication application 122. The image filter publication application 122 receives (702) transmitted image filter data from an image filter communicator component 208 of a client device 111's programmatic client 106. In an example, the uploaded image filter data includes a serialized image and image filter transmitted by an image filter engine 108 of a client device 111's programmatic client 106.

The image filter publication application 122 stores (704), for example, in files, databases, or any data storage implementation, the serialized data. The stored data is queryable from the data storage implementation via the URI assigned to the data by the image asset publication component 308 of an image filter publication application 122.

Figure 8:
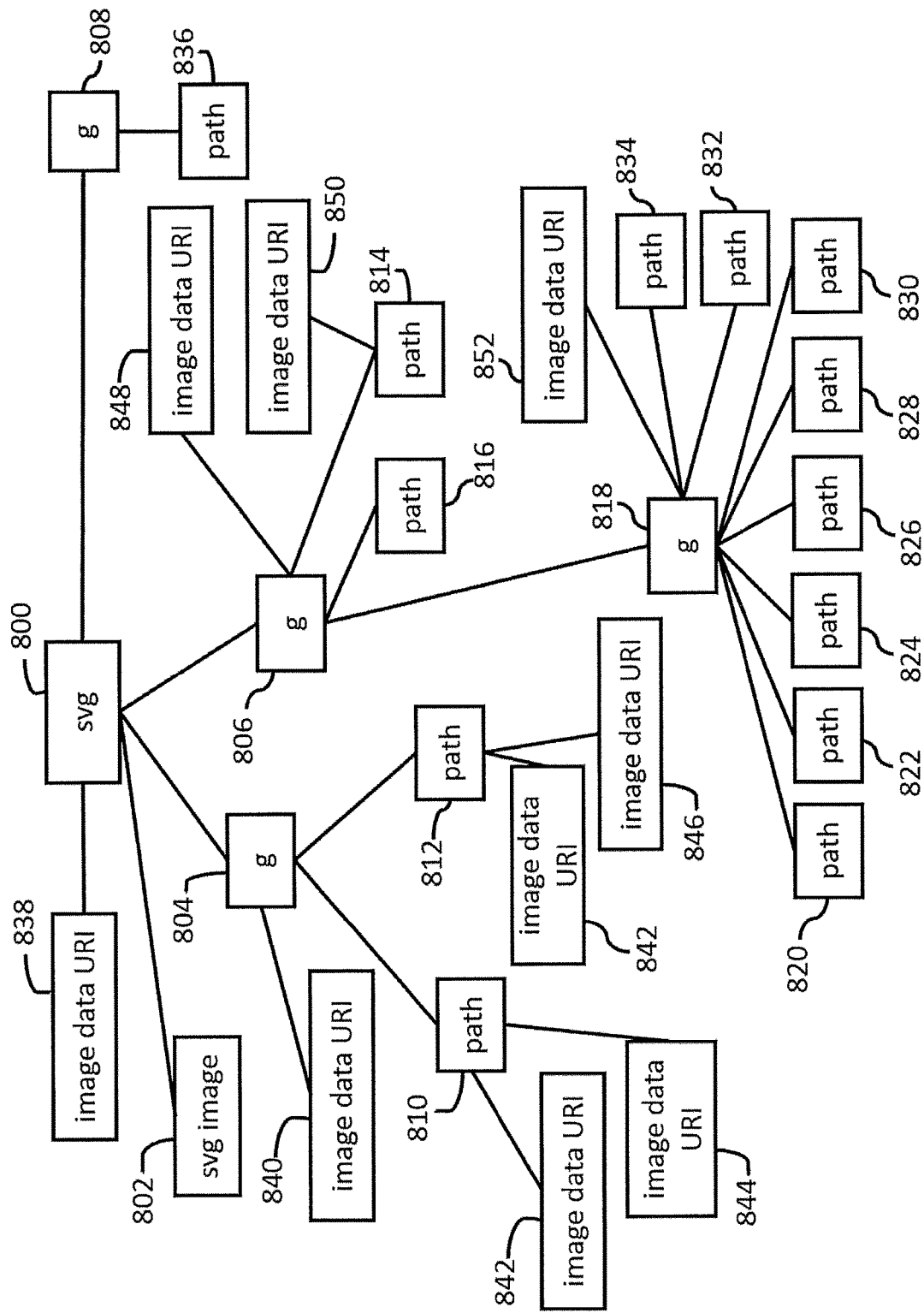
FIG. 8 illustrates the transformation of an object model graph assembled by an image filter data component into an object model graph assembled by an image filter transformation component according to embodiments of the present disclosure.

The image filter transformation component 302 of an image filter publication application 122 processes and transforms (706), as described with respect to FIG. 8 herein, the transmitted image filter into one or more image filter formats adhering to and implementing a set of specifications based on standards published by reputable consortium(s) and implemented either natively or through some auxiliary applications by client device applications.

The image filter transformation component 302 of an image filter publication application 122 generates (708) URIs and assigns the generated URIs to the image filter formats generated in step 706.

The image asset publication component 308 of an image filter publication application 122 stores (710), for example in files, databases, or any adequate data storage implementation, the image filter formats generated in step 708.

The image filter publication application 122 transmits (712) the image filter formats URIs generated in step 708 to the client device 111.

FIG. 8 illustrates an example of an SVG image format generated by an image filter transformation component 302 of an image filter publication application 122 as described with respect to step 706 in FIG. 7 from an image filter illustrated in FIG. 5V. An image filter transformation component 302 maps an image filter root layer 560 to an SVG root 800 and assigns (by means of an svg data attribute) to the SVG root 800 a data attribute 838 containing, for value, the image data 581's URI (i.e. ROUNDED GIRAFFES IN DANGER). An svg data attribute is a custom data attribute that enables an SVG markup and its resulting DOM to carry information that standard attributes cannot, usually for scripting purposes. The custom data attribute is available via an SVGElement interface of the element the attribute belongs to, from an SVGElement.dataset property. The image filter transformation component 302 instantiates an SVG image 802, assigns to the SVG image 802 an href SVG attribute of the image URI containing for value the image file 580's URI and assigns the SVG root 800 as the SVG image 802's parent node. The image filter transformation component 302 maps the image filter layer 562 to an SVG group 804, assigns to the SVG group 804 a data attribute 840 containing, for value, the image data 582's URI (i.e. ROUNDED GIRAFFES UNUSUAL HEAD) and assigns the SVG root 800 as the SVG group 804's parent node. The image filter transformation component 302 instantiates an SVG path 810, assigns to the SVG path 810 a data attribute 842 containing, for value, the image data 584's URI (i.e. LEARN ABOUT GIRAFFE'S HEARING), assigns to the SVG path 810 a data attribute 844 containing, for value, the image data 586's URI (i.e. A GIRAFFE'S LEFT OUTER HEAR), assigns to the SVG path 810 an SVG model's <path> commands (herein referred to as path commands) and the cumulated coordinate values of the image shape 564's inclusive and exclusive shapes in an even odd order and assigns the SVG group 804 as the SVG path 810's parent node. The image filter transformation component 302 instantiates an SVG path 812, assigns to the SVG path 812 a data attribute 843 containing, for value, the image data 584's URI (i.e. LEARN ABOUT GIRAFFE'S HEARING), assigns to the SVG path 812 a data attribute 846 containing, for value, the image data 588's URI (i.e. A GIRAFFE'S RIGHT OUTER HEAR), assigns to the SVG path 812 path commands and the cumulated coordinate values of the image shape 566's inclusive and exclusive shapes in an even odd order and assigns the SVG group 804 as the SVG path 812's parent node. The image filter transformation component 302 maps the image filter layer 568 to an SVG group 806, assigns to the SVG group 806 a data attribute 848 containing, for value, the image data 583's URI (i.e. ROUNDED GIRAFFES FUNNY SHAPE) and assigns the SVG root 800 as the SVG group 806's parent node. The image filter transformation component 302 instantiates an SVG path 814, assigns to the SVG path 814 a data attribute 850 containing, for value, the image data 590's URI (i.e. GIRAFFE'S NECK AND BELLY PAINS), assigns to the SVG path 814 path commands and the cumulated coordinate values of the image shape 569's inclusive shape and assigns the SVG group 806 as the SVG path 814's parent node. The image filter transformation component 302 maps the image filter layer 570 to an SVG group 818, assigns to the SVG group 818 a data attribute 852 containing, for value, the image data 592's URI (i.e. A GIRAFFE'S MARKINGS) and assigns the SVG group 806 as the SVG group 818's parent node. The image filter transformation component 302 instantiates a set of SVG paths 820, 822, 824, 826, 828, 830, 832 and 834, assigns to each SVG paths respectively path commands and the cumulated coordinate values of image shapes 571, 572, 573, 574, 575, 576, 577 and 578 inclusive shapes and assigns the SVG group 818 as SVG paths' parent node. The image filter transformation component 302 instantiates an SVG path 816, assigns to the SVG path 816 path commands and the cumulated coordinate values of SVG paths 814, 820, 822, 824, 826, 828, 830, 832 and 834 and assigns the SVG group 806 as the SVG path 816's parent node. The image filter transformation component 302 instantiates an SVG group 808 and assigns the SVG root 800 as the SVG group 808's parent node. The image filter transformation component 302 instantiates an SVG path 836, assigns to the SVG path 836 path commands and the cumulated coordinate values of the SVG image 802 and SVG paths 810, 812 and 814 and assigns the SVG group 808 as the SVG path 836's parent node.

Image Interactivity Engine

Figure 11:
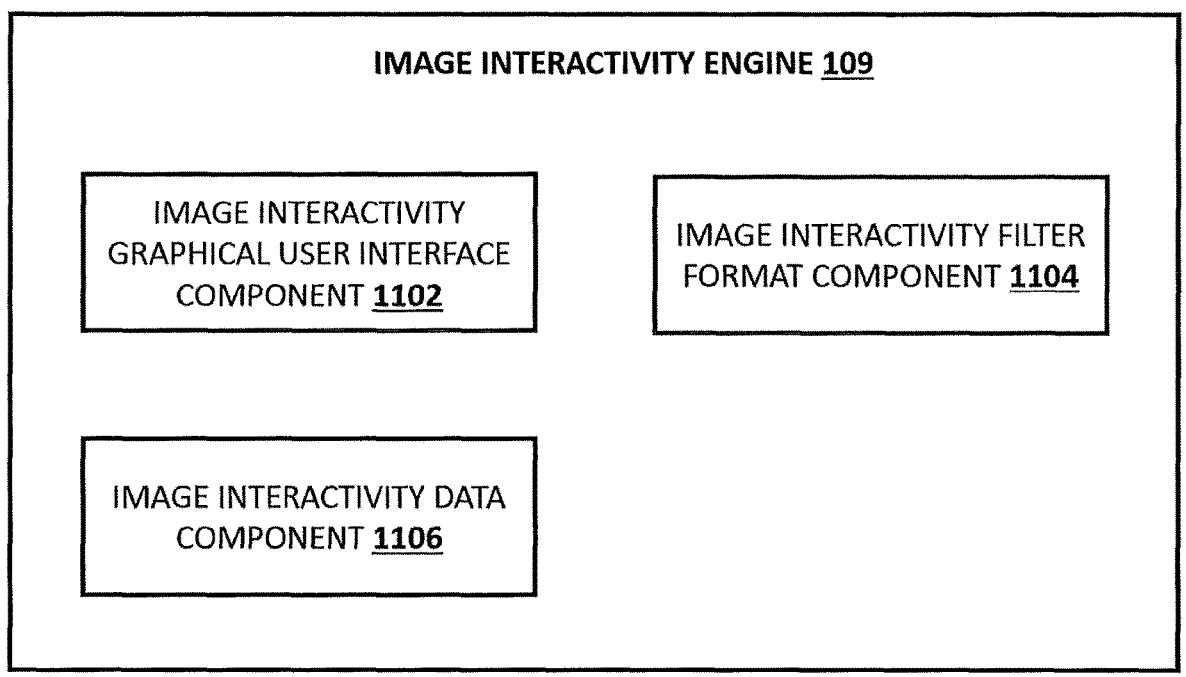
FIG. 11 is a block diagram illustrating an image interactivity engine according to embodiments of the present disclosure.

FIG. 11 illustrates an example of an image interactivity engine 109. The image interactivity engine 109 includes an image interactivity graphical user interface component 1102, an image interactivity filter format component 1104 and an image interactivity data component 1106.

Figure 12A:
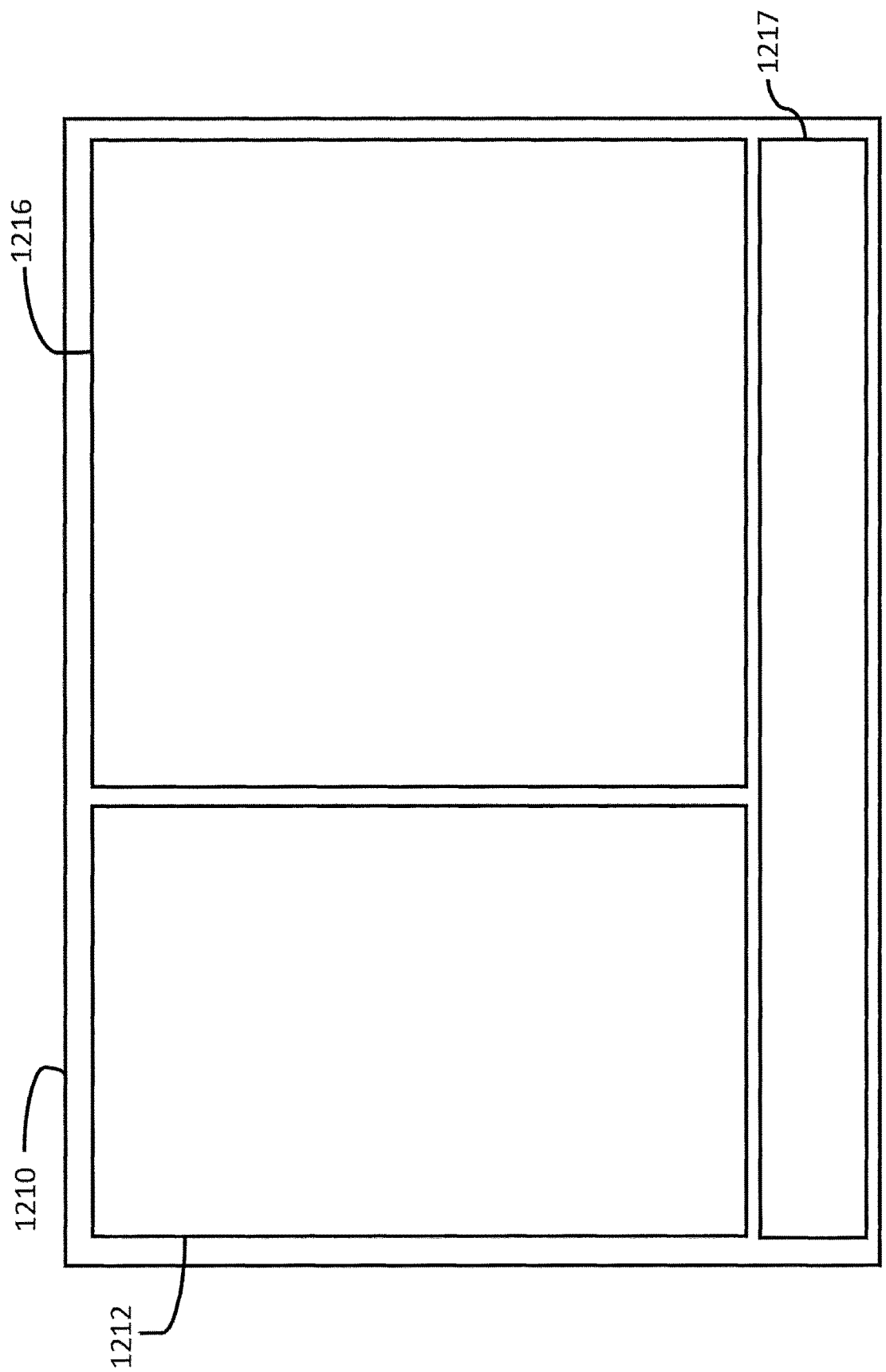
FIG. 12A illustrates a graphical user interface for an image interactivity filter format component and an image interactivity data component according to embodiments of the present disclosure.

FIG. 12A illustrates an example GUI 1210 of an image interactivity engine 109 of a client device (111/112) programmatic client 106. The GUI 1210 displays an SVG box 1212, an image data box 1216, and an image data buttons box 1217. The SVG box 1212 enables a user to view the image associated (by means of a URI) with an image filter. The image data box 1216 enables a user to view image data associated (by means of a URI) with an image shape emphasized in the image displayed in the SVG box 1212. The image data buttons box enables a user to view a set of buttons, each permitting the image data box 1216 to display respective image data associated (by means of a URI) with an image shape emphasized in an image displayed in the SVG box 1212.

Figure 12B:
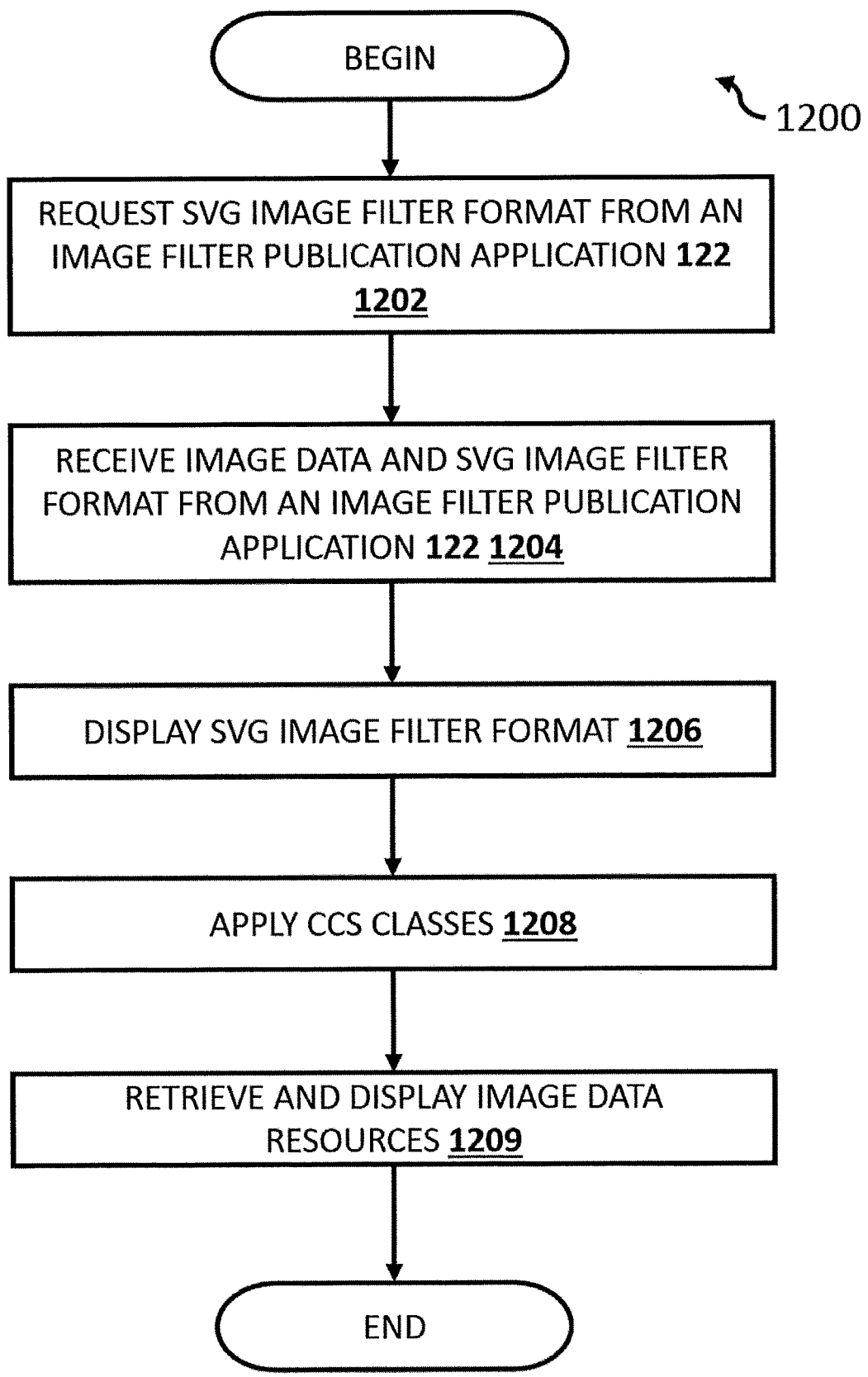
FIG. 12B is a process flow diagram illustrating operation of an image interactivity filter format component according to embodiments of the present disclosure.

FIG. 12B illustrates a method 1200 of an image interactivity engine 109's process initiated by a user of a client device (111/112) to retrieve an SVG image filter format from an image asset publication component 308 of an image filter publication application 122.

The image interactivity engine 109 requests (1202) an SVG image filter format from an image filter publication application 122.

The image interactivity engine 109 receives (1204), from the image filter publication application 122, the requested SVG image filter format as well as a set of image data associated (by means of URIs) with the image associated (by means of a URI) with the image filter format.

Figure 12C:
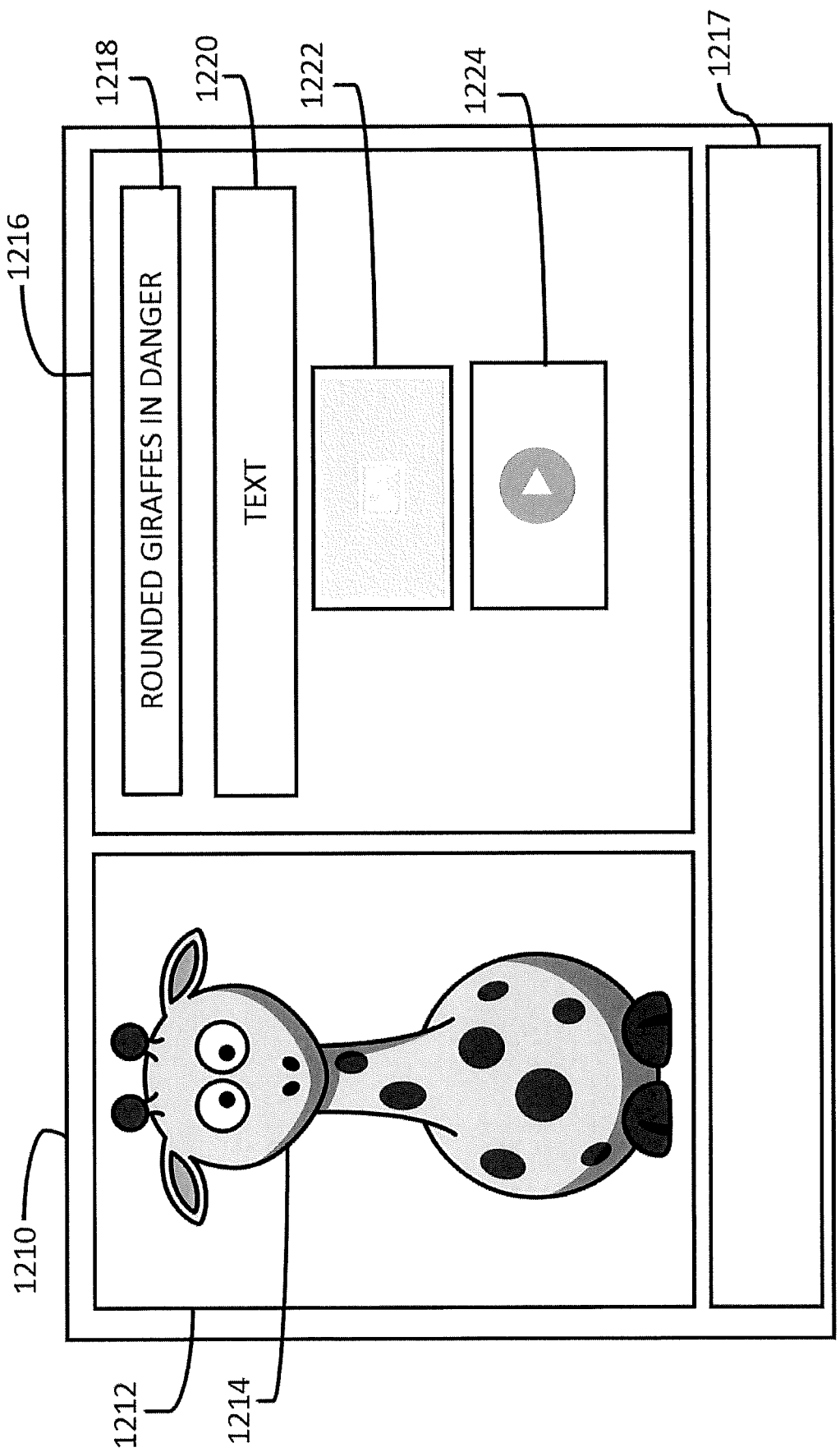
FIG. 12C through FIG. 12J illustrates operations of an image filter graphical user interface component and an image filter data component according to embodiments of the present disclosure.

The image interactivity filter format component 1104 of the engine 109 displays (1206), with the assistance of an image interactivity GUI component 1102, the SVG filter format in the SVG box 1212 of the GUI 1210, as illustrated in FIG. 12C.

The image interactivity filter format component 1104 applies (1208) a set of cascading style sheet (i.e., a style sheet language used for describing the presentation of a document written in a markup language, herein referred to as CSS) classes onto the graphically rendered elements of the SVG image filter format. For example, the image interactivity filter format component 1104 applies a CSS class defining a none fill and a fill-opacity of 0 to all SVG groups of the SVG filter format displayed in the SVG box of the GUI 1210, as illustrated in FIG. 12C.

The image interactivity filter format component 1104 retrieves (1209) the image data resources' URIs. The image interactivity engine 109 retrieves, via the collected resources URIs and from an image filter publication application 122 and/or third-party platforms, the resources and the image interactivity data component 1106 displays the retrieved resources, with the assistance of an image interactivity GUI component 1102, onto a GUI 1210 as illustrated in FIG. 12C.

Figure 12D:
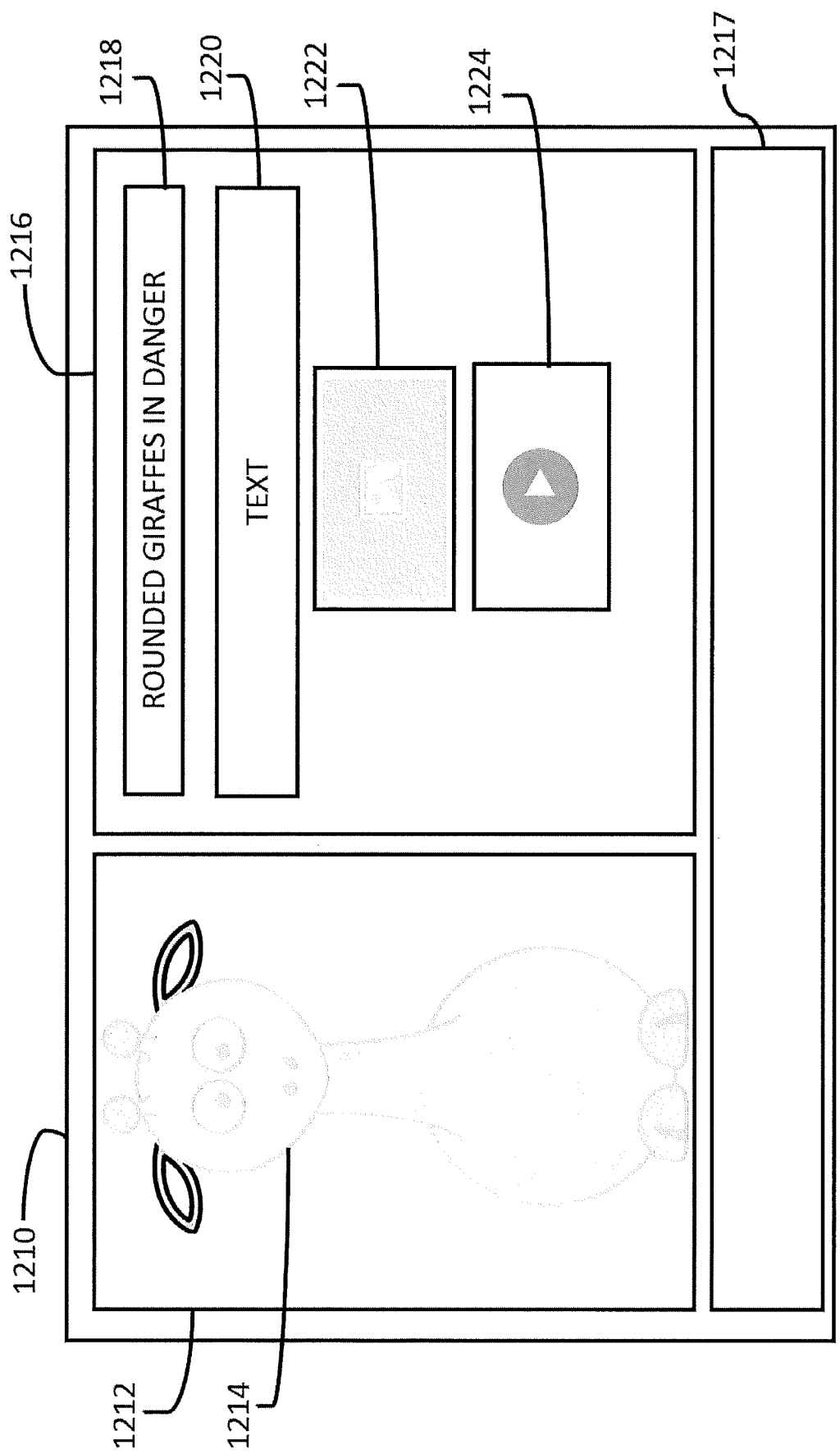
Figure 12E:
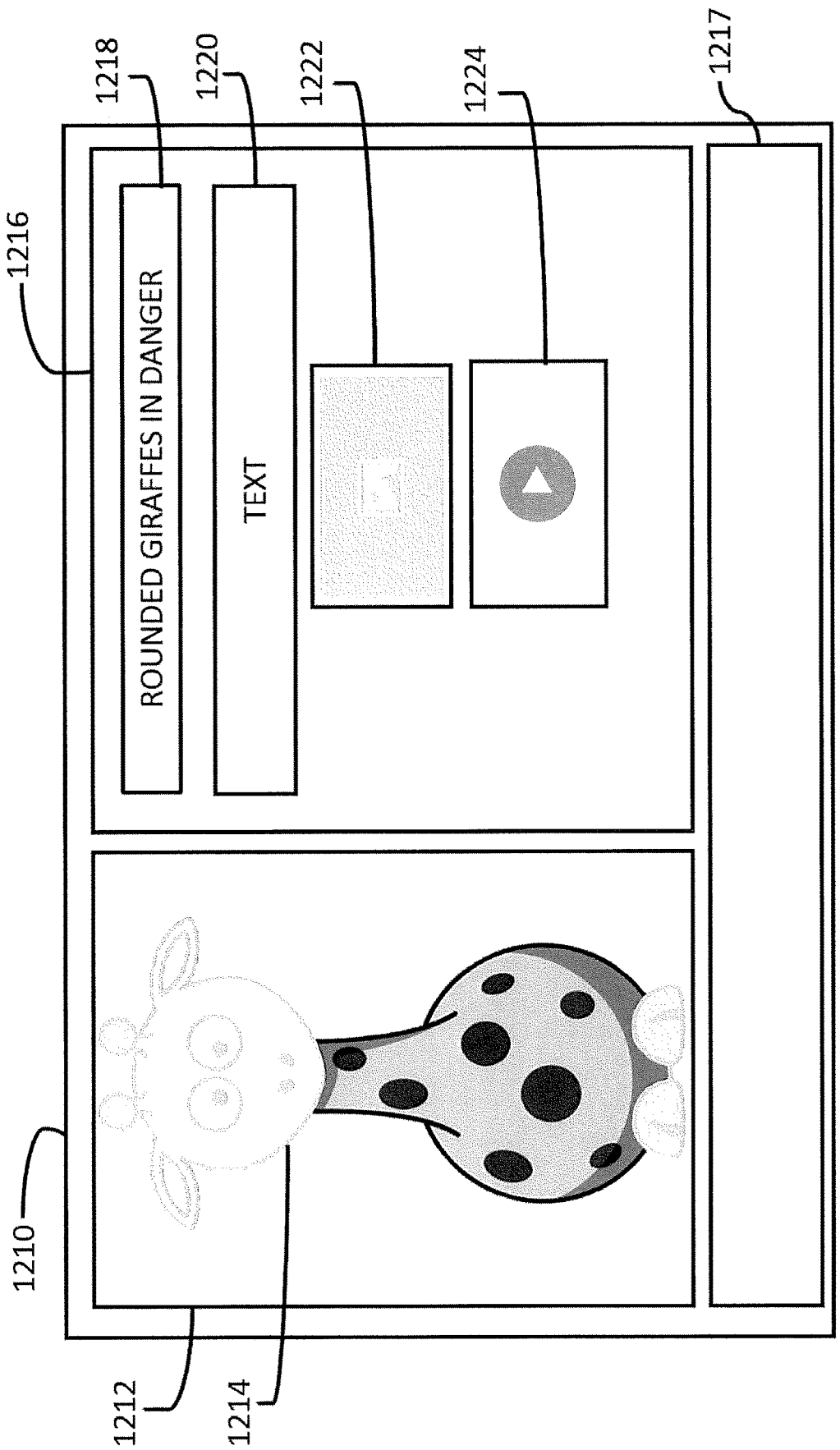
Figure 12F:
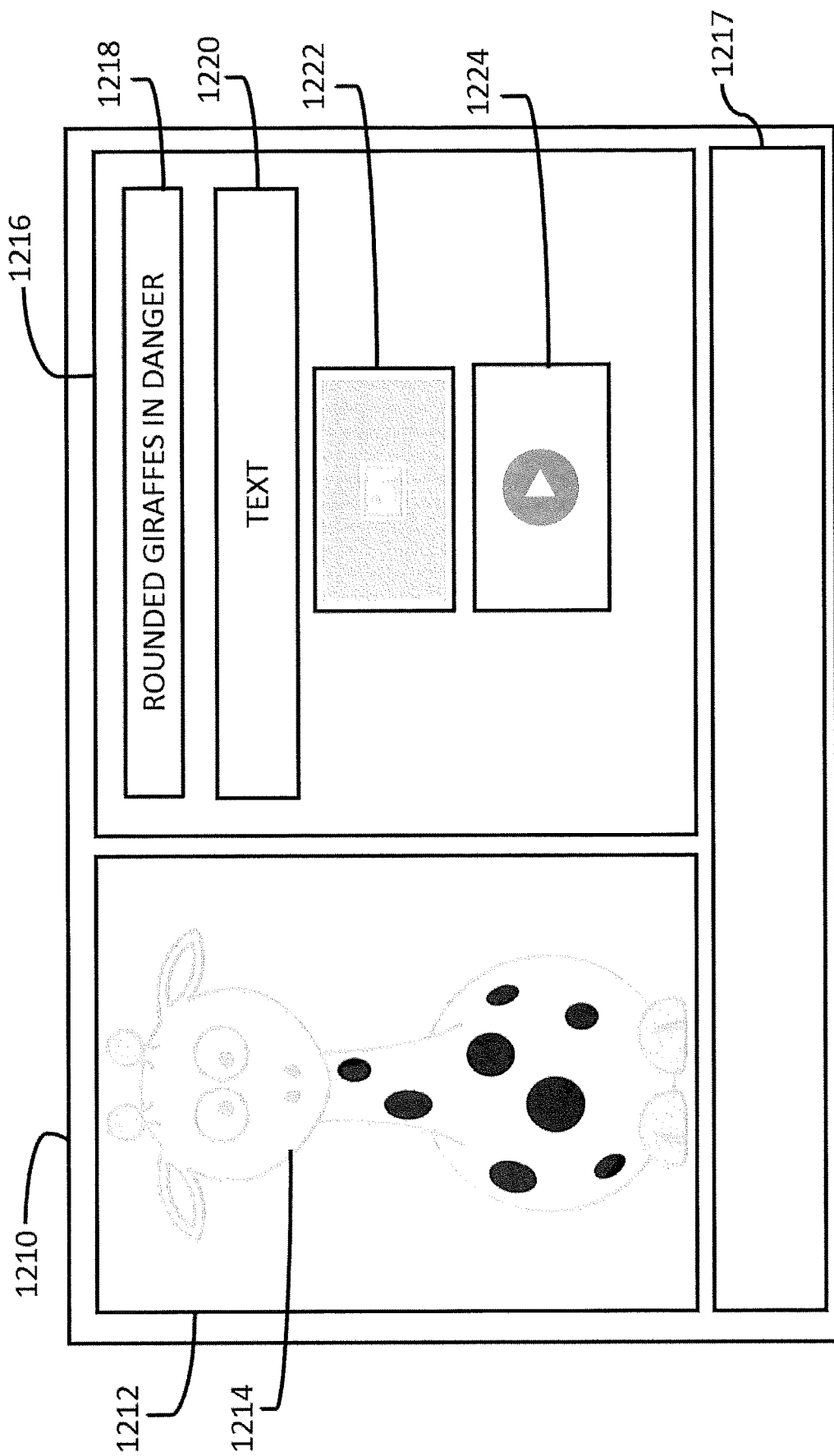

FIG. 12C illustrates an example of a GUI 1210 displaying an SVG image filter format augmented by CSS classes and image data resources retrieved according to the method 1200 illustrated in and described with respect to FIG. 12B. The SVG box 1212 displays an SVG image filter format's SVG image 1214. The image data box 1216 displays the image data resources of a first image data associated (by means of a URI) with the SVG image filter format's SVG root. As illustrated, the image data resources include a title (i.e. text displayed as a title) ROUNDED GIRAFFES IN DANGER displayed in a text box 1218, an article (i.e. text displayed as an article) displayed in a text box 1220, an image displayed in an image box 1222, and a video displayed in a video player box 1224. The SVG image filter format's SVG root, as illustrated in FIG. 8, is associated (by means of a URI) to only one image data. Consequently, the image data buttons box 1217 does not contain any image data button, which would enable (e.g., by clicking or tapping the image data button) a user to retrieve, via the image interactivity engine 109 and from the image filter publication application 122, the image data associated (by means of a URI) with the image data button and subsequently its image data resources so as to have the image data box 1216 display the retrieved image data resources. Alternatively, the GUI 1210 may display, in the image data buttons box 1217, a set of image data buttons including one for each supplemental image data associated (by means of a URI) with an emphasized SVG path and one for each image data associated (by means of a URI) with an emphasized SVG path's chain of ancestor SVG groups. The image interactivity filter format component 1104 triggers, in conjunction with the image interactivity GUI component 1102, a timer driven process of graphically emphasizing each set of image shapes pertaining to the SVG groups 804, 806 and 818, as illustrated in FIGS. 12D, 12E and 12F. This may raise the user's awareness of the presence of interactive image shapes in the SVG image 1214. The client device (111/112) may receive GUI event (i.e. an action or occurrence recognized by software, often originating asynchronously from the external environment, that may be handled by the software) notifications from the image interactivity GUI component 1102 upon a user's interactions with the GUI 1210. The client device (111/112) may process these events as described with respect to FIGS. 12G through 12J. The process of emphasizing a set of image shapes is executed by applying a deemphasizing CSS class to all image shapes not pertaining to the set of image shapes being emphasized. The deemphasizing CSS classes may define a white fill and a fill-opacity level of 0.4 and remove, if present, deemphasizing CCS class previously applied to the set of image shapes being emphasized. Therefore, the process of returning an image to its original state, i.e., without any image shapes being emphasized, is executed by removing all deemphasizing CSS classes from all image shapes. FIG. 12C illustrates an example of a GUI 1210 displaying an SVG image in its original state.

FIG. 12D illustrates an example of the GUI 1210 emphasizing a set of the SVG image 1214's pixels pertaining to the set of SVG paths associated (by means of inclusion) with the SVG group 804, described with respect to FIG. 8, by deemphasizing a set of the SVG image 1214's pixels pertaining to the sets of SVG paths associated (by means of inclusion) with the SVG groups 806, 818 and 808, described with respect to FIG. 8. The GUI 1210 illustrated in FIG. 12D may be a result of the image interactivity data component 1106 receiving a notification from the image interactivity GUI component 1102 of an event triggered by a user's pointing device (e.g., a mouse) pointing an SVG path 810 associated (by means of inclusion) with the SVG group 804.

When an image layer includes multiple shapes and one of the shapes are hovered over or selected by a user, the GUI may present content specific to the hovered over or selected shape and/or the image layer in general. For example, as illustrated in FIG. 12D, the shapes of both the ears of the giraffe may be emphasized based on both the ears being part of a single image layer and the GUI receiving an indication (e.g., a hover action or selection) with respect to one of the ears. When this occurs, the GUI may present text, video content, image content, audible content, and/or other content associated with the hovered or selected ear and/or content associated with the image layer in general.

As illustrated in FIG. 12D, portions of the image not associated with the image layer corresponding to a hovered over or selected shape (e.g., the portions of the image not associated with the ear outlines) may be deemphasized. Portions of an image may be deemphasized by applying an overlay (e.g., a computer generated graphical element which can be superimposed onto another) onto the image. An overlay's fill attribute value specifies values of the three hues of light (i.e., red, green, and blue). The values of the three hues of light correspond to the color of the overlay's pixels. The overlay's fill-opacity attribute's value specifies the overlay's pixel or group of pixels alpha channel (e.g., a color component that represents the degree of transparency (or opacity) of a color (i.e., the red, green, and blue channels)). The values of the three hues of light and the fill-opacity attribute's value are used to determine a pixel's rendering when blended with another pixel. The overlay may adjust its coordinates dynamically to match the overlaid image's (e.g., the image presented to the end user) changing coordinates. The system may correlate an SVG image filter format's image with an overlay and deemphasize a set of image shapes by increasing the value of their set of correlated overlay's pixels fill-opacity. Such process effectively blends the overlay's color with the underlying image's color (e.g., when an overlay is overlaid onto an image, the alpha value of the overlay color is used to determine the resulting color). If the alpha value is opaque, the overlay color overwrites the destination color (e.g., the color of the corresponding pixel of the underlying image). If the alpha value is transparent, the overlay color is invisible, thereby allowing the image color (e.g., the color of the pixel of the underlying image) to show through. If the alpha value is between opaque and transparent, the resulting color displayed to a user has a varying degree of transparency/opacity, which creates a translucent effect. Thus, when the GUI receives a hover or selection of a shape, the system may (i) determine the image layer associated with the shape, (ii) determine portions of the image not associated with the image layer, (iii) apply a fill-opacity value between opaque and transparent to the SVG image filter format's overlay's pixels correlated with the portions of the image not associated with the image layer, and (iv) apply a fill-opacity value of transparent to the SVG image filter format's overlay's pixels correlated with the portions of the image associated with the hovered or selected image layer. Thereafter, when the GUI receives a hover or selection of a shape that is not associated with any image filter layer, the system may revert all fill-opacity values to transparent of all SVG image filter format's overlay's pixels. This results in the entirety of the image again being presented in its original state to the user.

In another example, the system may deemphasize a set of image shapes by altering the three hues of light value pertaining to the set of image shapes pixels and reverse the deemphasizing process by reverting the three hues of light value pertaining to the set of image shapes pixels back to their original state. For example, if a pixel is originally presented as a bright red, the pixel as deemphasized may be presented as a less vibrant red. Respectively, reversing the described process presents the pixel in its original bright red color.

One skilled in the art may apply the aforementioned overlay technique and the aforementioned pixel altering technique based on application situation. For example, a system may apply one technique when image filters are being defined and generated (as described herein above) and may apply another technique when visually altering content presented to an end user.

FIG. 12E illustrates an example of the GUI 1210 emphasizing a set of the SVG image 1214's pixels pertaining to the set of SVG paths associated (by means of inclusion) with the SVG group 806 and 818, described with respect to FIG. 8, by deemphasizing a set of the SVG image 1214's pixels pertaining to the sets of SVG paths associated (by means of inclusion) to the SVG groups 804 and 808, described with respect to FIG. 8. The GUI 1210 illustrated in FIG. 12E may be a result of the image interactivity data component 1106 receiving a notification from the image interactivity GUI component 1102 of an event triggered by a user's pointing device (e.g., a mouse) pointing an SVG path 814 associated (by means of inclusion) with the SVG group 806.

FIG. 12F illustrates an example of the GUI 1210 emphasizing a set of the SVG image 1214's pixels pertaining to the set of SVG paths associated (by means of inclusion) with the SVG group 818, described with respect to FIG. 8, by deemphasizing a set of the SVG image 1214's pixels pertaining to the sets of SVG paths associated (by means of inclusion) to the SVG groups 804, 806 and 808, described with respect to FIG. 8. The GUI 1210 illustrated in FIG. 12F may be a result of the image interactivity data component 1106 receiving a notification from the image interactivity GUI component 1102 of an event triggered by a user's pointing device (e.g., a mouse) pointing an SVG path 820 associated (by means of inclusion) with the SVG group 818.

Figure 12G:
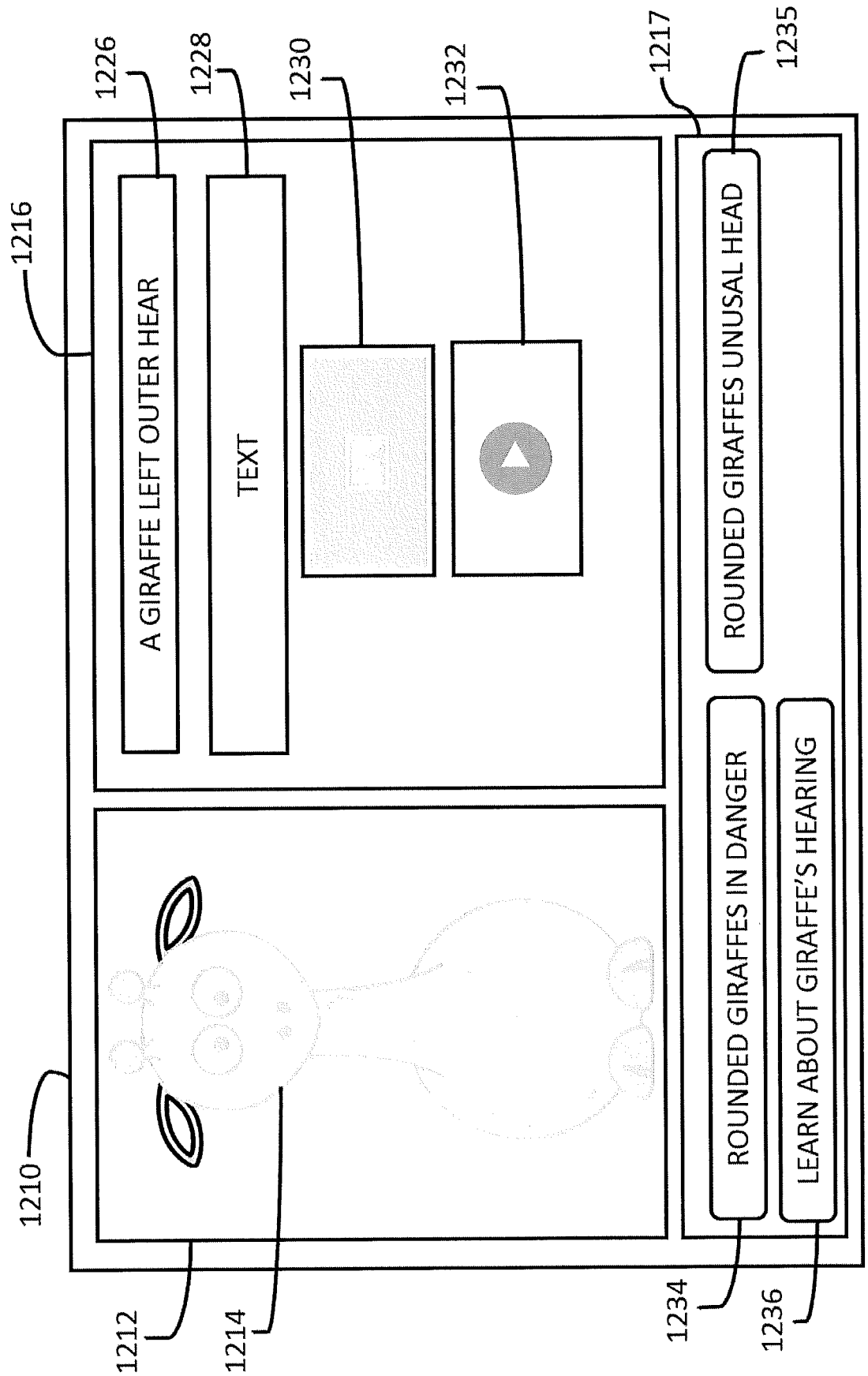

FIG. 12G illustrates an example of the GUI 1210 after the client device (111/112) receives a selection of a set of the SVG image 1214's pixels pertaining to an SVG path 810 associated (by means of inclusion) to the SVG group 804 described with respect to FIG. 8 The GUI 1210 emphasizes a set of the SVG image 1214's pixels pertaining to the set of SVG paths associated (by means of inclusion) to the SVG group 804 by deemphasizing a set of the SVG image 1214's pixels pertaining to the sets of SVG paths associated (by means of inclusion) with the SVG groups 806, 818 and 808. The image interactivity data component 1106 retrieves, from the image filter publication application 122 via the image interactivity engine 109, the first image data associated (by means of a URI) with the SVG path selected (by a click or tap event on the SVG path 810) and subsequently its image data resources, resulting in the display of the retrieved image data resources in the image data box 1216. In the example illustrated in FIG. 12G, the image data resources displayed in the image data box 1216 include a title (i.e. text displayed as a title) A GIRAFFE LEFT OUTER HEAR displayed in a text box 1226, an article (i.e. text displayed as an article) displayed in a text box 1228, an image displayed in an image box 1230, and a video displayed in a video player box 1232. The GUI 1210 displays, in an image data buttons box 1217, an image data button 1234 associated with an image data URI 838, an image data button 1235 associated with an image data URI 840, and an image data button 1236 associated with an image data URI 842.

Figure 12H:
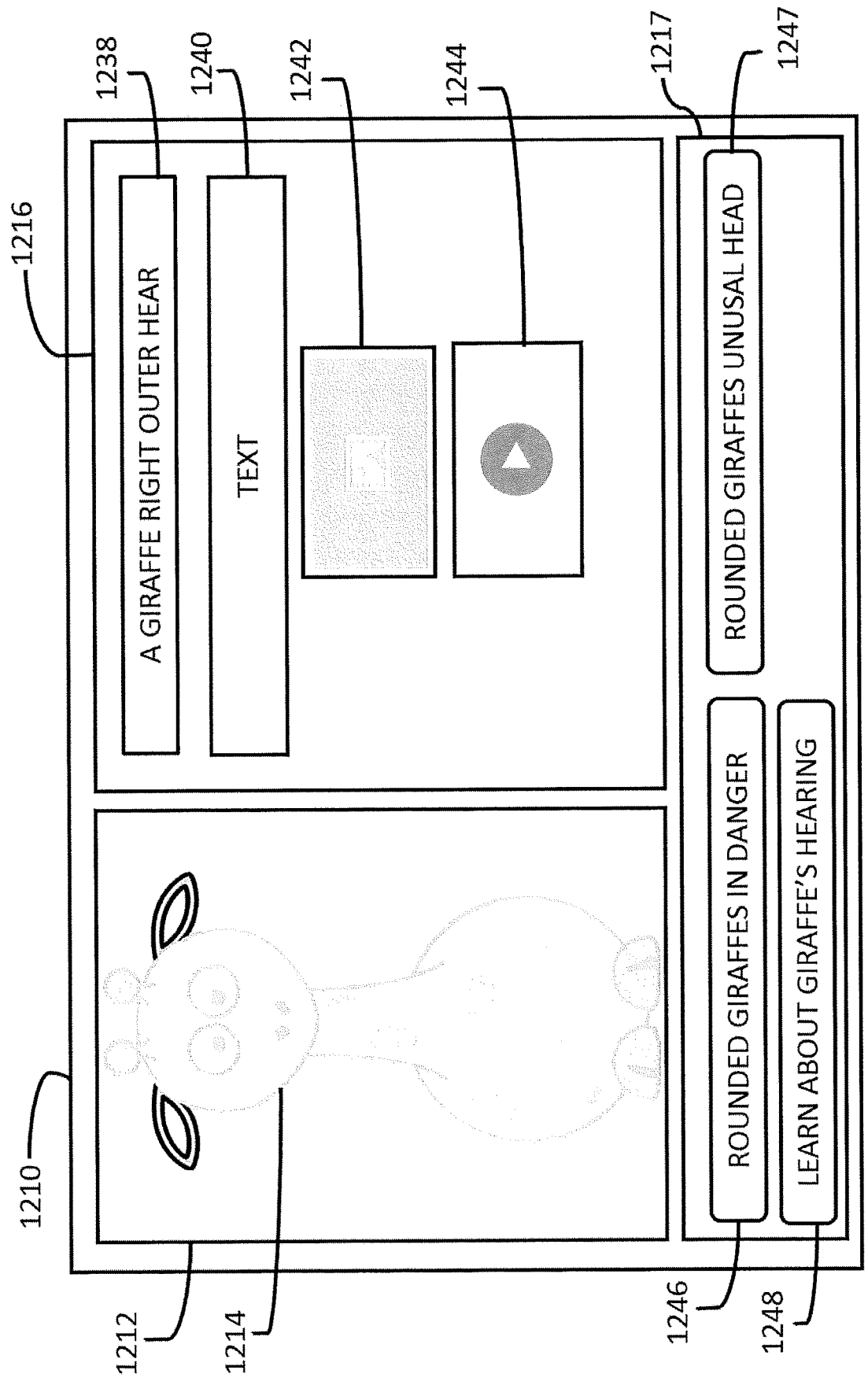

FIG. 12H illustrates an example of the GUI 1210 after the client device (111/112) receives a selection of the SVG image 1214's pixels pertaining to an SVG path 812 associated (by means of inclusion) to the SVG group 804 described with respect to FIG. 8. The GUI 1210 emphasizes a set of the SVG image 1214's pixels pertaining to the set of SVG paths associated (by means of inclusion) to the SVG group 804 by deemphasizing a set of the SVG image 1214's pixels pertaining to the sets of SVG paths associated (by means of inclusion) with the SVG groups 806, 818 and 808. The image interactivity data component 1106 retrieves, from the image filter publication application 122 via the image interactivity engine 109, the first image data associated (by means of a URI) with the SVG path selected (by a click or tap event on the SVG path 812) and subsequently its image data resources, resulting in the display of the retrieved image data resources in the image data box 1216. In the example illustrated in FIG. 12H, the image data resources displayed in the image data box 1216 include a title (i.e. text displayed as a title) A GIRAFFE RIGHT OUTER HEAR displayed in a text box 1238, an article (i.e. text displayed as an article) displayed in a text box 1240, an image displayed in an image box 1242, and a video displayed in a video player box 1244. The GUI 1210 displays, in an image data buttons box 1217, an image data button 1246 associated with an image data URI 838, an image data button 1247 associated with an image data URI 840, and an image data button 1248 associated with an image data URI 843.

Figure 12I:
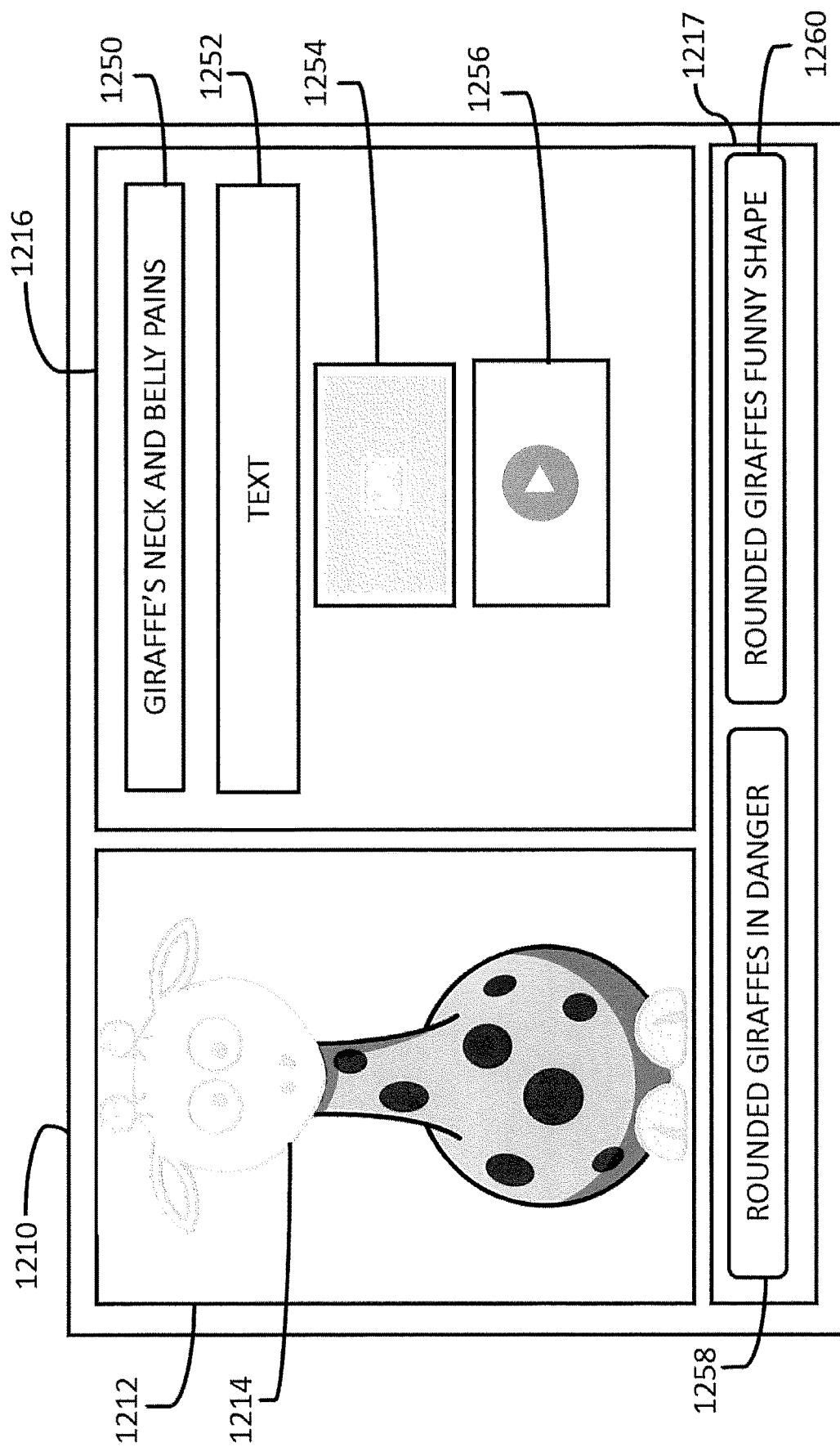

FIG. 12I illustrates an example of the GUI 1210 after the client device (111/112) receives a selection of the SVG image 1214's pixels pertaining to an SVG path 814 associated (by means of inclusion) to the SVG group 806 described with respect to FIG. 8. The GUI 1210 emphasizes a set of the SVG image 1214's pixels pertaining to the set of SVG paths associated (by means of inclusion) to the SVG groups 806 and 818 by deemphasizing a set of the SVG image 1214's pixels pertaining to the sets of SVG paths associated (by means of inclusion) with the SVG groups 804 and 808. The image interactivity data component 1106 retrieves, from the image filter publication application 122 via the image interactivity engine 109, the first image data associated (by means of a URI) with the SVG path selected (by a click or tap event on the SVG path 814) and subsequently its image data resources, resulting in the display of the retrieved image data resources in the image data box 1216. In the example illustrated in FIG. 12I, the image data resources displayed in the image data box 1216 include a title (i.e. text displayed as a title) GIRAFFE'S NECK AND BELLY PAINS displayed in a text box 1250, an article (i.e. text displayed as an article) displayed in a text box 1252, an image displayed in an image box 1254, and a video displayed in a video player box 1256. The GUI 1210 displays, in an image data buttons box 1217, an image data button 1258 associated with an image data URI 838 and an image data button 1260 associated with an image data URI 848.

Figure 12J:
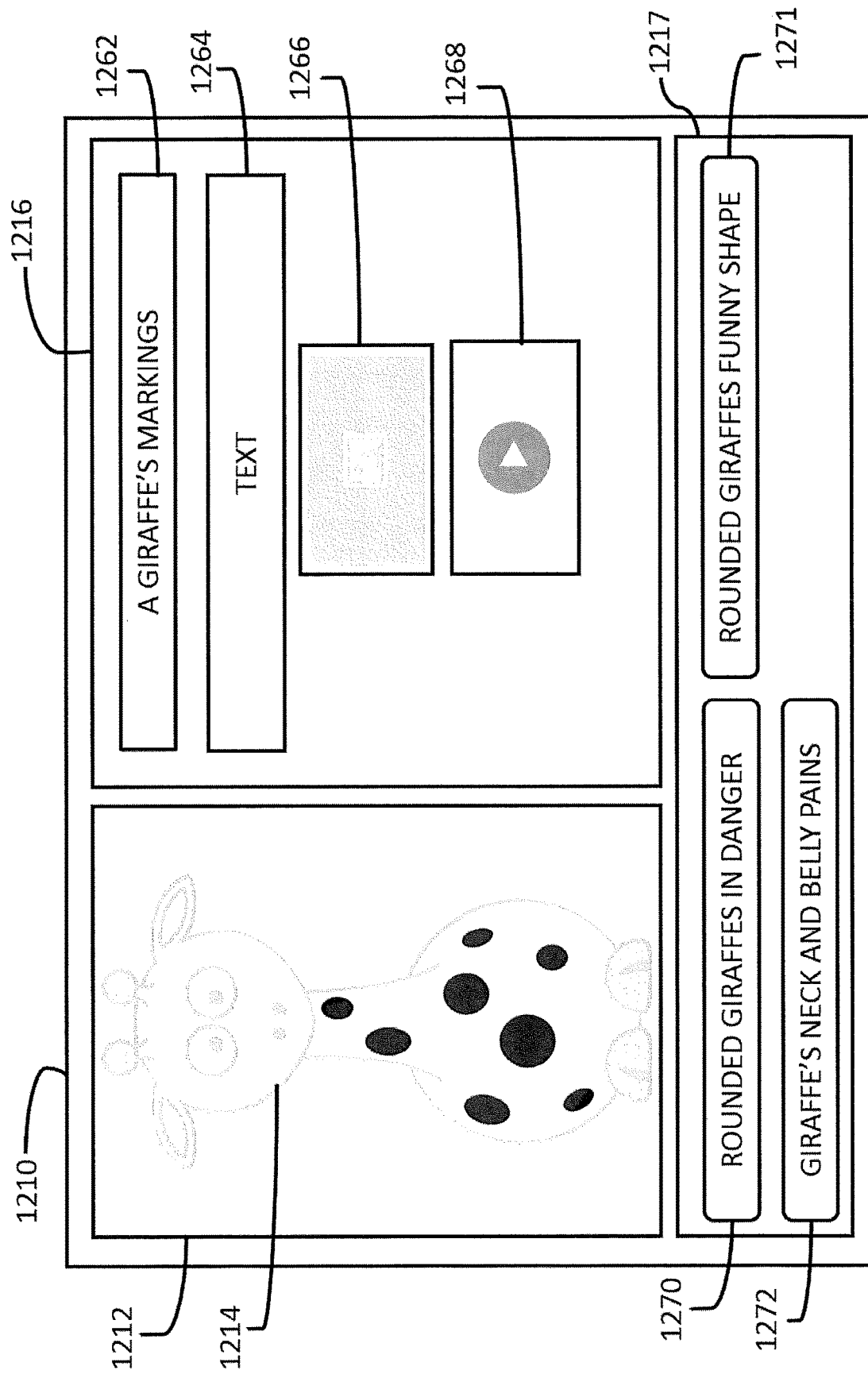

FIG. 12J illustrates an example of the GUI 1210 after the client device (111/112) receives a selection of the SVG image 1214's pixels pertaining to an SVG path 820 associated (by means of inclusion) to the SVG group 818 described with respect to FIG. 8. The GUI 1210 emphasizes a set of the SVG image 1214's pixels pertaining to the set of SVG paths associated (by means of inclusion) to the SVG group 818 by deemphasizing a set of the SVG image 1214's pixels pertaining to the sets of SVG paths associated (by means of inclusion) with the SVG groups 804, 806 and 808. The image interactivity data component 1106 retrieves, from the image filter publication application 122 via the image interactivity engine 109, the first image data associated (by means of a URI) with the SVG path selected (by a click or tap event on the SVG path 820) and subsequently its image data resources, resulting in the display of the retrieved image data resources in the image data box 1216. In the example illustrated in FIG. 12J, since no image data is associated (by means of a URI) with the SVG path selected, the image interactivity data component 1106 retrieved the first image data associated (by means of a URI) with the first ancestor SVG group (i.e. the SVG group 818). The image data resources displayed in the image data box 1216 include a title (i.e. text displayed as a title) A GIRAFFE'S MARKINGS displayed in a text box 1262, an article (i.e. text displayed as an article) displayed in a text box 1264, an image displayed in an image box 1266, and a video displayed in a video player box 1268. The GUI 1210 displays, in an image data buttons box 1217, an image data button 1270 associated with an image data URI 838, an image data button 1271 associated with an image data URI 848, and an image data button 1272 associated with an image data URI 850.

Components and Logic

Certain embodiments are described herein as including logic or a number of components or mechanisms. Components may constitute either software components (e.g., code embodied (1) on a non-transitory machine-readable medium) or hardware-implemented components. A hardware-implemented component is a tangible unit capable of performing certain operations and may be configured or arranged in a certain manner In example embodiments, one or more computer systems (e.g., a standalone, client or server computer system) or one or more processors may be configured by software (e.g., an application, or application portion) as a hardware-implemented component that operates to perform certain operations as described herein.

In various embodiments, a hardware-implemented component may be implemented mechanically or electronically. For example, a hardware-implemented component may include dedicated circuitry or logic that is permanently configured (e.g., as a special-purpose processor, such as field programmable gate array (FPGA) or an application-specific integrated circuit (ASIC)) to perform certain operations. A hardware-implemented component may also include programmable logic or circuitry that is temporarily configured by software to perform certain operations. It will be appreciated that the decision to implement a hardware-implemented component mechanically, in dedicated and permanently configured circuitry, or in temporarily configured circuitry (e.g., configured by software) may be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented components are temporarily configured (e.g., programmed), each of the hardware-implemented component need not be configured or instantiated at any one instance in time. For example, where the hardware-implemented components comprise a processor configured using software, the processor may be configured as respectively different hardware-implemented components at different times. Software may, accordingly, configure a processor, for example, to constitute a particular hardware-implemented component at one instance of time and to constitute a different hardware-implemented component at a different instance of time.

Hardware-implemented component can provide information to, and receive information from, other hardware-implemented component. Accordingly, the described hardware implemented components may be regarded as being communicatively coupled. Where multiples of such hardware-implemented components exist contemporaneously, communications may be achieved through signal transmission (e.g., over appropriate circuits and buses that connect the hardware-implemented components). In embodiments in which multiple hardware-implemented components are configured or instantiated at different times, communications between such hardware-implemented components may be achieved, for example, through the storage and retrieval of information in memory structures to which the hardware-implemented components have access. For example, one hardware-implemented component may perform an operation, and store the output of that operation in memory to which it is communicatively coupled. A further hardware-implemented component may then, at a later time, access the memory to retrieve and process the stored output. Hardware-implemented components may also initiate communications with input or output devices, and can operate on a resource (e.g., a collection of information).

The various operations of methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions.

Similarly, the methods described herein may be at least partially processor-implemented. For example, at least some of the operations of a method may be performed by one or more processors or processor-implemented components. The performance of certain of the operations may be distributed among the one or more processors, not only residing within a single machine, but deployed across a number of machines. In some example embodiments, the processor(s) may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as example machines including processors), with these operations being accessible via the network 104 (e.g., the Internet) and via one or more appropriate interfaces (e.g., APIs).

Electronic Apparatus and System

The teachings of the present disclosure may be implemented in digital electronic circuitry or in computer hardware, firmware, or software, or in combinations thereof. Various teachings herein may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

Operations may be performed by one or more programmable processors executing a computer program to perform functions by operating on input data and generating output. Method operations can also be performed by, and apparatus may be implemented as, special purpose logic circuitry (e.g., an FPGA or an ASIC).

The disclosed computing system can include clients and servers. A client and server are generally remote from each other and typically interact through a communication network. The relationship of client and server arises by virtue of computer programs running on the respective devices and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed according to the present disclosure.

Example Computer System

Figure 13:
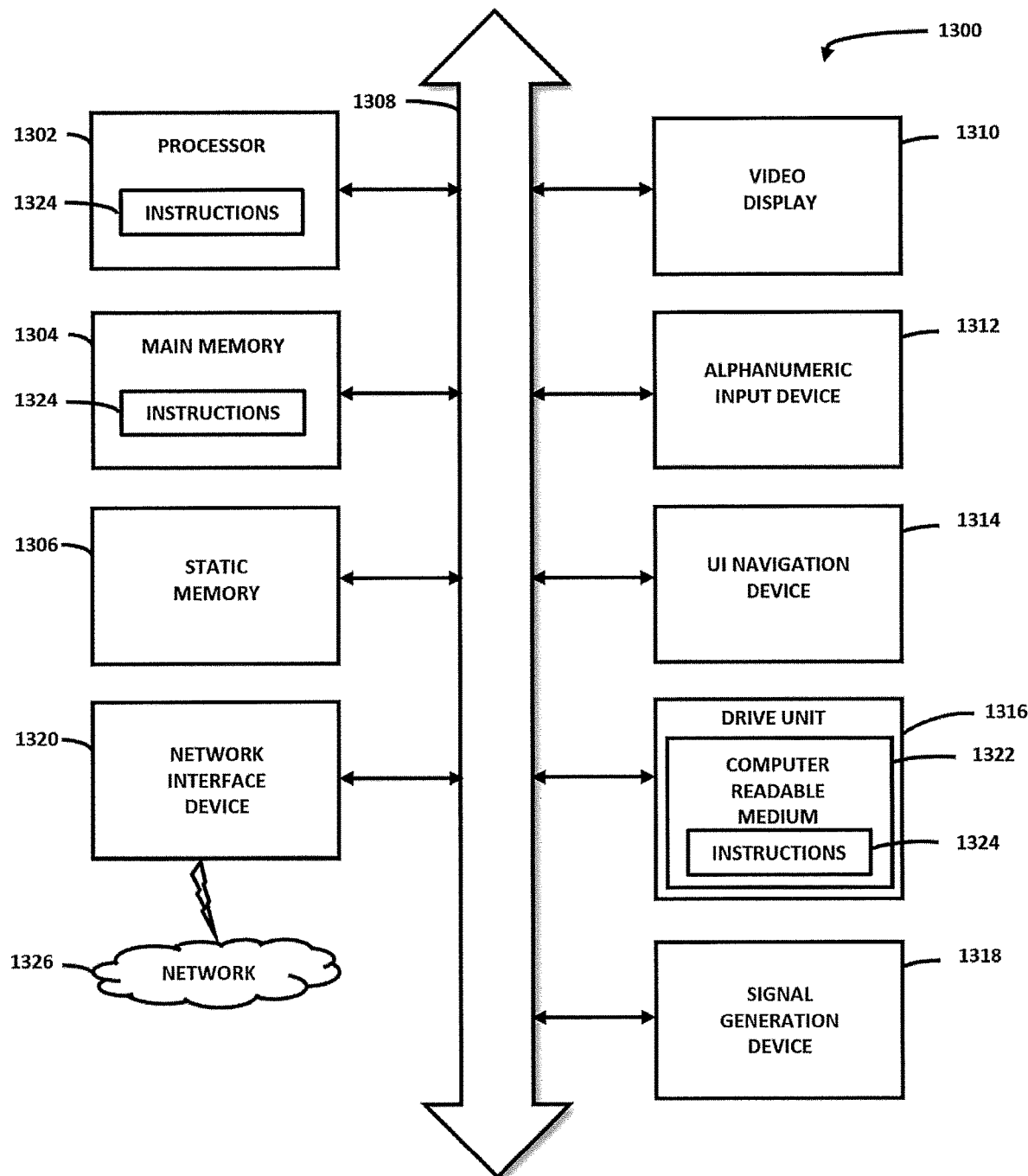
FIG. 13 illustrates a computer system component diagram according to embodiments of the present disclosure.

FIG. 13 illustrates a diagrammatic representation of a device 1300 within which a set of instructions 1324 may be executed, causing the device 1300 to perform one or more of the methodologies discussed herein. The device 1300 may operate as a standalone device or may be connected (e.g., networked) to other devices. In a networked deployment, the device 1300 may operate in the capacity of a server or a client device (111/112) in a server-client network environment, or as peer device in a peer-to-peer (or distributed) network environment. The device 1300 may be a personal computer (PC), a tablet PC, asset-top box (STB), a personal digital assistant (PDA), a cellular telephone, a web appliance, a network router, switch or bridge, or any device capable of executing a set of instructions 1324 (sequential or otherwise) that specify actions to be taken by that device. Further, while only a single device 1300 is illustrated, the term "device" shall also be taken to include any collection of devices that individually or jointly execute a set (or multiple sets) of instructions 1324 to perform any one or more of the methodologies discussed herein.

The example device 1300 includes a processor 1302 (e.g., a central processing unit (CPU), a graphics processing unit (GPU), or both), a main memory 1304, and a static memory 1306, which communicate with each other via a bus 1308. The device 1300 may further include a video display unit 1310 (e.g., a liquid crystal display (LCD) or a cathode ray tube (CRT)). The device 1300 also includes an alphanumeric input device 1312 (e.g., a keyboard), a UI navigation device 1314 (e.g., a mouse), a drive unit 1316, a signal generation device 1318 (e.g., a speaker), and a network interface device 1320.

The drive unit 1316 includes a computer-readable medium 1322 on which is stored one or more sets of data structures and instructions 1324 (e.g., software) embodying or used by one or more of the methodologies or functions described herein. The instructions 1324 may also reside, completely or at least partially, within the main memory 1304 or within the processor 1302 during execution thereof by the device 1300.

The instructions 1324 may further be transmitted or received over a network 1326 via the network interface device 1320 utilizing any one of a number of well-known transfer protocols (e.g., HTTP).

While the computer-readable medium 1322 is illustrated to be a single medium, the term "computer-readable medium" should be taken to include a single medium or multiple medium (e.g., one or more centralized or distributed databases, and/or associated caches and servers) that store the one or more sets of instructions 1324. The term "computer-readable medium" shall also be taken to include any medium that is capable of storing, encoding, or carrying a set of instructions 1324 for execution by the device and which cause the device to perform any one or more of the methodologies of the present disclosure, or that is capable of storing, encoding, or carrying data structures used by or associated with such set of instructions 1324. The term "computer-readable medium" shall, accordingly, be taken to include, but not limited to, solid-state memories, optical memories, and magnetic memories.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 14:
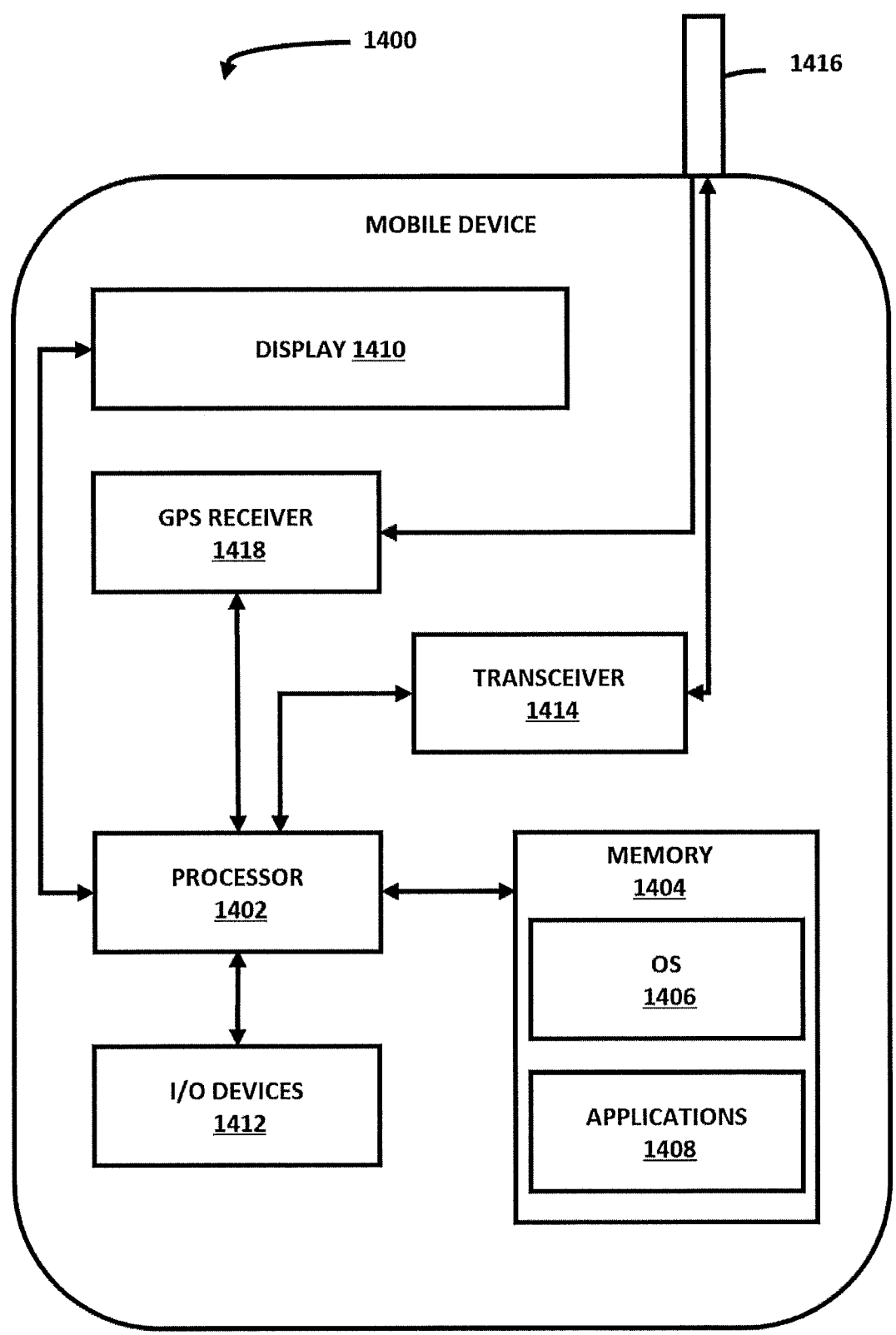
FIG. 14 illustrates a mobile device component diagram, according to embodiments of the present disclosure.

FIG. 14 is a block diagram illustrating a mobile device 1400. The mobile device 1400 may include a processor 1402. The processor 1402 may be any of a variety of different types of commercially available processors 1402 suitable for a mobile device 1400 (for example, an XScale architecture microprocessor, a microprocessor without interlocked pipeline stages (MIPS) architecture processor, or another type of processor 1402). A memory 1404, such as random-access memory (RAM), a flash memory, or another type of memory, is typically accessible to the processor 1402. The memory 1404 may be adapted to store an, operating system (OS) 1406, as well as applications 1408, such as a mobile location enabled application that may provide location-based services (LBSs) to a user. The processor 1402 may be coupled, either directly or indirectly, to a display 1410 and to one or more output/input (I/O) devices 1412, such as a keypad, a touch panel sensor, a microphone, and the like. Similarly, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although to the present disclosure includes specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, for example structural and logical substitutions and changes may be made without departing from the scope of this disclosure. This Detailed Description, therefore, is not to be taken in a limiting sense.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of the present disclosure as represented by the appended claims. The specification and drawings are, accordingly, to be regarded in an illustrative rather than restrictive sense.

Although specific embodiments have been illustrated and described herein, it should be appreciated that any arrangement calculated to achieve the same purpose may be substituted for the specific embodiments described. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system, comprising:
   at least one processor; and
   at least one memory including instructions that, when executed by the at least one processor, cause the system to:
     receive a first image associated with an image filter, the image filter comprising one or more image filter layers, wherein an image filter layer includes a set of outer boundary coordinates associated with included shapes and outer boundary coordinates associated with excluded shapes;
     associate the outer boundary coordinates of the first image with an image filter root layer;
     display the first image via a graphical user interface (GUI);

generate a first image filter layer in response to receiving an indication to generate a new image filter layer;
receive selections corresponding to pixels of the first image;
associate the selected pixels of the first image with outer boundary coordinates of a first shape in the first image;
associate the outer boundary coordinates of the first shape as an included shape of the first image filter layer;
associate the outer boundary coordinates of the first shape as an excluded shape of the image filter root layer;
receive an indication via the graphical user interface of an interaction with a location of the first image within the outer boundary coordinates of the included shape of the first image filter layer; and
display the first image, via the graphical user interface, wherein the displaying of the first image includes
deemphasizing pixels of the first image associated with the image filter root layer, and
wherein the outer boundary coordinates of the included shape in the image filter root layer define pixels to be included in the deemphasizing, and the outer boundary coordinates of the excluded shape of the image filter root layer define pixels to be excluded from the deemphasizing; and
wherein the instructions, when executed by the at least one processor, further cause the system to generate an overlay including:
a first portion having a first fill opacity, the first portion corresponding to pixels of the first image within the outer boundary coordinates of an included shape of the image filter root layer and not within the outer boundary coordinates of an excluded shape of the image filter root layer, and
a second portion having a transparent fill opacity, the second portion corresponding to pixels of the first image within the outer boundary coordinates of an included shape of the first image filter layer and not within the outer boundary coordinates of an excluded shape of the first image filter layer; and wherein the deemphasizing includes applying the overlay to the first image.

2. The system of claim 1, wherein the indication of an interaction with a location associated with the first image filter layer corresponds to one of a hover action or a selection of one or more pixels of the first image within the outer boundary coordinates of the included shape of the first filter layer and not within the outer boundary coordinates of the excluded shape of the first image filter layer.

3. The system of claim 1, wherein the instructions, when executed by the at least one processor, further include instructions to apply a deemphasizing cascading style sheet (CSS) to the deemphasized pixels of the image filter root layer.

4. The system of claim 1, wherein the instructions, when executed by the at least one processor, further cause the system to:
display a second image, the second image corresponding at least in part to pixels within the outer boundary coordinates of the first shape;
receive second selections corresponding to pixels of the second image;
associate the second selections of pixels of the second image as outer boundary coordinates of a second shape within the second image;
associate the outer boundary coordinates of the second shape as an excluded shape of the first image filter layer;
associate the outer boundary coordinates of the second shape as outer boundary coordinates of an included shape of the image filter root layer; and
receive an indication via the graphical user interface of an interaction with a location within the outer boundary coordinates of the included shape of the first image filter layer and not within the outer boundary coordinates of the excluded shape of the first image filter layer.

5. The system of claim 1, wherein the instructions, when executed by the at least one processor, further cause the system to:
receive second selections corresponding to second pixels of the first image, the second pixels within the pixels of the first image and not within the outer boundary coordinates of the first shape;
associate the second pixels with second outer boundary coordinates of a second shape in the first image;
associate the outer boundary coordinates of the second shape as an included shape of a second image filter layer;
associate the outer boundary coordinates of the second shape as outer boundary coordinates of an excluded shape of the image filter root layer;
associate the second image filter layer with the first image filter layer; and
receive an indication via the graphical user interface of an interaction with a location within the outer boundary coordinates of an included shape in the first or second image filter layer, and not within the outer boundary coordinates of an excluded shape of either the first image filter layer or the second image filter layer.

6. The system of claim 1, wherein the instructions, when executed by the at least one processor, further cause the system to:
alter the hues of the pixels within the outer boundary coordinates of shapes included in the image filter root layer, and not alter the hues of pixels within the outer boundary coordinates of excluded shapes of the image filter root layer.

7. The system of claim 1, wherein the instructions, when executed by the at least one processor, further cause the system to:
associate the first image filter layer with resource data including content corresponding to at least one of video content, image content, or textual content,
wherein the displaying, via the graphical user interface in response to the receiving an indication of an interaction, further includes displaying the resource data according to an image filter data template.

8. The system of claim 7, wherein the image filter root layer further comprises a uniform resource identifier (URI) of the first image.

9. The system of claim 8, wherein the image filter further comprises one or more uniform resource identifiers (URI) of resource data associated with the one or more image filter layers.

10. A system computer-implemented method, comprising:
receiving a first image associated with an image filter, the image filter comprising one or more image filter layers, wherein an image filter layer includes a set of outer boundary coordinates associated with included shapes and outer boundary coordinates associated with excluded shapes;

associating the outer boundary coordinates of the first image with an image filter root layer;
displaying the first image via a graphical user interface (GUI);
generating a first image filter layer in response to receiving an indication to generate a new image filter layer;
receiving selections corresponding to pixels of the first image;
associating the selected pixels of the first image with outer boundary coordinates of a first shape in the first image;
associating the outer boundary coordinates of the first shape as an included shape of the first image filter layer;
associating the outer boundary coordinates of the first shape as an excluded shape of the image filter root layer;
receiving an indication via the graphical user interface of an interaction with a location of the first image within the outer boundary coordinates of the included shape of the first image filter layer; and
displaying the first image, via the graphical user interface, wherein the displaying of the first image includes deemphasizing pixels of the first image associated with the image filter root layer, and
wherein the outer boundary coordinates of the included shape in the image filter root layer define pixels to be included in the deemphasizing, and the outer boundary coordinates of the excluded shape of the image filter root layer define pixels to be excluded from the deemphasizing,
wherein the deemphasizing comprises:
generating an overlay including:
a first portion having a first fill opacity, the first portion corresponding to pixels of the first image within the outer boundary coordinates of an included shape of the image filter root layer and not within the outer boundary coordinates of an excluded shape of the image filter root layer, and
a second portion having a transparent fill opacity, the second portion corresponding to pixels of the first image within the outer boundary coordinates of an included shape of the first image filter layer and not within the outer boundary coordinates of an excluded shape of the first image filter layer; and
applying the overlay to the first image.

11. The computer-implemented method of claim 10, wherein the indication of an interaction with a location associated with the first image filter layer corresponds to one of a hover action or a selection of one or more pixels of the first image within the outer boundary coordinates of the included shape of the first filter layer and not within the outer boundary coordinates of the excluded shape of the first image filter layer.

12. The computer-implemented method of claim 10, wherein the deemphasizing further includes applying a deemphasizing cascading style sheet (CSS) to the deemphasized pixels of the image filter root layer.

13. The computer-implemented method of claim 10, further comprising:
displaying a second image, the second image corresponding at least in part to pixels within the outer boundary coordinates of the first shape;
receiving second selections corresponding to pixels of the second image;
associating the second selections of pixels of the second image as outer boundary coordinates of a second shape within the second image;
associating the outer boundary coordinates of the second shape as an excluded shape of the first image filter layer;
associating the outer boundary coordinates of the second shape as outer boundary coordinates of an included shape of the image filter root layer; and
receiving an indication via the graphical user interface of an interaction with a location within the outer boundary coordinates of the included shape of the first image filter layer and not within the outer boundary coordinates of the excluded shape of the first image filter layer.

14. The computer-implemented method of claim 10, further comprising:
receiving second selections corresponding to second pixels of the first image, the second pixels within the pixels of the first image and not within the outer boundary coordinates of the first shape;
associating the second pixels with second outer boundary coordinates of a second shape in the first image;
associating the outer boundary coordinates of the second shape as an included shape of a second image filter layer;
associating the outer boundary coordinates of the second shape as outer boundary coordinates of an excluded shape of the image filter root layer;
associating the second image filter layer with the first image filter layer; and
receiving an indication via the graphical user interface of an interaction with a location within the outer boundary coordinates of an included shape in the first or second image filter layer, and not within the outer boundary coordinates of an excluded shape of either the first image filter layer or the second image filter layer.

15. The computer-implemented method of claim 10, wherein the deemphasizing further comprises:
altering hues of the pixels within the outer boundary coordinates of shapes included in the image filter root layer, and not altering the hues of pixels within the outer boundary coordinates of excluded shapes of the image filter root layer.

16. The computer-implemented method of claim 10, further comprising:
associating the first image filter layer with resource data including content corresponding to at least one of video content, image content, or textual content,
wherein the displaying, via the graphical user interface in response to the receiving an indication of an interaction, further includes displaying the resource data according to an image filter data template.

17. The computer-implemented method of claim 16, wherein the image filter root layer further comprises a uniform resource identifier (URI) of the first image.

18. The computer-implemented method of claim 17, wherein the image filter further comprises one or more uniform resource identifiers (URI) of resource data associated with the one or more image filter layers.

* * * * *